(12) United States Patent
Wang et al.

(10) Patent No.: US 12,225,615 B2
(45) Date of Patent: Feb. 11, 2025

(54) SIGNALING HANDOVERS OF TERMINALS BETWEEN USER PLANE FUNCTION NETWORK ELEMENTS

(71) Applicant: Huawei Technologies Co., Ltd., Shenzhen (CN)

(72) Inventors: Yuan Wang, Shanghai (CN); Zhongping Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/136,944

(22) Filed: Dec. 29, 2020

(65) Prior Publication Data

US 2021/0120620 A1    Apr. 22, 2021

Related U.S. Application Data

(63) Continuation of application No. PCT/CN2019/093385, filed on Jun. 27, 2019.

(30) Foreign Application Priority Data

Jun. 30, 2018   (CN) .......................... 201810704891.7

(51) Int. Cl.
*H04W 76/25* (2018.01)
*H04W 8/08* (2009.01)
(Continued)

(52) U.S. Cl.
CPC ............. *H04W 76/25* (2018.02); *H04W 8/08* (2013.01); *H04W 8/26* (2013.01); *H04W 76/11* (2018.02)

(58) Field of Classification Search
CPC ..... H04W 76/10; H04W 76/11; H04W 76/12; H04W 76/15; H04W 76/16; H04W 76/19;
(Continued)

(56) References Cited

U.S. PATENT DOCUMENTS

2012/0020278 A1   1/2012  Moberg et al.
2016/0234104 A1   8/2016  Hoffmann
(Continued)

FOREIGN PATENT DOCUMENTS

CN    101107824 A    1/2008
CN    102769574 A    11/2012
(Continued)

OTHER PUBLICATIONS

Ericsson, "Anchor change for Ethernet PDU Sessions," 3GPP TSG-SA WG2 Meeting #128, S2-186420, Jun. 26, 2018, 4 pages.
(Continued)

*Primary Examiner* — Peter Chen
(74) *Attorney, Agent, or Firm* — Conley Rose, P.C.

(57) ABSTRACT

A communication method includes, after determining first session identifier information for a terminal device and obtaining an address of the terminal device, a session management network element sends a first correspondence between the first session identifier information and the address of the terminal device to a first user plane function network element, so that the first user plane function network element transmits an Ethernet packet to the terminal device based on the first correspondence.

21 Claims, 31 Drawing Sheets

(51) Int. Cl.
*H04W 8/26* (2009.01)
*H04W 76/11* (2018.01)

(58) Field of Classification Search
CPC ..... H04W 76/20; H04W 76/22; H04W 76/25; H04W 76/27; H04W 36/14; H04W 36/16; H04W 36/0016; H04W 36/0022; H04W 36/0027; H04W 36/0033; H04W 36/34; H04W 36/38; H04W 36/385; H04W 8/02; H04W 8/08; H04W 8/26
See application file for complete search history.

(56) References Cited

U.S. PATENT DOCUMENTS

| | | | |
|---|---|---|---|
| 2016/0330167 A1 | 11/2016 | Cai et al. | |
| 2018/0220479 A1 | 8/2018 | Shu et al. | |
| 2018/0270715 A1* | 9/2018 | Lee | H04W 36/0011 |
| 2018/0270888 A1* | 9/2018 | Faccin | H04W 76/20 |
| 2018/0343211 A1 | 11/2018 | Jeong | |
| 2019/0208572 A1* | 7/2019 | Wang | H04W 36/0022 |
| 2019/0273697 A1* | 9/2019 | Shi | H04L 45/74 |
| 2020/0146077 A1* | 5/2020 | Li | H04W 76/10 |
| 2021/0345193 A1* | 11/2021 | Miklós | H04W 36/12 |

FOREIGN PATENT DOCUMENTS

| | | | |
|---|---|---|---|
| CN | 106900081 A | 6/2017 | |
| CN | 107846703 A | 3/2018 | |
| EP | 3047621 A1 | 7/2016 | |
| EP | 3468236 A1 | 4/2019 | |
| JP | 2012521149 A | 9/2012 | |
| KR | 20170088598 A | 8/2017 | |
| KR | 20180061265 A | 6/2018 | |
| WO | 2015108373 A1 | 7/2015 | |
| WO | WO-2018045501 A1 * | 3/2018 | .......... H04L 61/1511 |
| WO | WO-2018090230 A1 * | 5/2018 | ............ H04L 45/74 |

OTHER PUBLICATIONS

3GPP TS 23.501 V15.1.0 (Mar. 2018), 3rd Generation Partnership Project; Technical Specification Group Services and System Aspects; System Architecture for the 5G System;Stage 2(Release 15), 201 pages.

ZTE, "Update for Solution 5: Small Data Fast Path communication," SA WG2 Meeting #128, Jul. 2-6, 2018, Vilnius, Lithuania, S2-186602, 9 pages.

3GPP TS 23.501 V15.2.0 (Jun. 2018), "3rd Generation Partnership Project; Technical Specification Group Services and System Aspects; System Architecture for the 5G System; Stage 2 (Release 15)," 217 pages.

3GPP TS 23.502 V15.2.0 (Jun. 2018), 3rd Generation Partnership Project; Technical Specification Group Services and System Aspects; Procedures for the 5G System; Stage 2 (Release 15), 308 pages.

3GPP TS 23.503 V15.2.0, "3rd Generation Partnership Project; Technical Specification Group Services and System Aspects; Policy and Charging Control Framework for the 5G System; Stage 2 (Release 15)," Jun. 2018, 67 pages.

3rd Generation Partnership Project; Technical Specification Group Core Network and Terminals; Interface between the Control Plane and the User Plane Nodes; Stage 3 (Release 15), 3GPP TS 29.244 V15.1.0, Mar. 2018, 170 pages.

* cited by examiner

SIGNALING HANDOVERS OF TERMINALS BETWEEN USER PLANE FUNCTION NETWORK ELEMENTS

CROSS-REFERENCE TO RELATED APPLICATIONS

This application is a continuation of International Patent Application No. PCT/CN2019/093385 filed on Jun. 27, 2019, which claims priority to Chinese Patent Application No. 201810704891.7 filed on Jun. 30, 2018. The disclosures of the aforementioned applications are hereby incorporated in their entirety.

TECHNICAL FIELD

This application relates to the field of communications technologies, and in particular, to a communication method and an apparatus.

BACKGROUND

A 5th generation (5G) communications system supports a virtual local area network (LAN) style service. Specifically, a 5G network needs to provide a plurality of types of transmission services (for example, based on the Internet Protocol (IP), based on the Ethernet, or based on another non-IP technology) for terminal devices in a limited set, to ensure mutual communication between the terminal devices in the set. Ethernet-based communication is a key research direction of 5G LANs.

Currently, in Ethernet-based communication, a packet data unit (PDU) session of an Ethernet type can be established, and an Ethernet packet can be transmitted in 5G. A specific process is as follows: A packet transmission rule, namely, a PDU session rule, for a media access control (MAC) address of a terminal device and session identifier information is preconfigured on a user plane function network element. When receiving an Ethernet packet, the user plane function network element finds, from the packet transmission rule based on the MAC address of the terminal device in the Ethernet packet, the session identifier information corresponding to the MAC address, and then transmits the Ethernet packet to the terminal device based on a PDU session indicated by the session identifier information.

Currently, the foregoing method can be applied only to a scenario in which a PDU session is established between a terminal device and a fixed user plane function network element. In another scenario, for example, a scenario in which the terminal device dynamically joins a network, or the terminal device very easily moves out of an original serving gateway (for example, a user plane function network element) due to mobility of the terminal device, and the terminal device is easily handed over between serving gateways, an originally configured PDU session rule is unavailable, or a new user plane function network element does not preconfigure a PDU session rule for the terminal device. Consequently, the Ethernet packet may not be transmitted to the terminal device.

In conclusion, the foregoing method is not flexible, and easily leads to a transmission failure of the Ethernet packet.

SUMMARY

This application provides a communication method and an apparatus for transmitting an Ethernet packet more flexibly.

According to a first aspect, an embodiment of this application provides a communication method. The method includes: after determining first session identifier information for a terminal device and obtaining an address of the terminal device, sending, by a session management network element, a first correspondence between the first session identifier information and the address of the terminal device to a first user plane function network element, where the first session identifier information is used to indicate a first session channel of the first user plane function network element, and the address of the terminal device is a MAC address.

According to the foregoing method, after determining the first session identifier information for the terminal device and obtaining the address of the terminal device, the session management network element sends the first correspondence between the first session identifier information and the address of the terminal device to the first user plane function network element, so that the first user plane function network element transmits an Ethernet packet to the terminal device based on the first correspondence. In this way, the Ethernet packet that needs to be transmitted to the terminal device can be accurately and successfully transmitted to the terminal device.

In a possible design, a specific method for sending, by the session management network element, the first correspondence to the first user plane function network element may be: generating, by the session management network element, a first packet transmission rule based on the first session identifier information and the address of the terminal device, where the first packet transmission rule includes the first correspondence; and then sending, by the session management network element, the first packet transmission rule to the first user plane function network element.

According to the foregoing method, the session management network element may send the first correspondence to the first user plane function network element through the first packet transmission rule.

In a possible design, the session management network element may obtain the address of the terminal device in the following two manners:

Manner 1: The session management network element receives a first message from the terminal device, where the first message is used to request to establish a PDU session, and the first message includes the address of the terminal device.

Manner 2: The session management network element obtains the address of the terminal device from a second user plane function network element, where the terminal device is handed over from the second user plane function network element to the first user plane function network element.

According to the foregoing method, the session management network element can accurately obtain the address of the terminal device.

In a possible design, when the terminal device works in a bridge mode, to be specific, one or more other devices are connected to a network by using the terminal device, the first message may further include addresses of the one or more other devices. In this way, subsequently, a packet that needs to be transmitted to the one or more other devices may be first transmitted to the terminal device, to transmit the packet to the one or more other devices by using the terminal device.

In a possible design, when the terminal device is handed over from a second session channel of the second user plane function network element to the first session channel of the first user plane function network element, the obtaining, by the session management network element, the address of the terminal device from the second user plane function network element includes: sending, by the session management network element, second session identifier information to the second user plane function network element, and receiving the address of the terminal device from the second user plane function network element, where the second session identifier information corresponds to the address of the terminal device, and the second session identifier information indicates the second session channel before the terminal device is handed over; or receiving, by the session management network element, the address of the terminal device that corresponds to the second session identifier information and that is reported by the second user plane function network element.

According to the foregoing method, the session management network element can accurately obtain the address of the terminal device.

In a possible design, the sending, by the session management network element, second session identifier information to the second user plane function network element, and receiving the address of the terminal device from the second user plane function network element may be implemented in the following two manners:

Manner 1: The session management network element sends a second message to the second user plane function network element, where the second message is used to request a second packet transmission rule, the second message includes the second session identifier information, and the second packet transmission rule includes the address of the terminal device; and the session management network element receives the second packet transmission rule corresponding to the second session identifier information from the second user plane function network element.

Manner 2: The session management network element sends a third message to the second user plane function network element, where the third message is used to request the address of the terminal device; and the session management network element receives the address of the terminal device from the second user plane function network element.

According to the foregoing method, the session management network element can accurately obtain the address of the terminal device from the second user plane function network element.

In a possible design, when the session management network element receives the second packet transmission rule corresponding to the second session identifier information from the second user plane function network element, and the session management network element sends the first correspondence between the first session identifier information and the address of the terminal device to the first user plane function network element, the sending, by the session management network element, a first correspondence between the first session identifier information and the address of the terminal device to the first user plane function network element specifically includes: sending, by the session management network element, the first session identifier information and the second packet transmission rule to the first user plane function network element.

In a possible design, after receiving the second packet transmission rule corresponding to the second session identifier information from the second user plane function network element, the session management network element sends a fourth message to the second user plane function network element, where the fourth message is used to instruct the second user plane function network element to delete the second packet transmission rule.

According to the foregoing method, the session management network element instructs the second user plane function network element to delete the second packet transmission rule, so that resources occupied by the second user plane function network element can be reduced.

In a possible design, when the session management network element receives the second packet transmission rule corresponding to the second session identifier information from the second user plane function network element, and the session management network element sends the first packet transmission rule to the first user plane function network element, the generating, by the session management network element, the first packet transmission rule based on the first correspondence includes: generating, by the first user plane function network element, the first packet transmission rule based on the first session identifier information and the second packet transmission rule.

In a possible design, the generating, by the first user plane function network element, the first packet transmission rule based on the first session identifier information and the second packet transmission rule includes: replacing, by the session management network element, the second session identifier information in the second packet transmission rule with the first session identifier information, to generate the first packet transmission rule.

In a possible design, the first session identifier information is a PDU session identifier or a tunnel endpoint identifier (TEID).

According to a second aspect, an embodiment of this application provides a communication method. The method includes: after receiving a first correspondence between first session identifier information and an address of a terminal device from a session management network element, transmitting, by a first user plane function network element, an Ethernet packet to the terminal device based on the first correspondence, where the first session identifier information is used to indicate a first session channel of the first user plane function network element, and the address of the terminal device is a MAC address.

According to the foregoing method, the first user plane function network element may transmit the Ethernet packet to the terminal device based on the first correspondence. In this way, the Ethernet packet that needs to be transmitted to the terminal device can be accurately and successfully transmitted to the terminal device.

In a possible design, the first user plane function network element stores a first packet transmission rule after generating the first packet transmission rule, to transmit a packet by directly using the first packet transmission rule subsequently.

In a possible design, the receiving, by a first user plane function network element, a first correspondence between first session identifier information and an address of a terminal device from a session management network element includes: receiving, by the first user plane function network element, a first packet transmission rule from the session management network element, where the first packet transmission rule includes the first correspondence; and the transmitting, by the first user plane function network element, an Ethernet packet to the terminal device based on the first correspondence includes: transmitting, by the first user plane function network element, the Ethernet packet to the terminal device according to the first packet transmission rule.

According to the foregoing method, when receiving a first packet including the address of the terminal device, the first user plane function network element can accurately send the first packet to the terminal device through the first session channel that is determined according to the first packet transmission rule.

In a possible design, the transmitting, by the first user plane function network element, an Ethernet packet to the terminal device based on the first correspondence includes: generating, by the first user plane function network element, the first packet transmission rule based on the first correspondence, and transmitting, by the first user plane function network element, the Ethernet packet to the terminal device according to the first packet transmission rule, where the first packet transmission rule includes the first correspondence.

In a possible design, the receiving, by a first user plane function network element, a first correspondence between first session identifier information and an address of a terminal device from a session management network element includes: receiving, by the first user plane function network element, the first session identifier information and a second packet transmission rule from the session management network element, where the second packet transmission rule includes the address of the terminal device, and the terminal device is handed over from a second user plane function network element to the first user plane function network element; and the generating, by the first user plane function network element, the first packet transmission rule based on the first correspondence includes: generating, by the first user plane function network element, the first packet transmission rule based on the first session identifier information and the second packet transmission rule.

In a possible design, when the terminal device is handed over from a second session channel of the second user plane function network element to the first session channel of the first user plane function network element, the second packet transmission rule further includes second session identifier information, and the second session identifier information indicates the second session channel before the terminal device is handed over; and the generating, by the first user plane function network element, the first packet transmission rule based on the first session identifier information and the second packet transmission rule includes: replacing, by the first user plane function network element, the second session identifier information in the second packet transmission rule with the first session identifier information, to generate the first packet transmission rule.

In a possible design, the transmitting, by the first user plane function network element, an Ethernet packet to the terminal device based on the first correspondence includes: receiving, by the first user plane function network element, a first Ethernet packet, where the first Ethernet packet includes the address of the terminal device; determining, by the first user plane function network element based on the first correspondence, the first session identifier information corresponding to the address of the terminal device; and sending, by the first user plane function network element, the first Ethernet packet to the terminal device through the first session channel indicated by the first session identifier information.

In a possible design, the first session identifier information is a PDU session identifier or a TEID.

According to a third aspect, an embodiment of this application provides a communication method. The method includes: after a first user plane function network element receives first session identifier information from a session management network element, and obtains an address of a terminal device, determining, by the first user plane function network element, a first correspondence between the first session identifier information and the address of the terminal device, and transmitting an Ethernet packet to the terminal device based on the first correspondence, where the first session identifier information is used to indicate a first session channel of the first user plane function network element, and the address of the terminal device is a MAC address.

According to the foregoing method, the first user plane function network element can accurately and successfully transmit, to the terminal device, the Ethernet packet that needs to be transmitted to the terminal device.

In a possible design, the first user plane function network element may obtain the address of the terminal device in the following three manners:

Manner 1: The first user plane function network element receives a third Ethernet packet from the terminal device, and obtains the address of the terminal device that is included in the third Ethernet packet, where the third Ethernet packet is sent by the terminal device to the first user plane function network element through the first session channel.

Manner 2: The first user plane function network element receives a second packet transmission rule from the session management network element, where the second packet transmission rule includes the address of the terminal device, and the terminal device is handed over from a second user plane function network element to the first user plane function network element; and the first user plane function network element obtains the address of the terminal device from the second packet transmission rule.

Manner 3: The first user plane function network element receives a second packet transmission rule from a second user plane function network element, where the second packet transmission rule includes the address of the terminal device.

According to the foregoing method, the first user plane function network element can accurately obtain the address of the terminal device in a plurality of manners.

In a possible design, the transmitting, by the first user plane function network element, an Ethernet packet to the terminal device based on the first correspondence includes: generating, by the first user plane function network element, a first packet transmission rule based on the first correspondence, and transmitting, by the first user plane function network element, the Ethernet packet to the terminal device according to the first packet transmission rule.

In a possible design, when the first user plane function network element receives the second packet transmission rule from the session management network element or when the first user plane function network element receives the second packet transmission rule from the second user plane function network element, the generating, by the first user plane function network element, a first packet transmission rule based on the first correspondence includes: generating the first packet transmission rule based on the first session identifier information and the second packet transmission rule.

According to the foregoing method, when receiving a first packet including the address of the terminal device, the first user plane function network element can accurately send the first packet to the terminal device through the first session channel that is determined according to the first packet transmission rule.

In a possible design, when the terminal device is handed over from a second session channel of the second user plane function network element to the first session channel of the first user plane function network element, the second packet transmission rule includes second session identifier information, and the second session identifier information is used to indicate the second session channel before the terminal device is handed over; and the generating, by the first user plane function network element, the first packet transmission rule based on the first session identifier information and the second packet transmission rule includes: replacing, by the first user plane function network element, the second session identifier information in the second packet transmission rule with the first session identifier information, to generate the first packet transmission rule.

In a possible design, the transmitting, by the first user plane function network element, an Ethernet packet to the terminal device based on the first correspondence includes: receiving, by the first user plane function network element, a first Ethernet packet, where the first Ethernet packet includes the address of the terminal device; determining, by the first user plane function network element based on the first correspondence, the first session identifier information corresponding to the address of the terminal device; and sending, by the first user plane function network element, the first Ethernet packet to the terminal device through the first session channel indicated by the first session identifier information.

In a possible design, the first user plane function network element may specifically receive the first Ethernet packet from the second user plane function network element. In this way, after receiving the first Ethernet packet, the second user plane function network element may forward the first Ethernet packet to the first user plane function network element currently serving the terminal device, for processing, so that the first user plane function network element transmits the first Ethernet packet to the terminal device.

In a possible design, the first PDU session identifier information is a PDU session identifier or a TEID.

According to a fourth aspect, an embodiment of this application provides a communication method. The method includes: sending, by a session management network element, a second message to a second user plane function network element, where the second message is used to request a second packet transmission rule, the second message includes second session identifier information, the second session identifier information is used to indicate a second session channel of the second user plane function network element, and the second packet transmission rule includes a second correspondence between an address of a terminal device and the second session identifier information; receiving, by the session management network element, the second packet transmission rule corresponding to the second session identifier information from the second user plane function network element; and after determining first session identifier information, sending, by the session management network element, the first session identifier information and the second packet transmission rule to a first user plane function network element, where the first session identifier information is used to indicate a first session channel of the first user plane function network element, and the terminal device is handed over from the second user plane function network element to the first user plane function network element.

According to the foregoing method, the session management network element sends the first session identifier information and the second packet transmission rule to the first user plane function network element, to generate the first packet transmission rule by using the first session identifier information and the second packet transmission rule, so that the first user plane function network element transmits an Ethernet packet to the terminal device according to the first packet transmission rule. In this way, a packet transmission rule can be flexibly determined, so that the Ethernet packet that needs to be transmitted to the terminal device can be accurately and successfully transmitted to the terminal device.

In a possible design, after sending the second packet transmission rule and the first session identifier information to the first user plane function network element, the session management network element sends a fourth message to the second user plane function network element, where the fourth message is used to instruct the second user plane function network element to delete the second packet transmission rule.

According to the foregoing method, the session management network element instructs the second user plane function network element to delete the second packet transmission rule, so that resources occupied by the second user plane function network element can be reduced.

In a possible design, the first session identifier information is a PDU session identifier or a TEID.

According to a fifth aspect, an embodiment of this application provides a communication method. The method includes: obtaining, by a first user plane function network element, a second packet transmission rule and first session identifier information; and generating, by the first user plane function network element, a first packet transmission rule based on the second packet transmission rule and the first session identifier information, and transmitting an Ethernet packet to a terminal device according to the first packet transmission rule, where the first session identifier information is used to indicate a first session channel of the first user plane function network element, the second packet transmission rule includes a second correspondence between an address of the terminal device and second session identifier information, the second session identifier information is used to indicate a second session channel of a second user plane function network element, and the terminal device is handed over from the second user plane function network element to the first user plane function network element.

According to the foregoing method, the first user plane function network element can flexibly determine a packet transmission rule, so that the Ethernet packet that needs to be transmitted to the terminal device can be accurately and successfully transmitted to the terminal device.

In a possible design, the first user plane function network element may obtain the second packet transmission rule and the first session identifier information in the following two manners: In the first manner, the first user plane function network element receives the second packet transmission rule and the first session identifier information from a session management network element. In the second manner, the first user plane function network element receives the first session identifier information from a session management network element, and the first user plane function network element receives the second packet transmission rule from the second user plane function network element.

According to the foregoing method, the first user plane function network element can flexibly and accurately obtain the second packet transmission rule and the first session identifier information.

In a possible design, after the generating, by the first user plane function network element, a first packet transmission rule, the method further includes: receiving, by the first user plane function network element, a first Ethernet packet, where the first Ethernet packet includes the address of the terminal device; determining, by the first user plane function network element according to the first packet transmission rule, the first session identifier information corresponding to the address of the terminal device; and sending, by the first user plane function network element, the first Ethernet packet to the terminal device through the first session channel indicated by the first session identifier information.

According to the foregoing method, when receiving a first packet including the address of the terminal device, the first user plane function network element can accurately send the first packet to the terminal device through the first session channel that is determined according to the first packet transmission rule.

In a possible design, the receiving, by the first user plane function network element, the Ethernet packet may be specifically: receiving, by the first user plane function network element, the first Ethernet packet sent by a data network (DN); or may be: receiving, by the first user plane function network element, the first Ethernet packet from the second user plane function network element.

According to the foregoing method, the first user plane function network element can accurately obtain the first Ethernet packet that needs to be sent to the terminal device.

In a possible design, a specific method for receiving, by the first user plane function network element, the first Ethernet packet from the second user plane function network element may be: receiving, by the first user plane function network element, the first Ethernet packet that is sent by the second user plane function network element through a forwarding channel, where the forwarding tunnel is a channel established by the session management network element and used for data transmission between the first user plane function network element and the second user plane function network element.

According to the foregoing method, after receiving the first Ethernet packet, the second user plane function network element may forward the first Ethernet packet to the first user plane function network element currently serving the terminal device, for processing, so that the first user plane function network element transmits the first Ethernet packet to the terminal device.

In a possible design, the first session identifier information is a PDU session identifier or an identifier of a tunnel between the first user plane function network element and an access network device that is currently serving the terminal device.

According to a sixth aspect, an embodiment of this application provides a communication method. The method includes: receiving, by a second user plane function network element, a second message from a session management network element, where the second message is used to request a second packet transmission rule, the second message includes second session identifier information, and the second packet transmission rule includes a second correspondence between an address of a terminal device and the second session identifier information; and after determining the second packet transmission rule corresponding to the second session identifier information, sending, by the second user plane function network element, the second packet transmission rule to the session management network element, where the terminal device is handed over from the second user plane function network element to a first user plane function network element, and the second session identifier information is used to indicate a second session channel of the second user plane function network element.

According to the foregoing method, the session management network element may obtain the address of the terminal device from the second packet transmission rule, or the session management network element may send the second packet transmission rule to the first user plane function network element, and further, the first user plane function network element can flexibly obtain a first packet transmission rule, so that an Ethernet packet that needs to be transmitted to the terminal device can be accurately and successfully transmitted to the terminal device.

In a possible design, the second user plane function network element receives a first channel identifier of the first user plane function network element from the session management network element, and determines that a channel indicated by the first channel identifier is a forwarding channel between the second user plane function network element and the first user plane function network element; and then, after receiving a first Ethernet packet, the second user plane function network element sends the first Ethernet packet to the first user plane function network element through the forwarding channel, so that the first user plane function network element transmits the first Ethernet packet to the terminal device, where the first channel identifier is used to indicate a channel for data receiving by the first user plane function network element, and the first Ethernet packet includes the address of the terminal device.

According to the foregoing method, after receiving the first Ethernet packet, the second user plane function network element may forward the first Ethernet packet to the first user plane function network element currently serving the terminal device, for processing, so that the first user plane function network element transmits the first Ethernet packet to the terminal device.

According to a seventh aspect, an embodiment of this application provides a communication method. The method includes: determining, by a second user plane function network element, a forwarding channel between the second user plane function network element and a first user plane function network element, and sending a second packet transmission rule to the first user plane function network element through the forwarding channel, where a terminal device is handed over from the second user plane function network element to the first user plane function network element, and the second packet transmission rule includes a second correspondence between an address of the terminal device and a second session identifier information.

According to the foregoing method, the second user plane function network element can accurately send the second packet transmission rule to the first user plane function network element, so that the first user plane function network element can determine the first packet transmission rule according to the second packet transmission rule, and the first user plane function network element transmits an Ethernet packet to the terminal device according to the first packet transmission rule. In this way, a packet transmission rule can be flexibly determined, so that the Ethernet packet that needs to be transmitted to the terminal device can be accurately and successfully transmitted to the terminal device.

In a possible design, a specific method for determining, by the second user plane function network element, the forwarding channel between the second user plane function network element and the first user plane function network element may be: receiving, by the second user plane function network element, a first channel identifier of the first user plane function network element from a session management network element, where the first channel identifier is used to indicate a channel for data receiving by the first user plane function network element; and determining, by the second user plane function network element, that the channel indicated by the first channel identifier is the forwarding channel between the second user plane function network element and the first user plane function network element.

According to the foregoing method, the second user plane function network element can accurately determine the forwarding channel between the second user plane function network element and the first user plane function network element, to transmit data to the first user plane function network element subsequently.

In a possible design, the second user plane function network element receives a first Ethernet packet, where the first Ethernet packet includes the address of the terminal device; and the second user plane function network element sends the first Ethernet packet to the first user plane function network element through the forwarding channel.

According to the foregoing method, after receiving the first Ethernet packet, the second user plane function network element may forward the first Ethernet packet to the first user plane function network element currently serving the terminal device, for processing, so that the first user plane function network element transmits the first Ethernet packet to the terminal device.

According to an eighth aspect, this application further provides a session management network element. The session management network element has a function of implementing behavior of the session management network element in the method example according to the first aspect. The function may be implemented by hardware, or implemented by hardware executing corresponding software. The hardware or the software includes one or more modules corresponding to the foregoing function.

In a possible design, a structure of the session management network element includes a receiving unit, a sending unit, and a processing unit. These units may perform corresponding functions in the foregoing method example. For details, refer to detailed descriptions in the method example. Details are not described herein again.

In a possible design, a structure of the session management network element includes a transceiver and a processor, and optionally further includes a memory. The transceiver is configured to receive and send data, and is configured to communicate and interact with another device in a communications system. The processor is configured to support the session management network element in performing a corresponding function in the method according to the first aspect. The memory is coupled to the processor, and stores a program instruction and data that are necessary for the session management network element. Details are as follows:

The transceiver is configured to receive and send data.

The processor is configured to: determine first session identifier information for a terminal device, where the first session identifier information is used to indicate a first session channel of a first user plane function network element; obtain an address of the terminal device, where the address of the terminal device is a MAC address; and control the transceiver to send a first correspondence between the first session identifier information and the address of the terminal device to the first user plane function network element.

In a possible design, the processor controls the transceiver to send the first correspondence to the first user plane function network element, and is configured to: generate a first packet transmission rule based on the first session identifier information and the address of the terminal device, where the first packet transmission rule includes the first correspondence; and control the transceiver to send the first packet transmission rule to the first user plane function network element.

In a possible design, the processor obtains the address of the terminal device, and is configured to: control the transceiver to receive a first message from the terminal device, where the first message is used to request to establish a PDU session, and the first message includes the address of the terminal device; or control the transceiver to obtain the address of the terminal device from a second user plane function network element, where the terminal device is handed over from the second user plane function network element to the first user plane function network element.

In a possible design, when the terminal device is handed over from a second session channel of the second user plane function network element to the first session channel of the first user plane function network element, the controlling, by the processor, the transceiver to obtain the address of the terminal device from a second user plane function network element includes: controlling the transceiver to send second session identifier information to the second user plane function network element, and controlling the transceiver to receive the address of the terminal device from the second user plane function network element, where the second session identifier information corresponds to the address of the terminal device, and the second session identifier information indicates the second session channel before the terminal device is handed over; or controlling the transceiver to receive the address of the terminal device that corresponds to the second session identifier information and that is reported by the second user plane function network element.

In a possible design, the controlling, by the processor, the transceiver to send second session identifier information to the second user plane function network element, and controlling the transceiver to receive the address of the terminal device from the second user plane function network element includes: controlling the transceiver to send a second message to the second user plane function network element, to request a second packet transmission rule, where the second message includes the second session identifier information; and controlling the transceiver to receive the second packet transmission rule corresponding to the second session identifier information from the second user plane function network element, where the second packet transmission rule includes the address of the terminal device; or controlling the transceiver to send a third message to the second user plane function network element, where the third message is used to request the address of the terminal device, and the third message includes the second session identifier information; and controlling the transceiver to receive the address of the terminal device that corresponds to the second session identifier information from the second user plane function network element.

In a possible design, when the processor controls the transceiver to receive the second packet transmission rule corresponding to the second session identifier information from the second user plane function network element, and controls the transceiver to send the first correspondence between the first session identifier information and the address of the terminal device to the first user plane function network element, the controlling, by the processor, the transceiver, a first correspondence between the first session identifier information and the address of the terminal device to the first user plane function network element specifically includes: controlling the transceiver to send the first session identifier information and the second packet transmission rule to the first user plane function network element.

In a possible design, when the processor controls the transceiver to receive the second packet transmission rule corresponding to the second session identifier information from the second user plane function network element, and controls the transceiver to send the first packet transmission rule to the first user plane function network element, the generating, by the processor, the first packet transmission rule based on the first correspondence includes: generating the first packet transmission rule based on the first session identifier information and the second packet transmission rule.

In a possible design, the generating, by the session management network element, the first packet transmission rule based on the first session identifier information and the second packet transmission rule includes: replacing the second session identifier information in the second packet transmission rule with the first session identifier information, to generate the first packet transmission rule.

In a possible design, after the controlling, by the processor, the transceiver to receive the second packet transmission rule corresponding to the second session identifier information from the second user plane function network element, the following is further included: controlling the transceiver to send a fourth message to the second user plane function network element, where the fourth message is used to instruct the second user plane function network element to delete the second packet transmission rule.

In a possible design, the first session identifier information is a PDU session identifier or a TEID.

According to a ninth aspect, this application further provides a first user plane function network element. The first user plane function network element has a function of implementing behavior of the first user plane function network element in the example according to the second aspect. The function may be implemented by hardware, or implemented by hardware executing corresponding software. The hardware or the software includes one or more modules corresponding to the foregoing function.

In a possible design, a structure of the first user plane function network element includes a receiving unit and a processing unit, and optionally further includes a sending unit. These units may perform corresponding functions in the foregoing method example. For details, refer to detailed descriptions in the method example. Details are not described herein again.

In a possible design, a structure of the first user plane function network element includes a transceiver and a processor, and optionally further includes a memory. The transceiver is configured to receive and send data, and is configured to communicate and interact with another device in a communications system. The processor is configured to support the first user plane function network element in performing a corresponding function in the method according to the second aspect or the fourth aspect. The memory is coupled to the processor, and stores a program instruction and data that are necessary for the first user plane function network element. Details are as follows:

The transceiver is configured to receive and send data.

The processor is configured to: control the transceiver to receive a first correspondence between first session identifier information and an address of a terminal device from a session management network element, where the first session identifier information is used to indicate a first session channel of the first user plane function network element, and the address of the terminal device is a MAC address; and transmit an Ethernet packet to the terminal device based on the first correspondence.

In a possible design, the controlling, by the processor, the transceiver to receive a first correspondence between first session identifier information and an address of a terminal device from a session management network element includes: controlling the transceiver to receive a first packet transmission rule from the session management network element, where the first packet transmission rule includes the first correspondence; and the transmitting, by the processor, an Ethernet packet to the terminal device based on the first correspondence includes: transmitting the Ethernet packet to the terminal device according to the first packet transmission rule.

In a possible design, the transmitting, by the processor, an Ethernet packet to the terminal device based on the first correspondence induces: generating a first packet transmission rule based on the first correspondence, and transmitting the Ethernet packet to the terminal device according to the first packet transmission rule, where the first packet transmission rule includes the first correspondence.

The controlling, by the processor, the transceiver to receive a first correspondence between first session identifier information and an address of a terminal device from a session management network element includes: controlling the transceiver to receive the first session identifier information and a second packet transmission rule from the session management network element, where the second packet transmission rule includes the address of the terminal device, and the terminal device is handed over from a second user plane function network element to the first user plane function network element; and the generating, by the processor, the first packet transmission rule based on the first correspondence includes: generating, by the processor, the first packet transmission rule based on the first session identifier information and the second packet transmission rule.

In a possible design, when the terminal device is handed over from a second session channel of the second user plane function network element to the first session channel of the first user plane function network element, the second packet transmission rule further includes second session identifier information, and the second session identifier information indicates the second session channel before the terminal device is handed over; and the generating, by the processor, the first packet transmission rule based on the first session identifier information and the second packet transmission rule includes: replacing the second session identifier information in the second packet transmission rule with the first session identifier information, to generate the first packet transmission rule.

In a possible design, the transmitting, by the processor, an Ethernet packet to the terminal device based on the first correspondence includes: controlling the transceiver to receive a first Ethernet packet, where the first Ethernet packet includes the address of the terminal device; determining, based on the first correspondence, the first session identifier information corresponding to the address of the terminal device; and sending the first Ethernet packet to the terminal device through the first session channel indicated by the first session identifier information.

In a possible design, the first session identifier information is a PDU session identifier or a TEID.

According to a tenth aspect, this application further provides a first user plane function network element. The first user plane function network element has a function of implementing behavior of the first user plane function network element in the method example according to the third aspect. The function may be implemented by hardware, or implemented by hardware executing corresponding software. The hardware or the software includes one or more modules corresponding to the foregoing function.

In a possible design, a structure of the first user plane function network element includes a receiving unit and a storage unit, and optionally further includes a sending unit and a processing unit. These units may perform corresponding functions in the foregoing method example. For details, refer to detailed descriptions in the method example. Details are not described herein again.

In a possible design, a structure of the first user plane function network element includes a transceiver and a processor, and optionally further includes a memory. The transceiver is configured to receive and send data, and is configured to communicate and interact with another device in a communications system. The processor is configured to support the first user plane function network element in performing a corresponding function in the method according to the third aspect. The memory is coupled to the processor, and stores a program instruction and data that are necessary for the first user plane function network element. Details are as follows:

The transceiver is configured to receive and send data.

The processor is configured to: control the transceiver to receive first session identifier information from a session management network element, where the first session identifier information is used to indicate a first session channel of the first user plane function network element; obtain an address of a terminal device, where the address of the terminal device is a MAC address; and determine a first correspondence between the first session identifier information and the address of the terminal device, and transmit an Ethernet packet to the terminal device based on the first correspondence.

In a possible design, the obtaining, by the processor, an address of a terminal device includes: controlling the transceiver to receive a third Ethernet packet from the terminal device, and obtain the address of the terminal device that is included in the third Ethernet packet, where the third Ethernet packet is sent by the terminal device to the first user plane function network element through the first session channel; or controlling the transceiver to receive a second packet transmission rule from the session management network element, where the second packet transmission rule includes the address of the terminal device, and the terminal device is handed over from a second user plane function network element to the first user plane function network element; or controlling the transceiver to receive a second packet transmission rule from a second user plane function network element, where the second packet transmission rule includes the address of the terminal device.

In a possible design, the transmitting, by the processor, an Ethernet packet to the terminal device based on the first correspondence includes: generating a first packet transmission rule based on the first correspondence, and transmitting, by the first user plane function network element, the Ethernet packet to the terminal device according to the first packet transmission rule.

In a possible design, when the processor controls the transceiver to receive the second packet transmission rule from the session management network element or when the first user plane function network element receives the second packet transmission rule from the second user plane function network element, the generating, by the processor, a first packet transmission rule based on the first correspondence includes: generating the first packet transmission rule based on the first session identifier information and the second packet transmission rule.

In a possible design, when the terminal device is handed over from a second session channel of the second user plane function network element to the first session channel of the first user plane function network element, the second packet transmission rule includes second session identifier information, and the second session identifier information is used to indicate the second session channel before the terminal device is handed over; and the generating, by the processor, the first packet transmission rule based on the first session identifier information and the second packet transmission rule includes: replacing the second session identifier information in the second packet transmission rule with the first session identifier information, to generate the first packet transmission rule.

In a possible design, the transmitting, by the processor, an Ethernet packet to the terminal device based on the first correspondence includes: controlling the transceiver to receive a first Ethernet packet, where the first Ethernet packet includes the address of the terminal device; determining, based on the first correspondence, the first session identifier information corresponding to the address of the terminal device; and sending the first Ethernet packet to the terminal device through the first session channel indicated by the first session identifier information.

In a possible design, the controlling, by the processor, the transceiver to receive a first Ethernet packet includes: controlling the transceiver to receive the first Ethernet packet from the second user plane function network element.

In a possible design, the first session identifier information is a PDU session identifier or a TEID.

According to an eleventh aspect, this application further provides a session management network element. The session management network element has a function of implementing behavior of the session management network element in the method example according to the fourth aspect. The function may be implemented by hardware, or implemented by hardware executing corresponding software. The hardware or the software includes one or more modules corresponding to the foregoing function.

In a possible design, a structure of the session management network element includes a sending unit, a receiving unit, and a processing unit. These units may perform corresponding functions in the foregoing method example. For details, refer to detailed descriptions in the method example. Details are not described herein again.

In a possible design, a structure of the session management network element includes a transceiver and a processor, and optionally further includes a memory. The transceiver is configured to receive and send data, and is configured to communicate and interact with another device in a communications system. The processor is configured to support the session management network element in performing a corresponding function in the method according to the fifth aspect. The memory is coupled to the processor, and stores a program instruction and data that are necessary for the session management network element.

According to a twelfth aspect, this application further provides a first user plane function network element. The first user plane function network element has a function of implementing behavior of the first user plane function network element in the method example according to the fifth aspect. The function may be implemented by hardware, or implemented by hardware executing corresponding software. The hardware or the software includes one or more modules corresponding to the foregoing function.

In a possible design, a structure of the first user plane function network element includes a processing unit, and optionally further includes a sending unit and a receiving unit. These units may perform corresponding functions in the foregoing method example. For details, refer to detailed descriptions in the method example. Details are not described herein again.

In a possible design, a structure of the first user plane function network element includes a transceiver and a processor, and optionally further includes a memory. The transceiver is configured to receive and send data, and is configured to communicate and interact with another device in a communications system. The processor is configured to support the first user plane function network element in performing a corresponding function in the method according to the sixth aspect. The memory is coupled to the processor, and stores a program instruction and data that are necessary for the first user plane function network element.

According to a thirteenth aspect, this application further provides a second user plane function network element. The second user plane function network element has a function of implementing behavior of the second user plane function network element in the method example according to the sixth aspect. The function may be implemented by hardware, or implemented by hardware executing corresponding software. The hardware or the software includes one or more modules corresponding to the foregoing function.

In a possible design, a structure of the second user plane function network element includes a receiving unit, a sending unit, and a processing unit. These units may perform corresponding functions in the foregoing method example. For details, refer to detailed descriptions in the method example. Details are not described herein again.

In a possible design, a structure of the second user plane function network element includes a transceiver and a processor, and optionally further includes a memory. The transceiver is configured to receive and send data, and is configured to communicate and interact with another device in a communications system. The processor is configured to support the second user plane function network element in performing a corresponding function in the method according to the seventh aspect. The memory is coupled to the processor, and stores a program instruction and data that are necessary for the second user plane function network element.

According to a fourteenth aspect, this application further provides a second user plane function network element. The second user plane function network element has a function of implementing behavior of the second user plane function network element in the method example according to the seventh aspect. The function may be implemented by hardware, or implemented by hardware executing corresponding software. The hardware or the software includes one or more modules corresponding to the foregoing function.

In a possible design, a structure of the second user plane function network element includes a sending unit and a processing unit, and optionally further includes a receiving unit. These units may perform corresponding functions in the foregoing method example. For details, refer to detailed descriptions in the method example. Details are not described herein again.

In a possible design, a structure of the second user plane function network element includes a transceiver and a processor, and optionally further includes a memory. The transceiver is configured to receive and send data, and is configured to communicate and interact with another device in a communications system. The processor is configured to support the second user plane function network element in performing a corresponding function in the method according to the eighth aspect. The memory is coupled to the processor, and stores a program instruction and data that are necessary for the second user plane function network element.

According to a fifteenth aspect, this application further provides a system. The system includes a session management network element. The session management network element may be configured to perform the steps performed by the session management network element in any one of the methods according to the first aspect and the first aspect or any one of the methods according to the fourth aspect and the fourth aspect. In a possible design, the system may further include a first user plane function network element. The first user plane function network element may be configured to perform the steps performed by the first user plane function network element in any one of the methods according to the first aspect and the first aspect or any one of the methods according to the fourth aspect and the fourth aspect. In a possible design, the system may further include another device, such as a second user plane function network element, that interacts with the session management network element and/or the first user plane function network element in the solutions provided in the embodiments of this application.

According to a sixteenth aspect, this application further provides a system. The system includes a first user plane function network element. The first user plane function network element may be configured to perform the steps performed by the first user plane function network element in any one of the methods according to the second aspect and the second aspect or any one of the methods according to the third aspect and the third aspect or any one of the methods according to the fifth aspect and the fifth aspect. In a possible design, the system may further include a session management network element. The session management network element may be configured to perform the step performed by the session management network element in any one of the methods according to the second aspect or the second aspect or any one of the methods according to the third aspect or the third aspect or any one of the methods according to the fifth aspect or the fifth aspect. In a possible design, the system may further include another device, such as a second user plane function network element, that interacts with the session management network element and/or the first user plane function network element in the solutions provided in the embodiments of this application.

According to a seventeenth aspect, this application further provides a system. The system includes a second user plane function network element. The second user plane function network element may be configured to perform the step performed by the second user plane function network element in any one of the methods according to the sixth aspect or the sixth aspect or any one of the methods according to the seventh aspect or the seventh aspect. In a possible design, the system may further include a session management network element. The session management network element may be configured to perform the step performed by the session management network element in any one of the methods according to the seventh aspect or the seventh aspect or any one of the methods according to the eighth aspect or the eighth aspect. In a possible design, the system may further include a first user plane function network element. The first user plane function network element may be configured to perform the step performed by the first user plane function network element in any one of the methods according to the sixth aspect or the sixth aspect or any one of the methods according to the seventh aspect or the seventh aspect. In a possible design, the system may further include another device that interacts with one or more of the session management network element, the first user plane function network element, and the second user plane function network element in the solutions provided in the embodiments of this application.

According to an eighteenth aspect, this application further provides a computer storage medium. The computer storage medium stores a computer executable instruction, and when the computer executable instruction is invoked by the computer, the computer is enabled to perform any one of the foregoing methods.

According to a nineteenth aspect, this application further provides a computer program product including an instruction. When the computer program product is run on a computer, the computer is enabled to perform any one of the foregoing methods.

According to a twentieth aspect, this application further provides a chip. The chip is connected to a memory, and is configured to read and execute a program instruction stored in the memory, to implement any one of the foregoing methods.

DESCRIPTION OF EMBODIMENTS

The following further describes in detail this application with reference to the accompanying drawings.

Embodiments of this application provide a communication method and an apparatus, to flexibly determine a packet transmission rule, so that an Ethernet packet can be transmitted to a terminal device. The method and the apparatus in this application are based on a similar concept. The method and the apparatus have similar problem resolving principles. Therefore, for implementation of the apparatus and the method, mutual reference may be made. Details of repeated parts are not described again.

In the following, some terms in this application are explained and described, to help a person skilled in the art have a better understanding.

(1) A PDU session is a connection between a terminal device and a DN, for providing a PDU connectivity service. The connection may be of an IP, Ethernet, or unstructured data type. A PDU connection service supported by a core network is a service for providing PDU exchange between the terminal device and a DN determined by a DN identifier. The terminal device may establish a plurality of PDU sessions to connect to a same DN or different DNs. The terminal device may establish PDU sessions that are served by different user plane function network elements, to connect to a same DN. A session management network element and a user plane function network element still retain some information of a PDU session.

(2) A session channel is a channel, for example, a user plane data tunnel, used by a user plane function network element to transmit data that needs to be transmitted to a terminal device. The user plane function network element may transmit data to the terminal device through the session channel, for example, transmit an Ethernet packet to the terminal device. Optionally, the session channel may be but is not limited to a PDU session channel.

(3) In the descriptions of this application, terms such as "first" and "second" are merely used for distinction and description, and shall not be understood as an indication or implication of relative importance or an indication or implication of an order.

To describe the technical solutions in the embodiment of this application more clearly, the following describes in detail, with reference to the accompanying drawings, a communication method and an apparatus provided in the embodiments of this application.

Figure 1:
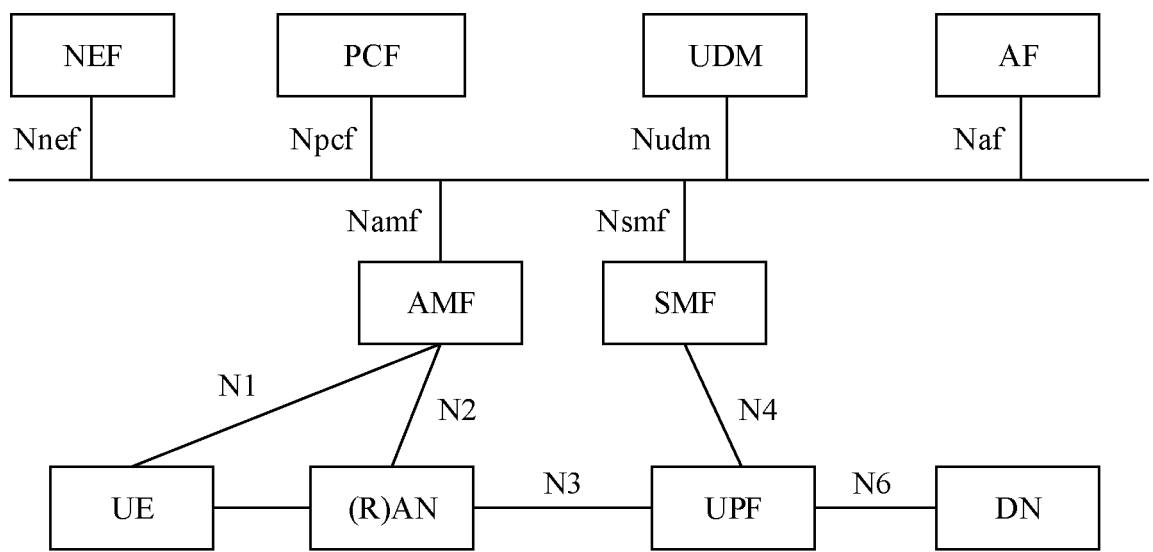
FIG. 1 is an architectural diagram of a communications system according to this application.

A possible architecture of a communications system used by a communication method provided in an embodiment of this application may include a network exposure function network element, a policy control function network element, a data management network element, an application function network element, a core network access and mobility management function network element, a session management function network element, a terminal device, an access network device, a user plane function network element, and a DN. FIG. 1 shows a possible example of the architecture of the communications system, which specifically includes: a network exposure function (NEF) network element, a policy control function (PCF) network element, a unified data management (UDM) network element, an application function (AF) network element, an access and mobility management function (AMF) network element, a session management function (SMF) network element, user equipment (UE), an access network (AN) device, a user plane function (UPF) network element, and a DN. The AMF network element may be connected to the terminal device over an N1 interface, the AMF may be connected to the AN device over an N2 interface, the AN device may be connected to the UPF over an N3 interface, the SMF may be connected to the UPF over an N4 interface, and the UPF may be connected to the DN over an N6 interface. An interface name is merely an example for description. This is not specifically limited in this embodiment of this application. It should be understood that this embodiment of this application is not limited to the communications system shown in FIG. 1. Names of the network elements shown in FIG. 1 are merely used as examples for description herein, and do not constitute limitations on the network elements included in the architecture of the communications system to which the method in this application is applicable. Functions of the network elements or the devices in the communications system are described in detail below.

The terminal device may also be referred to as UE, a mobile station (MS), a mobile terminal (MT), or the like, and is a device that provides voice and/or data connectivity to a user. For example, the terminal device may be a handheld device or a vehicle-mounted device that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. In FIG. 1, the terminal device is merely shown by using UE as an example, and is not limited thereto.

A radio access network (RAN) may be an AN shown in FIG. 1 and provide a wireless access service for the terminal device. The access network device is a device, in the communications system, that enables the terminal device to access a wireless network. The access network device is a node in the RAN, and may also be referred to as a base station, or may also be referred to as a RAN node (or device). Currently, for example, the access network device is a next-generation NodeB (gNB), a transmission reception point (TRP), an evolved NodeB (eNB), a radio network controller (RNC), a NodeB (NB), a base station controller (BSC), a base transceiver station (BTS), a home base station (for example, a home eNB or a home NB (HNB)), a baseband unit (BBU), or a WI-FI access point (AP).

The DN, such as the DN shown in FIG. 1, may be the Internet, an IP multimedia service (IMS) network, a regional network (namely, a local network, such as a mobile edge computing (MEC) network), or the like. The DN includes an application server (AS), and the AS provides a service for the terminal device by transmitting data to the terminal device.

A core network is configured to enable the terminal device to access a DN that can implement a service of the terminal device. The following describes functions of network elements in the core network.

The core network access and mobility management function network element may be configured to manage access control and mobility of the terminal device. In actual application, the core network access and mobility management function network element includes a mobility management function in a mobility management entity (MME) in a network framework in long term evolution (LTE), and includes an access management function. Specifically, the core network access and mobility management function network element may be responsible for registration of the terminal device, mobility management, a tracking area update procedure, reachability detection, selection of a session management function network element, mobility status transition management, and the like. For example, in 5G, the core network access and mobility management function network element may be an AMF network element, for example, as shown in FIG. 1. In future communications such as 6th generation (6G), the core network access and mobility management function network element may still be an AMF network element or have another name. This is not limited in this application. When the core network access and mobility management function network element is an AMF network element, the AMF may provide an Namf service.

The session management function network element may be responsible for session management (including session establishment, modification, and release) of the terminal device, selection and reselection of a user plane function network element, IP address assignment of the terminal device, quality of service (QoS) control, and the like. For example, in 5G, the session management function network element may be an SMF network element, for example, as shown in FIG. 1. In future communications such as 6G, the session management function network element may still be an SMF network element or have another name. This is not limited in this application. When the session management function network element is an SMF network element, the SMF may provide an Nsmf service.

The policy control function network element may be responsible for policy control decision-making, and providing functions such as detection, gating control, and QoS that are based on a service data flow and an application, and flow-based charging control. For example, in 5G, the policy control function network element may be a PCF network element, for example, as shown in FIG. 1. In future communications such as 6G, the policy control function network element may still be a PCF network element or have another name. This is not limited in this application. When the policy control function network element is a PCF network element, the PCF network element may provide an Npcf service.

A main function of the application function network element is to interact with a 3rd generation partnership project (3GPP) core network to provide a service, so as to affect service flow routing, access network capability exposure, policy control, and the like. For example, in 5G, the application function network element may be an AF network element, for example, as shown in FIG. 1. In future communications such as 6G, the application function network element may still be an AF network element or have another name. This is not limited in this application. When the application function network element is an AF network element, the AF network element may provide an Naf service.

The data management network element may be configured to manage subscription data of the terminal device, registration information related to the terminal device, and the like. For example, in 5G, the data management network element may be a UDM network element, for example, as shown in FIG. 1. In future communications such as 6G, the data management network element may still be a UDM network element or have another name. This is not limited in this application. When the data management network element is a UDM network element, the UDM network element may provide an Nudm service.

The network exposure function network element may be configured to enable the 3 GPP to securely provide network service capabilities and the like for an AF (for example, a services capability server (SCS) or an AS) of a third party. For example, in 5G, the network exposure function network element may be an NEF network element, for example, as shown in FIG. 1. In future communications such as 6G, the network exposure function network element may still be an NEF network element or have another name. This is not limited in this application. When the network exposure function network element is an NEF, the NEF may provide an Nnef service for another network function network element.

The user plane function network element may be configured to forward user plane data of the terminal device. Main functions include data packet routing and forwarding, mobility anchoring, supporting, by using an uplink classifier, routing of a service flow to the DN, supporting a multi-homing PDU session by using a branch point, and the like. For example, in 5G, the user plane function network element may be a UPF network element, for example, as shown in FIG. 1. In future communications such as 6G, the user plane function network element may still be a UPF network element or have another name. This is not limited in this application.

Each of the foregoing network elements in the core network may also be referred to as a function entity, and may be a network element implemented on dedicated hardware, or may be a software instance run on dedicated hardware, or an instance of a virtualization function on a proper platform. For example, the virtualization platform may be a cloud platform.

It should be noted that the architecture of the communications system shown in FIG. 1 is not limited to including only the network elements shown in the figure, and may further include another device not shown in the figure. Details are not described herein in this application one by one.

It should be noted that a distribution form of the network elements in the core network is not limited in this embodiment of this application. The distribution form shown in FIG. 1 is merely an example, and is not limited in this application.

For ease of description, subsequently the network element shown in FIG. 1 is used as an example for description in this application, and an XX network element is directly referred to as XX. It should be understood that names of all network elements in this application are merely used as examples, and may also be referred to as other names in future communications, or the network element in this application may be replaced with another entity or device that has a same function in future communications. This is not limited in this application. A unified description is provided herein, and details are not described later.

It should be noted that the communications system shown in FIG. 1 does not constitute a limitation on a communications system to which this embodiment of this application is applicable. The architecture of the communications system shown in FIG. 1 is a 5G system architecture. Optionally, the method in this embodiment of this application is further applicable to various future communications systems, for example, a 6G or another communications network.

Figure 2:
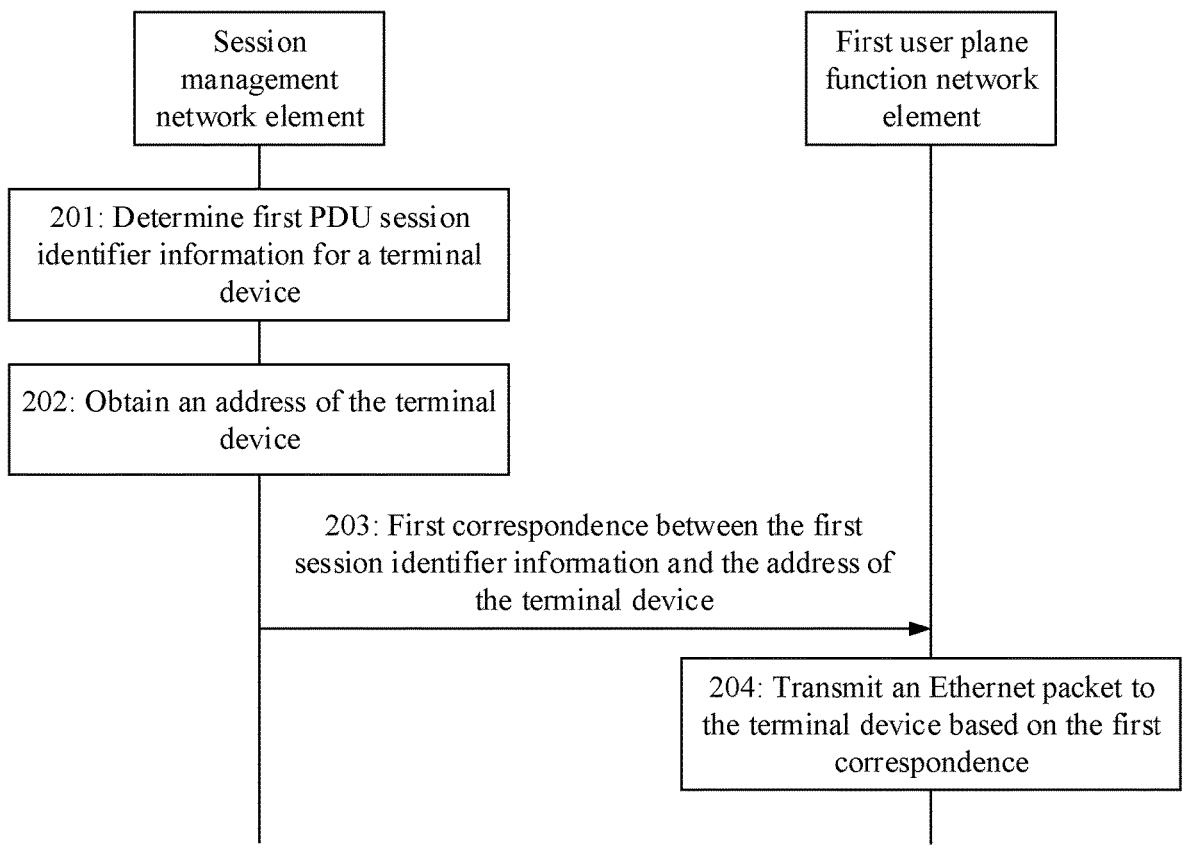
FIG. 2 is a flowchart of a communication method according to this application.

A communication method provided in an embodiment of this application is applicable to the communications system shown in FIG. 1. Referring to FIG. 2, a specific procedure of the method includes the following steps.

Step 201: A session management network element determines first session identifier information for a terminal device, where the first session identifier information is used to indicate a first session channel of a first user plane function network element.

The first session identifier information determined by the session management network element for the terminal device is the first session identifier information that is generated by the session management network element based on a PDU session establishment request after the session management network element receives the PDU session establishment request from the terminal device. Optionally, the generating, by the session management network element, the first session identifier information based on the PDU session establishment request may be: allocating, by the session management network element, the first session identifier information to a requested PDU session.

Optionally, the first session identifier information may be a PDU session identifier or a TEID. Optionally, when the first session identifier information is a TEID, the first session identifier information may be an identifier of a tunnel (which may also be referred to as a PDU tunnel identifier) between the first user plane function network element and an access network device that is currently serving the terminal device. For example, the first session identifier information may be a tunnel identifier of an N3 interface between the first user plane function network element and the access network device. Certainly, in addition to the possible identifiers of the first session identifier information that are listed above, the first PDU session identifier may be another identifier. This is not limited in this application.

Step 202: The session management network element obtains an address of the terminal device.

The address of the terminal device may be a MAC address (also referred to as a physical address or a hardware address) or the like. Certainly, in a future communications system, the address of the terminal device may alternatively be a plurality of other addresses, which are not listed one by one herein in this application.

In an optional implementation, the session management network element may obtain the address of the terminal device in the following two manners:

Manner a1: The session management network element receives a first message from the terminal device, where the first message is used to request to establish a PDU session, and the first message includes the address of the terminal device.

Manner a2: The session management network element obtains the address of the terminal device from a second user plane function network element, where the terminal device is handed over from the second user plane function network element to the first user plane function network element.

In Manner a1, the first message is the PDU session establishment request in step 201. Optionally, when the terminal device works in a bridge mode, to be specific, one or more other devices are connected to a network by using the terminal device, the first message may further include addresses of the one or more other devices, which may be, for example, a MAC address list. The MAC address list includes the MAC address of each of the one or more other devices. In this way, subsequently, the terminal device may forward, to the one or more other devices, an Ethernet packet that is to be sent to the one or more other devices.

In an optional implementation, in Manner a2, the terminal device is handed over from the second plane network element to the first user plane function network element. The second user plane function network element retains related information of the PDU session established by the terminal device. Optionally, when the terminal device is handed over from a second session channel of the second user plane function network element to the first session channel of the first user plane function network element, the session management network element may obtain the address of the terminal device from the second user plane function network element by using, but not limited to, the following two methods:

Method b1: The session management network element sends second session identifier information to the second user plane function network element, and receives the address of the terminal device from the second user plane function network element, where the second session identifier information corresponds to the address of the terminal device, and the second session identifier information indicates the second session channel before the terminal device is handed over.

Method b2: The session management network element receives the address of the terminal device that corresponds to the second session identifier information and that is reported by the second user plane function network element.

In an optional implementation, in Method b1, when the session management network element sends the second session identifier information to the second user plane function network element, and receives the address of the terminal device from the second user plane function network element, there may be the following two specific methods:

Method c1: The session management network element sends a second message to the second user plane function network element, where the second message is used to request a second packet transmission rule, the second message includes the second session identifier information, and the second packet transmission rule includes the address of the terminal device; and the session management network element receives the second packet transmission rule corresponding to the second session identifier information from the second user plane function network element.

Optionally, in Method c1, after receiving the second packet transmission rule, the session management network element may obtain the address of the terminal device from the second packet transmission rule.

Optionally, in Method c1, after receiving the second message, the second user plane function network element searches, based on the second session identifier information in the second message, for the second packet transmission rule corresponding to the second session identifier information.

Method c2: The session management network element sends a third message to the second user plane function network element, where the third message is used to request the address of the terminal device; and the session management network element receives the address of the terminal device that corresponds to the second session identifier information from the second user plane function network element.

In an optional implementation, in Method c1 or c2, before the session management network element sends the second message or the third message to the second user plane function network element, the session management network element receives a handover request from a core network access and mobility management function network element, where the handover request is sent by a second access network device currently accessed by the terminal device to the core network access and mobility management function network element after the terminal device is handed over from a first access network device to the second access network device.

In an optional implementation, in Method c1, after the session management network element receives the second packet transmission rule corresponding to the second session identifier information from the second user plane function network element, the session management network element may send a fourth message to the second user plane function network element, where the fourth message is used to instruct the second user plane function network element to delete the second packet transmission rule. In this way, resources occupied by the second user plane function network element can be reduced.

In an optional implementation, in Method b2, the second user plane function network element actively reports the address of the terminal device to the session management network element. Optionally, the second user plane function network element actively reports, to the session management network element, one or more addresses of the terminal device that are to be obtained, and the session management network element may obtain, based on the second session identifier information, from the one or more addresses of the terminal device that are to be obtained, the address of the terminal device that corresponds to the second session identifier information.

It may be understood that, there is no sequence between step 201 and step 202.

Step 203: The session management network element sends a first correspondence between the first session identifier information and the address of the terminal device to the first user plane function network element.

It may be understood that, the first correspondence may be information in any form, and is used to indicate a correspondence between the first session identifier information and the address of the terminal device.

In an optional implementation, a specific method for sending, by the session management network element, the first correspondence between the first session identifier information and the address of the terminal device to the first user plane function network element may be: generating, by the session management network element, a first packet transmission rule based on the first session identifier information and the address of the terminal device, where the first packet transmission rule includes the first correspondence; and then sending, by the session management network element, the first packet transmission rule to the first user plane function network element. In this way, the session management network element may send the first correspondence to the first user plane function network element according to the first packet transmission rule.

In an optional implementation, when the session management network element receives the second packet transmission rule corresponding to the second session identifier information from the second user plane function network element, where the second packet transmission rule includes the address of the terminal device, and the session management network element sends the first packet transmission rule to the first user plane function network element, the generating, by the session management network element, a first packet transmission rule based on the first session identifier information and the address of the terminal device may be: generating, by the session management network element, the first packet transmission rule based on the first session identifier information and the second packet transmission rule.

Optionally, the generating, by the session management network element, the first packet transmission rule based on the first session identifier information and the second packet transmission rule may be specifically that: the second packet transmission rule further includes the second session identifier information (for example, the second packet transmission rule may directly include a second correspondence between the address of the terminal device and the second session identifier information), and the session management network element replaces the second session identifier information in the second packet transmission rule with the first session identifier information, to generate the first packet transmission rule; or the session management network element obtains the terminal device from the second packet transmission rule, and generates the first packet transmission rule based on the address of the terminal device and the first session identifier information.

In an optional implementation, when the session management network element receives the second packet transmission rule corresponding to the second session identifier information from the second user plane function network element, the sending, by the session management network element, a first correspondence between the first session identifier information and the address of the terminal device to the first user plane function network element may be: sending, by the session management network element, the first PDU session identifier information and the second packet transmission rule to the first user plane function network element.

Optionally, the first correspondence may exist in a form of a list, and the first session identifier information in the list corresponds to the address of the terminal device. To be specific, the first correspondence may indicate only that the first session identifier information corresponds to the address of the terminal device. The first correspondence may exist in another form. This is not limited in this application.

Optionally, in addition to the first session identifier information and the address of the terminal device, the first correspondence may further include other information, for example, may include a rule for binding the first session identifier information and the address of the terminal device; for another example, may further include a rule for determining the first session identifier information based on the address of the terminal device. This is not limited in this application.

Step 204: The first user plane function network element transmits an Ethernet packet to the terminal device based on the first correspondence.

In an optional implementation, when that the first user plane function network element receives the first correspondence between the first session identifier information and the address of the terminal device from the session management network element is that the first user plane function network element receives the first packet transmission rule from the session management network element, where the first packet transmission rule includes the first correspondence, the transmitting, by the first user plane function network element, an Ethernet packet to the terminal device based on the first correspondence may be: transmitting, by the first user plane function network element, the Ethernet packet to the terminal device according to the first packet transmission rule.

The first packet transmission rule may further include instruction information for transmitting the Ethernet packet by the first user plane function network element, to instruct the first user plane function network element how to transmit the Ethernet packet.

Optionally, the first user plane function network element generates the first packet transmission rule, for example, an uplink-downlink Ethernet packet forwarding rule or an Ethernet packet filtering policy, based on the first correspondence, a DN connected to the terminal device, and locally configured policy information.

In an optional implementation, a specific method for transmitting, by the first user plane function network element, the Ethernet packet to the terminal device based on the first correspondence may be: generating, by the first user plane function network element, the first packet transmission rule based on the first correspondence, and transmitting, by the first user plane function network element, the Ethernet packet to the terminal device according to the first packet transmission rule, where the first packet transmission rule includes the first correspondence.

In an optional implementation, when the first user plane function network element receives the first correspondence between the first session identifier information and the address of the terminal device from the session management network element, the first user plane function network element receives the first session identifier information and the second packet transmission rule from the session management network element, where the second packet transmission rule includes the address of the terminal device; and the generating, by the first user plane function network element, the first packet transmission rule based on the first correspondence may be specifically: generating, by the first user plane function network element, the first packet transmission rule based on the first session identifier information and the address of the terminal device in the second packet transmission rule.

In an optional implementation, when the second packet transmission rule further includes the second session identifier information, the generating, by the first user plane function network element, the first packet transmission rule based on the first session identifier information and the address of the terminal device in the second packet transmission rule may be: replacing, by the first user plane function network element, the second session identifier information in the second packet transmission rule with the first session identifier information, to generate the first packet transmission rule.

Optionally, the first user plane function network element stores the first packet transmission rule after generating the first packet transmission rule, to directly use the first packet transmission rule subsequently.

In an optional implementation, a method for transmitting, by the first user plane function network element, the Ethernet packet to the terminal device based on the first correspondence may be receiving, by the first user plane function network element, a first Ethernet packet, where the first Ethernet packet includes the address of the terminal device, and optionally, the first Ethernet packet is from a DN; determining, by the first user plane function network element based on the first correspondence, the first session identifier information corresponding to the address of the terminal device; and sending, by the first user plane function network element, the first Ethernet packet to the terminal device through the first session channel indicated by the first session identifier information.

Optionally, the transmitting, by the first user plane function network element, an Ethernet packet to the terminal device based on the first packet transmission rule is specifically: after the first user plane function network element receives the first Ethernet packet, searching, by the first user plane function network element based on the address of the terminal device, the first packet transmission rule for the first correspondence, and determining the first session identifier information corresponding to the address of the terminal device in the first correspondence; and sending the first Ethernet packet to the terminal device through the first session channel indicated by the first session identifier information.

Optionally, when the address of the terminal device is obtained in Manner a1 in step 202, and the terminal device works in the bridge mode, the first correspondence may include the addresses of the one or more other devices connected to the terminal device. Further, when the first user plane function network element receives a second Ethernet packet, but the second Ethernet packet includes an address of any other device, the first user plane function network element may search the first transmission rule for the first correspondence based on the address of the any other device, then determine the address of the terminal device in the first correspondence, further determine the first session identifier information corresponding to the address of the terminal device, and finally send the second Ethernet packet to the terminal device through the first session channel indicated by the first session identifier information. In this case, after the terminal device receives the second Ethernet packet, when the terminal device identifies that a destination address of the second Ethernet packet is the any other device, the terminal device forwards the second Ethernet packet to the any other device.

In an optional implementation, when the first user plane function network element sends the first Ethernet packet (or the second Ethernet packet or the like) to the terminal device through the first session channel, the first user plane function network element first sends, through the first session channel, the first Ethernet packet (or the second Ethernet packet or the like) to the access network device serving the terminal device, and then the access network device sends the first Ethernet packet (or the second Ethernet packet or the like) to the terminal device. It should be understood that, a subsequent related process in which the first user plane function network element sends the first Ethernet packet (or the second Ethernet packet or the like) to the terminal device through the first session channel may be understood as the foregoing process. The subsequent related process is not described in detail again.

According to the communication method provided in this embodiment of this application, after determining the first session identifier information for the terminal device and obtaining the address of the terminal device, the session management network element sends the first correspondence between the first session identifier information and the address of the terminal device to the first user plane function network element, so that the first user plane function network element transmits the Ethernet packet to the terminal device based on the first correspondence. According to the foregoing method, the Ethernet packet that needs to be transmitted to the terminal device can be accurately and successfully transmitted to the terminal device.

Figure 3:
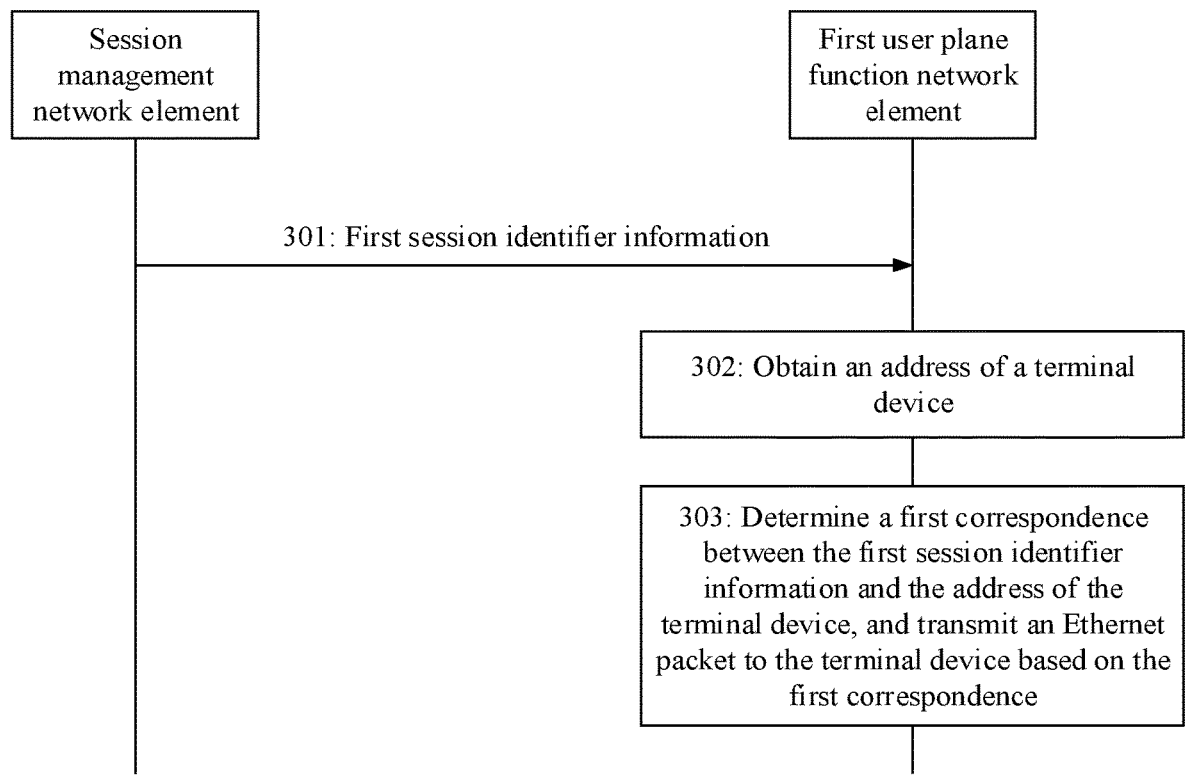
FIG. 3 is a flowchart of another communication method according to this application.

An embodiment of this application further provides another communication method, applicable to the communications system shown in FIG. 1. Referring to FIG. 3, a specific procedure of the method may include the following steps.

Step 301: A first user plane function network element receives first session identifier information from a session management network element, where the first session identifier information is used to indicate a first session channel of the first user plane function network element.

Optionally, for related descriptions of the first session identifier information, refer to the descriptions of step 201. Repeated parts are not described in detail herein again.

In an optional implementation, the receiving, by a first user plane function network element, the first session identifier information from the session management network element may be specifically: after receiving a PDU session establishment request from a terminal device, generating, by the session management network element, the first session identifier information based on the PDU session establishment request, and then sending, by the session management network element, the first session identifier information to the first user plane function network element. Optionally, the generating, by the session management network element, the first session identifier information based on the PDU session establishment request may be: allocating, by the session management network element, the first session identifier information to a requested PDU session.

Step 302: The first user plane function network element obtains an address of the terminal device, where the address of the terminal device is a MAC address.

In an optional implementation, the first user plane function network element may obtain the address of the terminal device in the following three manners:

Manner d1: The first user plane function network element receives a third Ethernet packet from the terminal device, and obtains the address of the terminal device that is included in the third Ethernet packet, where the third Ethernet packet is sent by the terminal device to the first user plane function network element through the first session channel.

Manner d2: The first user plane function network element receives a second packet transmission rule from the session management network element, where the second packet transmission rule includes the address of the terminal device, and the terminal device is handed over from a second user plane function network element to the first user plane function network element.

Manner d3: The first user plane function network element receives a second packet transmission rule from a second user plane function network element, where the second packet transmission rule includes the address of the terminal device.

In an optional implementation, after obtaining the second packet transmission rule by using the foregoing method, the first user plane function network element may obtain the address of the terminal device from the second packet transmission rule. In this way, the first user plane function network element can obtain the address of the terminal device.

Optionally, in a scenario in which Manner d1 is used, when the session management network element generates the first session identifier information, the first session channel already exists. When receiving the third Ethernet packet, the first user plane function network element identifies that the third Ethernet packet is sent by the terminal device to the first user plane function network element through the first session channel. It may be learned that the first session channel is established for the terminal device. In this case, the address of the terminal device that is included in the third Ethernet packet can be obtained, to generate the first packet transmission rule subsequently.

Optionally, when the terminal device works in a bridge mode, the third Ethernet packet may also include addresses of one or more other devices. For details, refer to the descriptions of the addresses of the one or more other devices that are included in the first message in Manner a1 in step 202 in the embodiment shown in FIG. 2. Details are not described herein again.

In an optional implementation, in Manner d2, before sending the second packet transmission rule to the first user plane function network element, the session management network element needs to first obtain the second packet transmission rule. For a specific method, refer to related descriptions of obtaining, by the session management network element, the second packet transmission rule by using the second message in Method c1 in the embodiment shown in FIG. 2. Repeated parts are not described in detail herein again.

In an optional implementation, in Manner d3, the receiving, by the first user plane function network element, the second packet transmission rule from the second user plane function network element may be: receiving, by the first user plane function network element, the second packet transmission rule through a forwarding channel between the second user plane function network element and the first user plane function network element.

Optionally, the forwarding channel is established by the session management network element for the first user plane function network element and the second user plane function network element. A specific establishment process may be that: the session management network element sends a fifth message to the first user plane function network element, where the fifth message is used to request to establish the forwarding channel; the first user plane function network element sends a sixth message to the session management network element, where the sixth message carries a first channel identifier of the first user plane function network element, and the first channel identifier is used to indicate a channel for data receiving by the first user plane function network element; the session management function network element sends the first channel identifier of the first user plane function network element to the second user plane function network element; and the second user plane function network element returns a second channel identifier of the second user plane function network element to the session management function network element, where the second channel identifier is used to indicate a channel for data receiving by the second user plane function network element, so that the session management network element sends the second channel identifier to the first user plane function network element. The forwarding channel is established between the first user plane function network element and the second user plane function network element by using the foregoing method. The second user plane function network element determines that the channel indicated by the first channel identifier is the forwarding channel between the second user plane function network element and the first user plane function network element, and the second user plane function network element may send data, for example, the second packet transmission rule, to the first user plane function network element through the forwarding channel.

Step 303: The first user plane function network element determines a first correspondence between the first session identifier information and the address of the terminal device, and transmits an Ethernet packet to the terminal device based on the first correspondence.

In an optional implementation, the transmitting, by the first user plane function network element, an Ethernet packet to the terminal device based on the first correspondence includes: generating, by the first user plane function network element, a first packet transmission rule based on the first correspondence, and transmitting, by the first user plane function network element, the Ethernet packet to the terminal device according to the first packet transmission rule.

In an optional implementation, when the first user plane function network element receives the second packet transmission rule from the session management network element or when the first user plane function network element receives the second packet transmission rule from the second user plane function network element, the generating, by the first user plane function network element, a first packet transmission rule based on the first correspondence may include: generating the first packet transmission rule based on the first session identifier information and the second packet transmission rule.

In an optional implementation, when the second packet transmission rule includes second session identifier information, where the second session identifier information is used to indicate a second session channel before the terminal device is handed over, the generating, by the first user plane function network element, the first packet transmission rule based on the first session identifier information and the second packet transmission rule includes: replacing, by the first user plane function network element, the second session identifier information in the second packet transmission rule with the first session identifier information, to generate the first packet transmission rule. In this case, the terminal device is handed over from the second session channel of the second user plane function network element to the first session channel of the first user plane function network element.

In an optional implementation, a specific method may be: receiving, by the first user plane function network element, a first Ethernet packet, where the first Ethernet packet includes the address of the terminal device; determining, by the first user plane function network element based on the first correspondence, the first session identifier information corresponding to the address of the terminal device; and sending, by the first user plane function network element, the first Ethernet packet to the terminal device through the first session channel indicated by the first session identifier information.

Optionally, for a specific method for generating, by the first user plane function network element, the first packet transmission rule based on the first correspondence, and transmitting the Ethernet packet to the terminal device according to the first packet transmission rule, refer to related content in the foregoing embodiment. Details are not described herein again.

Optionally, the first user plane function network element may receive the first Ethernet packet from a DN, or the first user plane function network element may receive the first Ethernet packet from the second user plane function network element. When the first user plane function network element receives the first Ethernet packet from the second user plane function network element, the first user plane function network element receives the first Ethernet packet from the second user plane function network element through the forwarding channel. Optionally, the forwarding channel is the same as the forwarding channel for receiving the second packet transmission rule from the second user plane by the first user plane network element in step 302. For details, refer to the foregoing related descriptions. Details are not described herein again.

In an optional implementation, when a manner of obtaining the address of the terminal device is Manner d1 in step 302, and the terminal device works in the bridge mode, the first correspondence may further include the addresses of the one or more other devices connected to the terminal device. Optionally, a subsequent operation procedure after the first user plane network element receives the second Ethernet packet is the same as the content in step 204 in the foregoing embodiment, and mutual reference may be made. Details are not described herein again.

According to the communication method provided in this embodiment of this application, after receiving the first session identifier information from the session management network element, and obtaining the address of the terminal device, the first user plane function network element determines the first correspondence between the first session identifier information and the address of the terminal device, and transmits the Ethernet packet to the terminal device based on the first correspondence. According to the foregoing method, the Ethernet packet that needs to be transmitted to the terminal device can be accurately and successfully transmitted to the terminal device.

Figure 4:
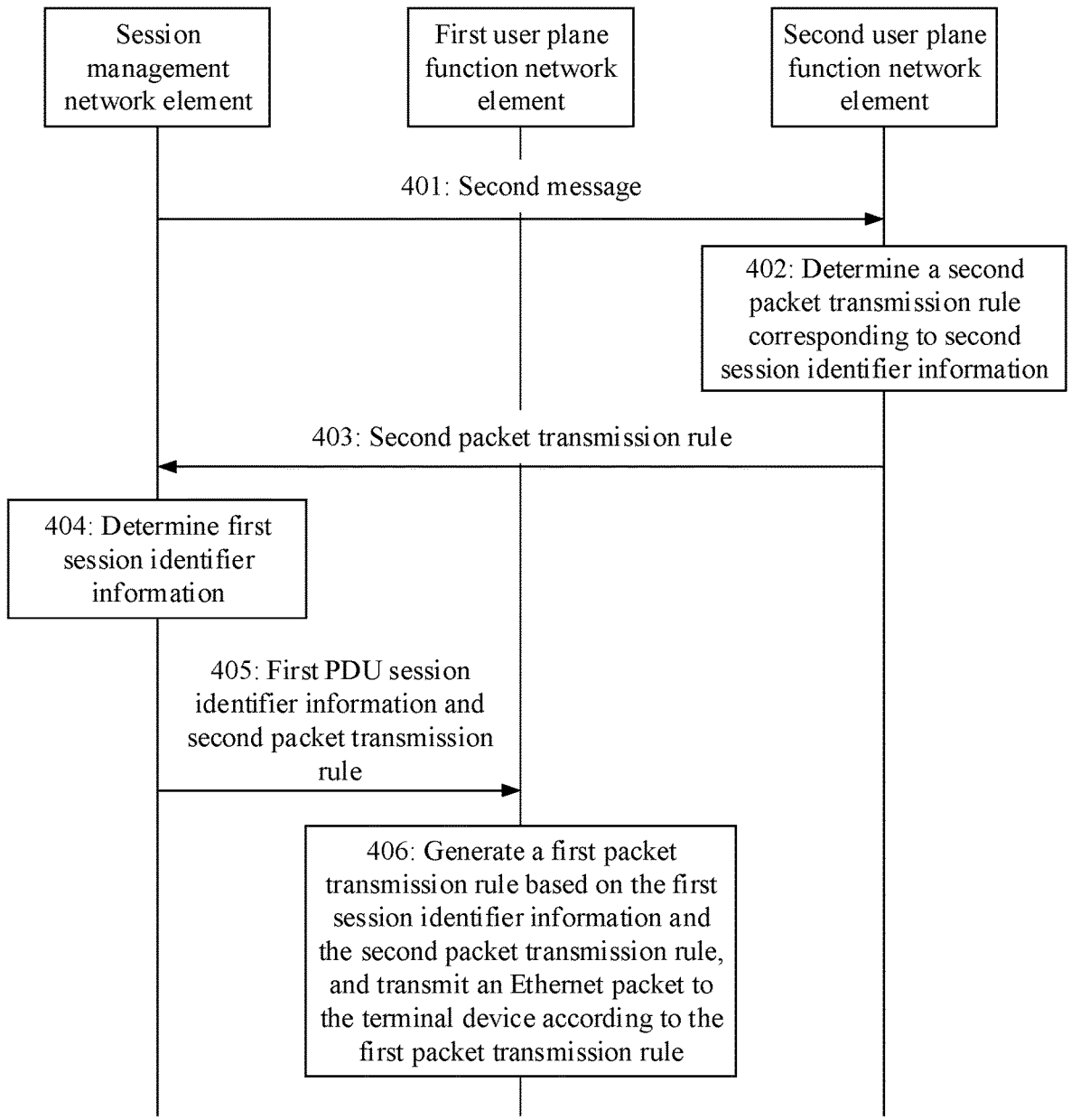
FIG. 4 is a flowchart of another communication method according to this application.

An embodiment of this application further provides another communication method, applicable to the communications system shown in FIG. 1. Referring to FIG. 4, a specific procedure of the method may include the following steps.

Step 401: A session management network element sends a second message to a second user plane function network element, where the second message is used to request a second packet transmission rule, the second message includes second session identifier information, the second session identifier information is used to indicate a second session channel of the second user plane function network element, and the second packet transmission rule includes a second correspondence between an address of a terminal device and the second session identifier information.

For detailed descriptions of step 401, refer to related detailed descriptions of Method c1 in the foregoing embodiment. Repeated parts are not described in detail herein again.

For related descriptions of the first session identifier information, also refer to related content in the foregoing embodiment. Details are not described herein again.

Step 402: The second user plane function network element determines the second packet transmission rule corresponding to the second session identifier information.

Optionally, before the terminal device is handed over from a first user plane network element to the second user plane function network element, the second user plane function network element provides a PDU session service for the terminal device. Therefore, the second user plane function network element stores the second packet transmission rule. Therefore, the second user plane function network element may find the second packet transmission rule based on the second session identifier information.

Step 403: The second user plane function network element sends the second packet transmission rule to the session management network element, so that the session management network element sends the second packet transmission rule to the first user plane function network element.

Step 404: The session management network element determines first session identifier information, where the first session identifier information is used to indicate a first session channel of the first user plane function network element, and the terminal device is handed over from the second user plane function network element to the first user plane function network element.

Step 405: The session management network element sends the first session identifier information and the second packet transmission rule to the first user plane function network element.

In an optional implementation, after sending the second packet transmission rule and the first session identifier information to the first user plane function network element, the session management network element further sends a fourth message to the second user plane function network element, where the fourth message is used to instruct the second user plane function network element to delete the second packet transmission rule.

Step 406: The first user plane function network element generates a first packet transmission rule based on the first session identifier information and the second packet transmission rule, and transmits an Ethernet packet to the terminal device according to the first packet transmission rule.

Optionally, for a specific method for generating, by the first user plane function network element, the first packet transmission rule based on the first session identifier information and the second packet transmission rule, refer to the method in the foregoing embodiment. Details are not described herein again.

In an optional implementation, after generating the first packet transmission rule, the first user plane function network element may further perform the following operations: receiving, by the first user plane function network element, a first Ethernet packet, where the first Ethernet packet includes the address of the terminal device; determining, by the first user plane function network element according to the first packet transmission rule, the first session identifier information corresponding to the address of the terminal device; and sending, by the first user plane function network element, the first Ethernet packet to the terminal device through the first session channel indicated by the first session identifier information.

Optionally, the receiving, by the first user plane function network element, a first Ethernet packet may be specifically: receiving, by the first user plane function network element, the first Ethernet packet sent by a DN; or may be: receiving, by the first user plane function network element, the first Ethernet packet from the second user plane function network element, which may be specifically: after receiving the first Ethernet packet from the DN, sending, by the second user plane function network element, the first Ethernet packet to the first user plane function network element.

In an optional implementation, the receiving, by the first user plane function network element, the first Ethernet packet from the second user plane function network element may be specifically: receiving, by the first user plane function network element, the first Ethernet packet that is sent by the second user plane function network element through a forwarding channel, where the forwarding tunnel is a channel established by the session management network element and used for data transmission between the first user plane function network element and the second user plane function network element. Optionally, for establishment of the forwarding channel, refer to related content in step 302 in the foregoing embodiment. Repeated parts are not described in detail herein again.

According to the communication method provided in this embodiment of this application, after obtaining the first session identifier information and the second packet transmission rule from the session management network element, the first user plane function network element generates the first packet transmission rule based on the second packet transmission rule and the first session identifier information, and transmits the Ethernet packet to the terminal device according to the first packet transmission rule. According to the foregoing method, the Ethernet packet that needs to be transmitted to the terminal device can be accurately and successfully transmitted to the terminal device.

Figure 5:
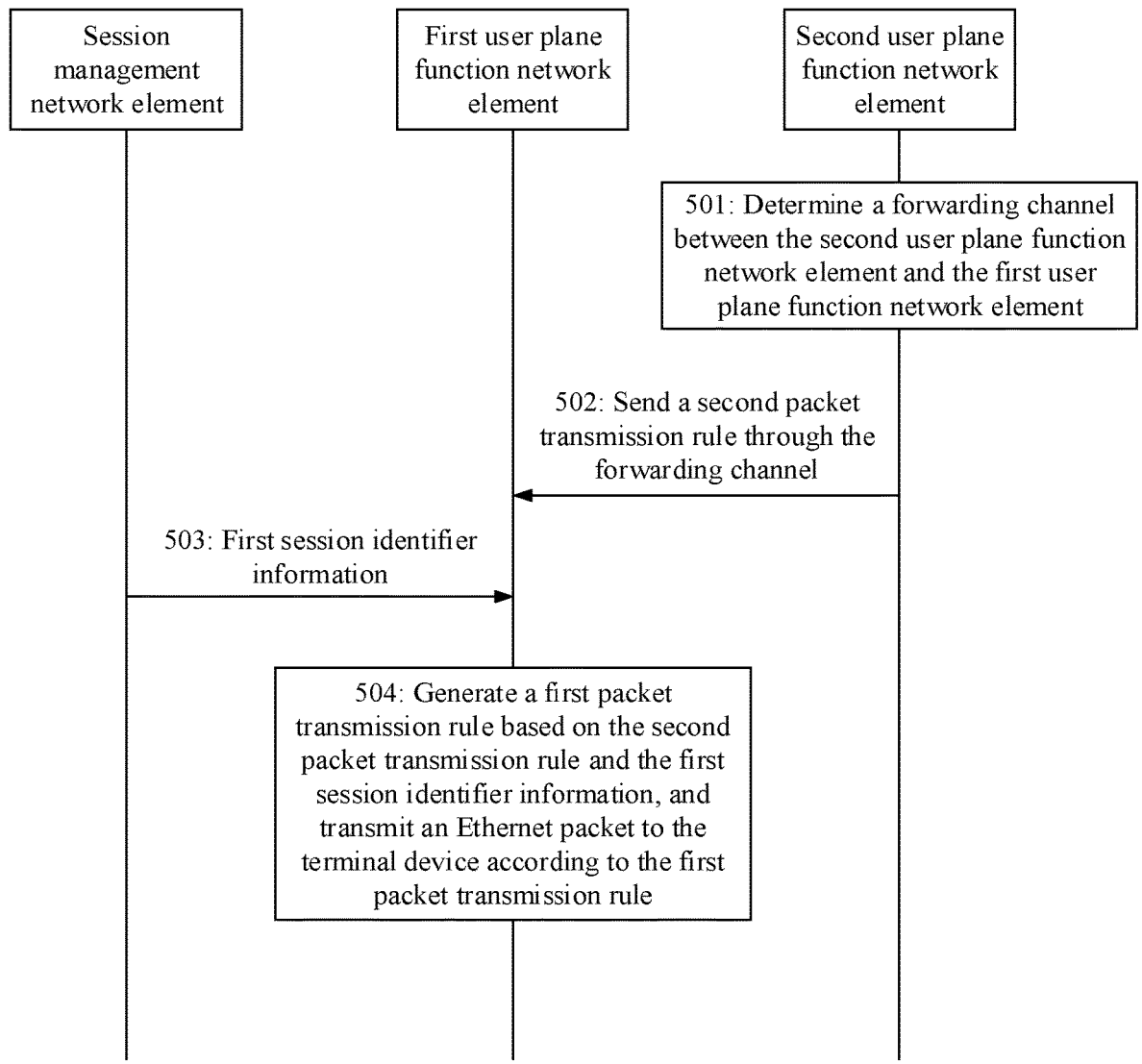
FIG. 5 is a flowchart of another communication method according to this application.

An embodiment of this application further provides another communication method, applicable to the communications system shown in FIG. 1. Referring to FIG. 5, a specific procedure of the method may include the following steps.

Step 501: A second user plane function network element determines a forwarding channel between the second user plane function network element and a first user plane function network element.

A terminal device is handed over from the second user plane function network element to the first user plane function network element.

In an optional implementation, a specific method for determining, by the second user plane function network element, the forwarding channel between the second user plane function network element and the first user plane function network element may be specifically: receiving, by the second user plane function network element, a first channel identifier of the first user plane function network element from a session management network element, where the first channel identifier is used to indicate a channel for data receiving by the first user plane function network element; and determining, by the second user plane function network element, that the channel indicated by the first channel identifier is the forwarding channel between the second user plane function network element and the first user plane function network element.

For a process of establishing the forwarding channel between the first user plane function network element and the second user plane function network element, refer to related descriptions in step 302 in the foregoing embodiment. Details are not described herein again.

Step 502: The second user plane function network element sends a second packet transmission rule to the first user plane function network element through the forwarding channel, where the second packet transmission rule includes an address of the terminal device.

Step 503: The first user plane function network element receives first session identifier information from the session management network element.

In an optional implementation, before the first user plane function network element receives the first session identifier information from the session management network element, the session management network element needs to determine the first session identifier information. Optionally, for related descriptions of determining the first session identifier information by the session management network element, refer to related content of determining the first session identifier information by the session management network element in the foregoing embodiment. Details are not described herein again.

Step 504: The first user plane function network element generates a first packet transmission rule based on the second packet transmission rule and the first session identifier information, and transmits an Ethernet packet to the terminal device according to the first packet transmission rule.

Optionally, for a specific method for generating, by the first user plane function network element, the first packet transmission rule based on the first session identifier information and the second packet transmission rule, refer to the method in the foregoing embodiment. Details are not described herein again.

In an optional implementation, after generating the first packet transmission rule, the first user plane function network element may further perform the following operations: receiving, by the first user plane function network element, a first Ethernet packet, where the first Ethernet packet includes the address of the terminal device; determining, by the first user plane function network element according to the first packet transmission rule, the first session identifier information corresponding to the address of the terminal device; and sending, by the first user plane function network element, the first Ethernet packet to the terminal device through the first session channel indicated by the first session identifier information.

Optionally, the receiving, by the first user plane function network element, the first Ethernet packet may be specifically: receiving, by the first user plane function network element, the first Ethernet packet from the second user plane function network element. The receiving, by the first user plane function network element, the first Ethernet packet from the second user plane function network element may be specifically: receiving, by the first user plane function network element, the first Ethernet packet that is sent by the second user plane function network element through the forwarding channel.

According to the communication method provided in this embodiment of this application, the second user plane function network element sends the second packet transmission rule to the first user function network element through the determined forwarding channel; and after receiving the first session identifier information from the session management network element, the first user plane function network element generates the first packet transmission rule based on the second packet transmission rule and the first session identifier information, and transmits the Ethernet packet to the terminal device according to the first packet transmission rule. According to the foregoing method, the Ethernet packet that needs to be transmitted to the terminal device can be accurately and successfully transmitted to the terminal device.

It should be noted that, in the foregoing embodiment, the first user plane function network element is a user plane function network element currently serving the terminal device. Optionally, the first user plane function network element may be a user plane function network element accessed by the terminal device after the terminal device joins a new network. The first user plane function network element may alternatively be a user plane function network element to which the terminal device is handed over from the second user plane function network element. The second user plane function network element is a user plane function network element originally serving the terminal device.

It should be noted that a sequence and a combination of the steps in the communication method described in the foregoing embodiment are not limited. In the foregoing embodiment, a combination of steps for successfully transmitting the Ethernet packet to the terminal device may be used as the protection scope of this embodiment of this application. Possible combination cases are not listed one by one herein.

Based on the foregoing embodiments, a packet transmission method provided in embodiments of this application is described in detail below by using specific examples, for example, embodiments shown in FIG. 6 to FIG. 17A and FIG. 17B below. In the following examples, an example in which a user plane function network element is a UPF, a session management network element is an SMF, a terminal device is UE, a mentioned address is a MAC address, and a DN is used for description.

Figure 6:
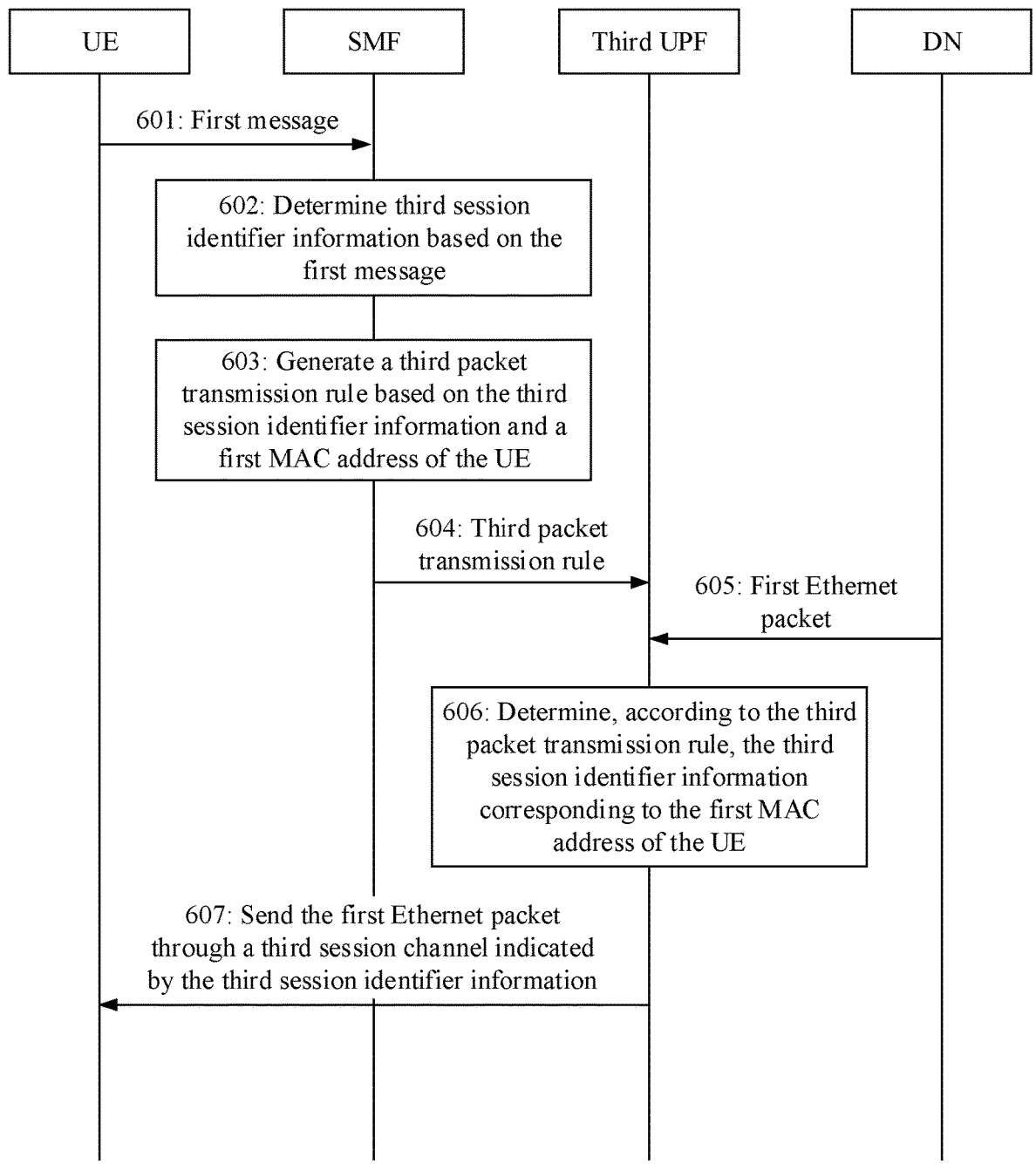
FIG. 6 is a flowchart of an example of a communication method according to this application.
Figure 7:
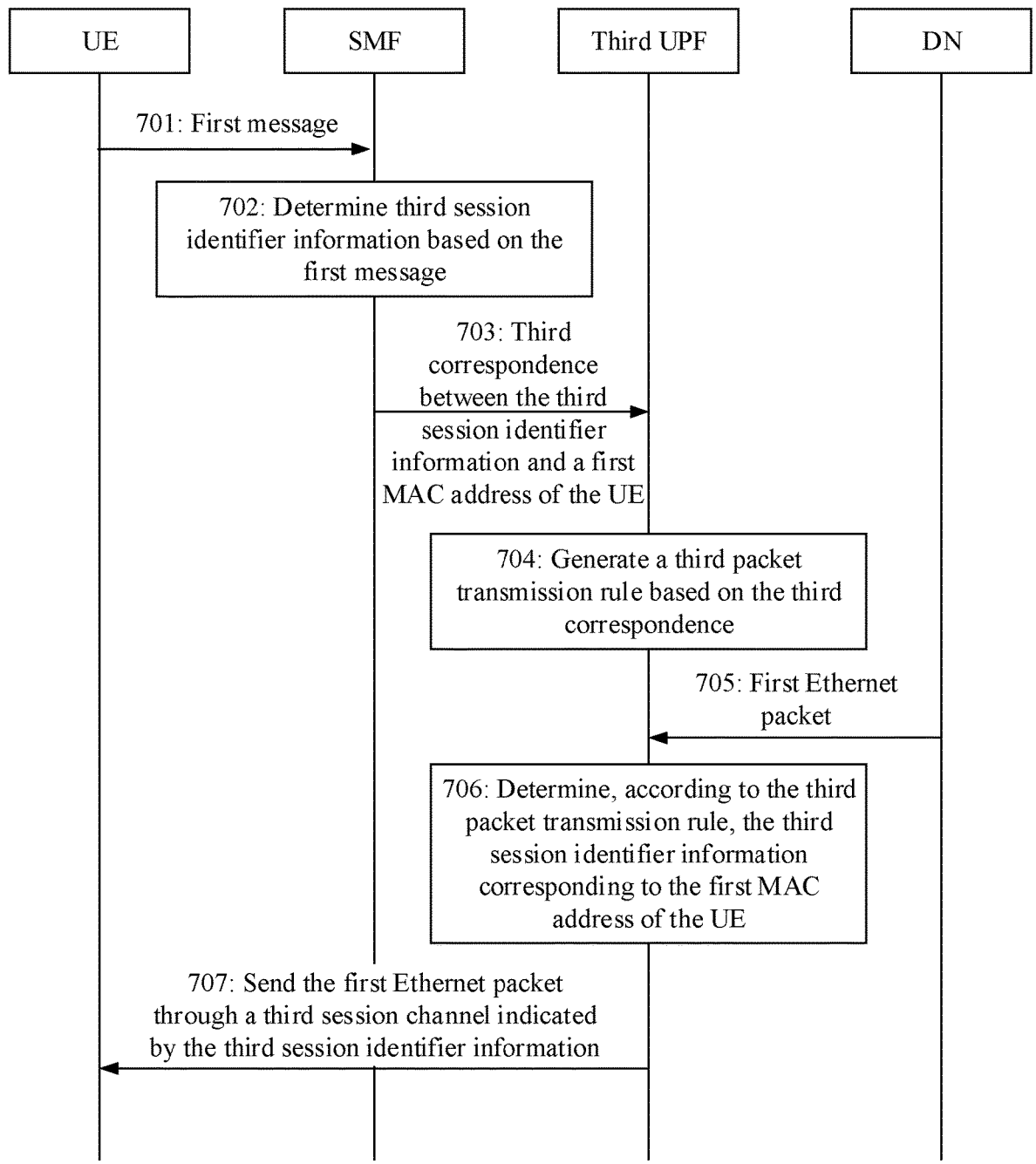
FIG. 7 is a flowchart of an example of another communication method according to this application.
Figure 8:
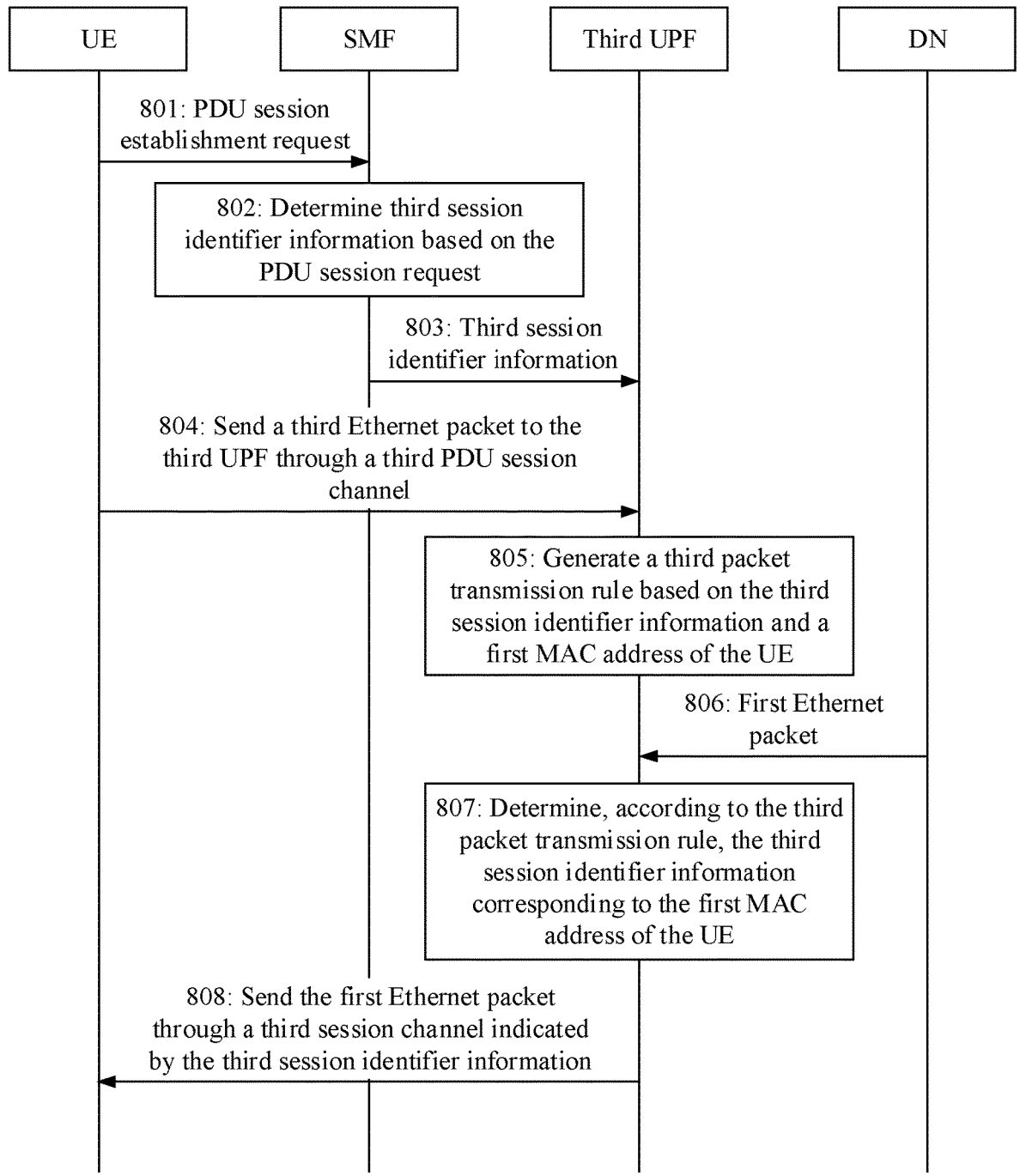
FIG. 8 is a flowchart of an example of another communication method according to this application.

FIG. 6 to FIG. 8 below may show, but not limited to, a scenario in which the terminal device joins a new network. A third UPF in FIG. 6 to FIG. 8 may be an example of the first user plane function network element in the foregoing embodiments. However, the first user plane function network element is not limited to the third UPF. Related third session identifier information may be an example of the first session identifier information in the foregoing embodiments, and a related third session channel may be an example of the first session channel in the foregoing embodiments. A related third packet transmission rule is an example of the first packet transmission rule in the foregoing embodiments, and a related third correspondence is an example of the first correspondence in the foregoing embodiments. However, it should be understood that the foregoing descriptions are merely examples, and do not constitute a limitation.

As shown in FIG. 6, an embodiment of this application further provides an example of a packet transmission method. Specifically, a procedure in the example may include the following steps.

Step 601: UE sends a first message to an SMF, where the first message is used to request to establish a PDU session, and the first message includes a first MAC address of the UE.

Optionally, when the UE works in a bridge mode, to be specific, one or more other devices are connected to a network by using the UE, the first message further includes second MAC addresses of the one or more other devices.

Step 602: The SMF determines third session identifier information based on the first message, where the third session identifier information is used to indicate a third session channel of a third UPF.

Step 603: The SMF generates a third packet transmission rule based on the third session identifier information and the first MAC address of the UE, where the third packet transmission rule includes a third correspondence between the third session identifier information and the first MAC address of the UE.

Step 604: The SMF sends the third packet transmission rule to the third UPF.

Step 605: The third UPF receives a first Ethernet packet from a DN, where the first Ethernet packet includes the first MAC address of the UE.

Step 606: The third UPF determines, according to the third packet transmission rule, the third session identifier information corresponding to the first MAC address of the UE.

Step 607: The third UPF sends the first Ethernet packet to the UE through the third session channel indicated by the third session identifier information.

When the third UPF performs step 607, a specific process may be: sending, by the third UPF through the third session channel, the first Ethernet packet to a target RAN serving the UE, and then forwarding, by the target RAN, the first Ethernet packet to the UE.

Optionally, when a destination MAC address in the first Ethernet packet is the second MAC addresses of the one or more other devices, after receiving the first Ethernet packet, the UE forwards the first Ethernet packet to the one or more other devices.

In an optional implementation, when the UE works in the bridge mode, the third correspondence may further include the second MAC addresses of the one or more other devices connected to the UE. When the third UPF receives a second Ethernet packet, but the second Ethernet packet includes a second MAC address of any other device, the third UPF may search the third packet transmission rule for the third correspondence based on the second MAC address of the any other device, then determine the first MAC address of the UE in the third correspondence, further determine the third session identifier information corresponding to the first MAC address of the UE, and finally send the second Ethernet packet to the UE through the third session channel indicated by the third session identifier information. In this case, after the UE receives the second Ethernet packet, when the UE identifies that a destination MAC address of the second Ethernet packet is the any other device, the UE forwards the second Ethernet packet to the any other device.

In the foregoing example, the SMF may determine the third packet transmission rule based on the first MAC address of the UE in the first message and the determined third session identifier information, and send the third packet transmission rule to the third UPF, so that the third UPF transmits an Ethernet packet to the UE according to the third packet transmission rule. In this way, a packet transmission rule can be flexibly determined, so that the Ethernet packet that needs to be transmitted to the UE can be accurately and successfully transmitted to the UE.

Based on the foregoing embodiment, an example of a packet transmission method shown in FIG. 7 and the example shown in FIG. 6 have similar procedures, and there is also a difference. For example, a specific procedure may be as follows:

Step 701 and step 702 are similar to step 601 and step 602 in the embodiment shown in FIG. 6. For details, mutual reference may be made. Details are not described one by one herein again.

Step 703: The SMF sends a third correspondence between the third session identifier information and the first MAC address of the UE to the third UPF.

Step 704: The third UPF generates a third packet transmission rule based on the third correspondence, where the third packet transmission rule includes the third correspondence.

Step 705 to step 707 are similar to step 605 to step 607 in the embodiment shown in FIG. 6. For details, mutual reference may be made. Details are not described one by one herein again.

Based on the foregoing embodiment, as shown in FIG. 8, an embodiment of this application further provides an example of a packet transmission method. Specifically, a procedure in the example may include the following steps.

Step 801: UE sends a PDU session establishment request to an SMF.

Step 802: The SMF determines third session identifier information based on the PDU session request, where the third session identifier information is used to indicate a third session channel of a third UPF.

Step 803: The SMF sends the third session identifier information to the third UPF.

Step 804: The UE sends a third Ethernet packet to the third UPF through the third session channel, where the third Ethernet packet includes a first MAC address of the UE; and correspondingly, the third UPF receives the third Ethernet packet.

Optionally, when the UE is a bridge mode, to be specific, one or more other devices are connected to a network by using the UE, the third Ethernet packet further includes second MAC addresses of the one or more other devices.

Step 805: The third UPF generates a third packet transmission rule based on first session identifier information and the first MAC address of the UE, where the third packet transmission rule includes a third correspondence between the third session identifier information and the first MAC address of the UE.

Step 806: The third UPF receives a first Ethernet packet from a DN, where the first Ethernet packet includes the first MAC address of the UE.

Step 807: The third UPF determines, according to the third packet transmission rule, the third session identifier information corresponding to the first MAC address of the UE.

Step 808: The third UPF sends the first Ethernet packet to the UE through the third session channel indicated by the third session identifier information.

Step 806 to step 808 are similar to step 605 to step 607 in the foregoing embodiment, and mutual reference may be made. Repeated parts are not described in detail herein again.

In the foregoing example, after obtaining the first MAC address of the UE from the UE and the third session identifier information from the SMF, a target UPF generates the third packet transmission rule based on the first MAC address of the UE and the third session identifier information, so that the third UPF transmits an Ethernet packet to the UE according to the third packet transmission rule. In this way, a packet transmission rule can be flexibly determined, so that the Ethernet packet that needs to be transmitted to the UE can be accurately and successfully transmitted to the UE.

FIG. 9A and FIG. 9B to FIG. 17A and FIG. 17B below may show, but not limited to, a scenario in which a terminal device is handed over between user plane function network elements. In FIG. 9A and FIG. 9B to FIG. 17A and FIG. 17B, a related fourth UPF is a UPF before UE is handed over, for example, may be an example of the second user plane function network element in the foregoing embodiments, or may be the third UPF in the foregoing embodiments; a related fifth UPF is a UPF to which the UE is handed over, for example, may be an example of the first user plane function network element in the foregoing embodiments; and a related target RAN may be an access network device currently serving the UE.

Figure 9A:
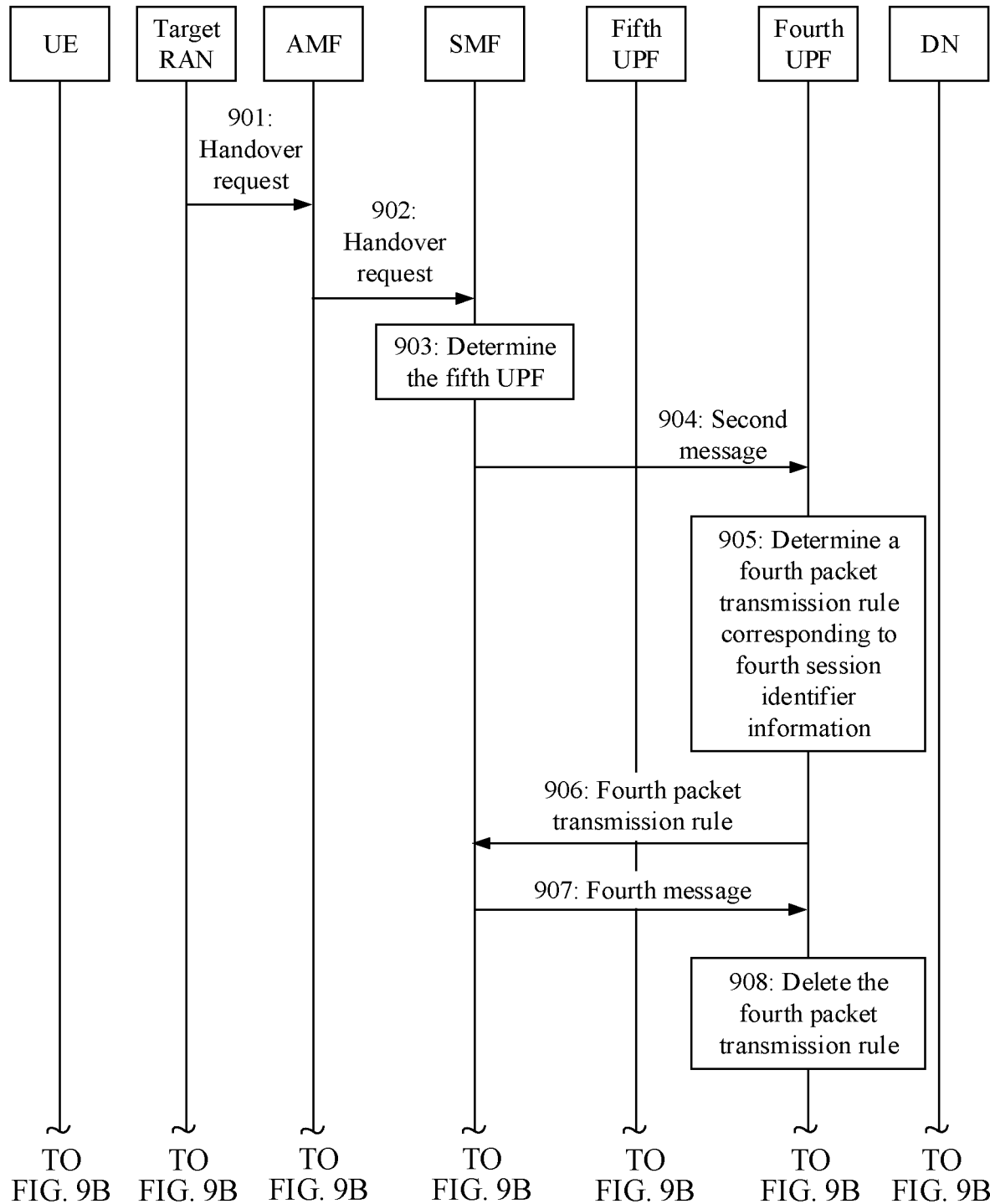
FIG. 9A and FIG. 9B are a flowchart of an example of another communication method according to this application.
Figure 9B:
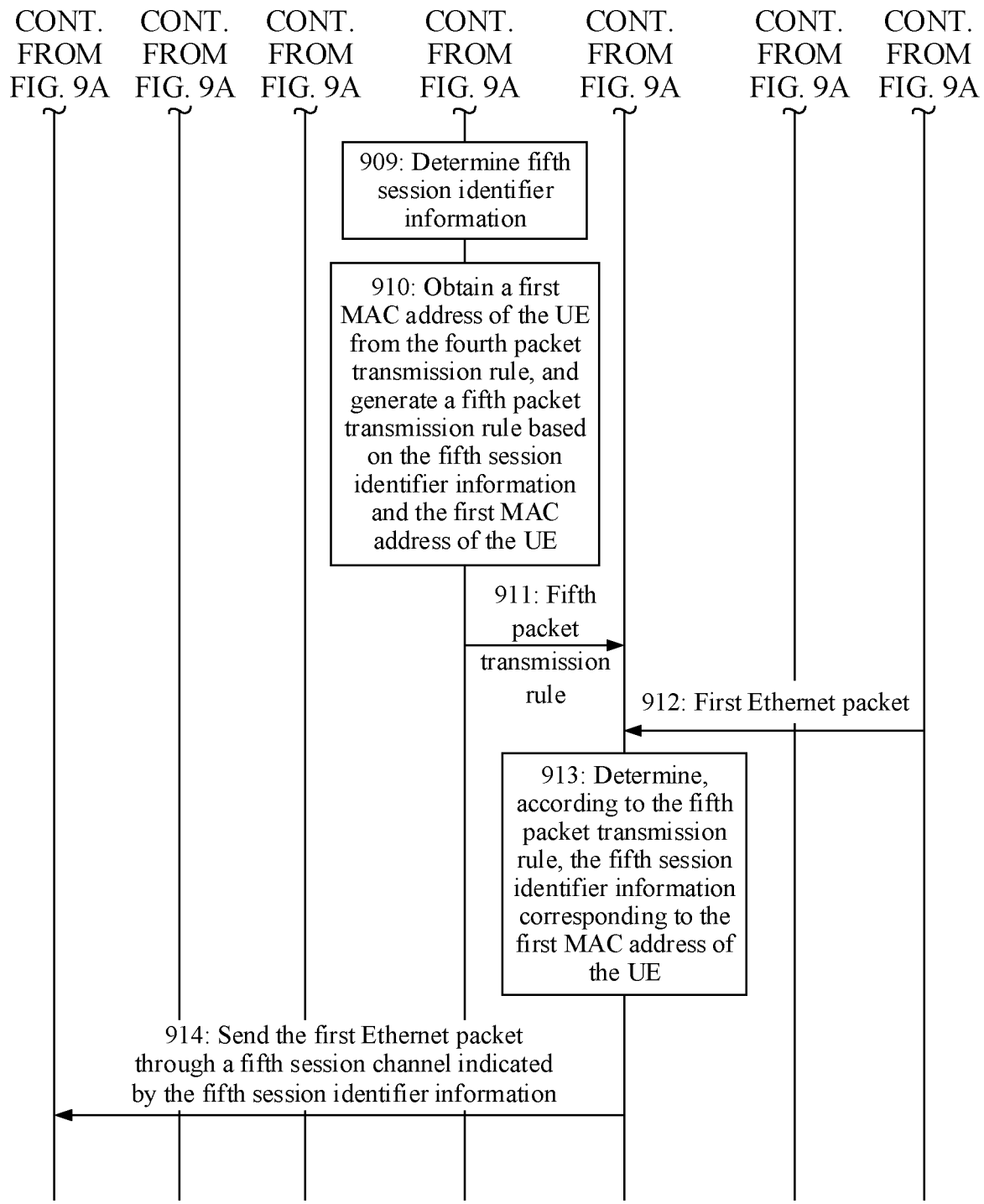

As shown in FIG. 9A and FIG. 9B, an embodiment of this application further provides an example of a packet transmission method. Specifically, a procedure in the example may include the following steps.

Step 901: A target RAN sends a handover request to an AMF, where the handover request is used to request to hand over a UPF serving UE.

Step 902: The AMF forwards the handover request to an SMF.

Step 903: The SMF determines a fifth UPF.

Step 904: The SMF sends a second message to a fourth UPF, where the second message is used to request a fourth packet transmission rule, the second message includes fourth session identifier information, the fourth session identifier information is used to indicate a fourth session channel of the fourth UPF, and the fourth packet transmission rule includes a fourth correspondence between a first MAC address of the UE and the fourth session identifier information.

Step 905: The fourth UPF determines the fourth packet transmission rule corresponding to the fourth session identifier information.

Step 906: The fourth UPF sends the fourth packet transmission rule to the SMF.

Step 907: The SMF sends a fourth message to the fourth UPF, where the fourth message is used to instruct the fourth UPF to delete the fourth packet transmission rule.

Step 908: The fourth UPF deletes the fourth packet transmission rule.

Step 909: The SMF determines fifth session identifier information, where the fifth session identifier information is used to indicate a fifth session channel of the fifth UPF.

Step 910: The SMF obtains the first MAC address of the UE from the fourth packet transmission rule, and generates a fifth packet transmission rule based on the fifth session identifier information and the first MAC address of the UE, and the fifth packet transmission rule includes a fifth correspondence between the fifth session identifier information and the first MAC address of the UE.

Step 911: The SMF sends the fifth packet transmission rule to the fifth UPF.

Step 912: The fifth UPF receives a first Ethernet packet from a DN, where the first Ethernet packet includes the first MAC address of the UE.

Step 913: The fifth UPF determines, according to the fifth packet transmission rule, the fifth session identifier information corresponding to the first MAC address of the UE.

Step 914: The fifth UPF sends the first Ethernet packet to the UE by using the fifth session channel indicated by the fifth session identifier information.

The foregoing steps are not limited to the foregoing sequence. For example, step 907 and step 908 may be performed after step 914. This is not limited in this application.

Step 911 to step 914 are similar to step 604 to step 607 in the foregoing embodiment, and mutual reference may be made. Repeated parts are not described in detail herein again.

In the foregoing example, after determining the fifth session identifier information and obtaining the first MAC address of the UE from the fourth packet transmission rule from the fourth UPF, the SMF generates the fifth packet transmission rule based on the first MAC address of the UE and the fifth session identifier information, so that the fifth UPF transmits an Ethernet packet to the UE according to the fifth packet transmission rule. In this way, the Ethernet packet that needs to be transmitted to the UE can be accurately and successfully transmitted to the UE.

Figure 10A:
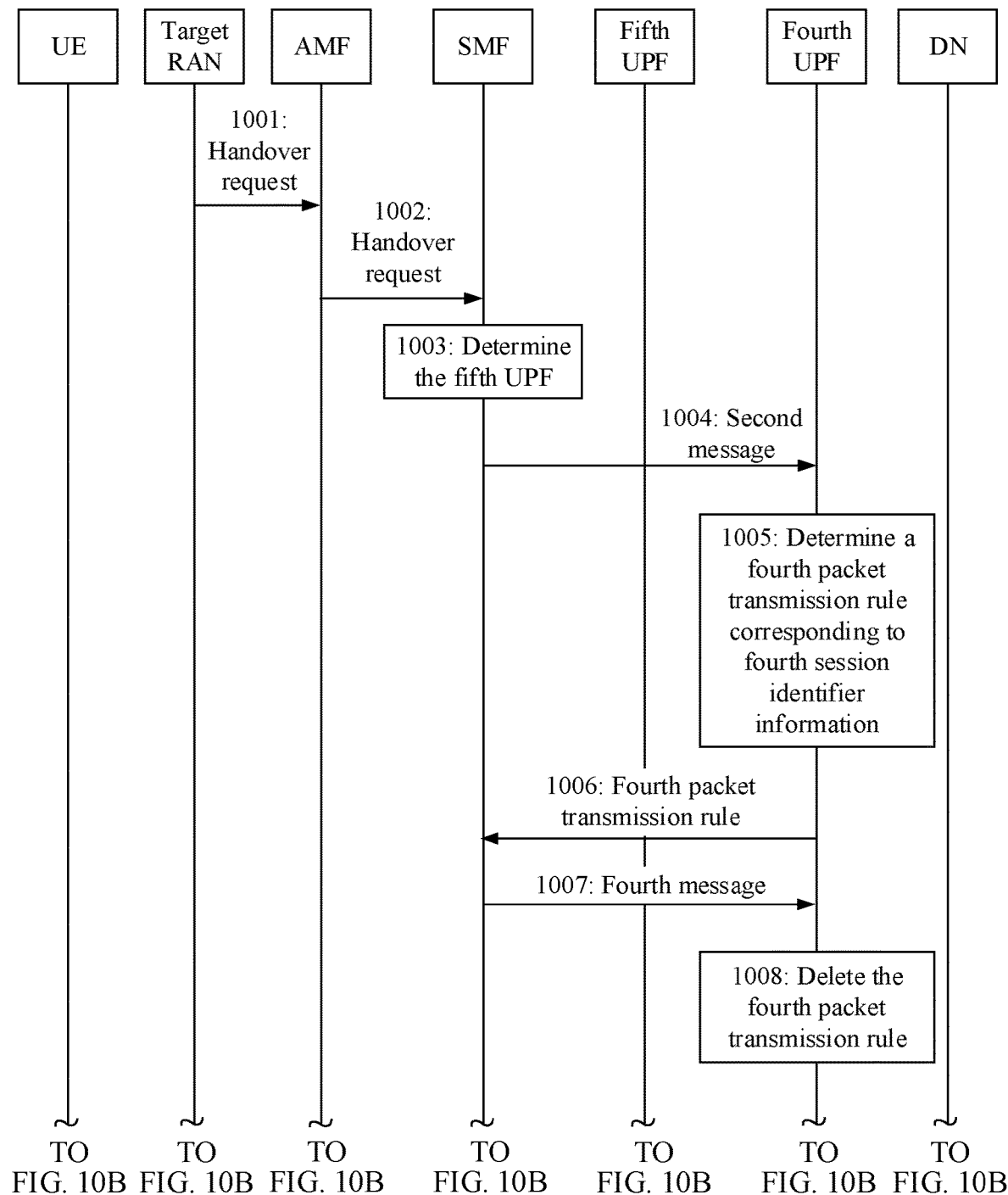
FIG. 10A and FIG. 10B are a flowchart of an example of another communication method according to this application.
Figure 10B:
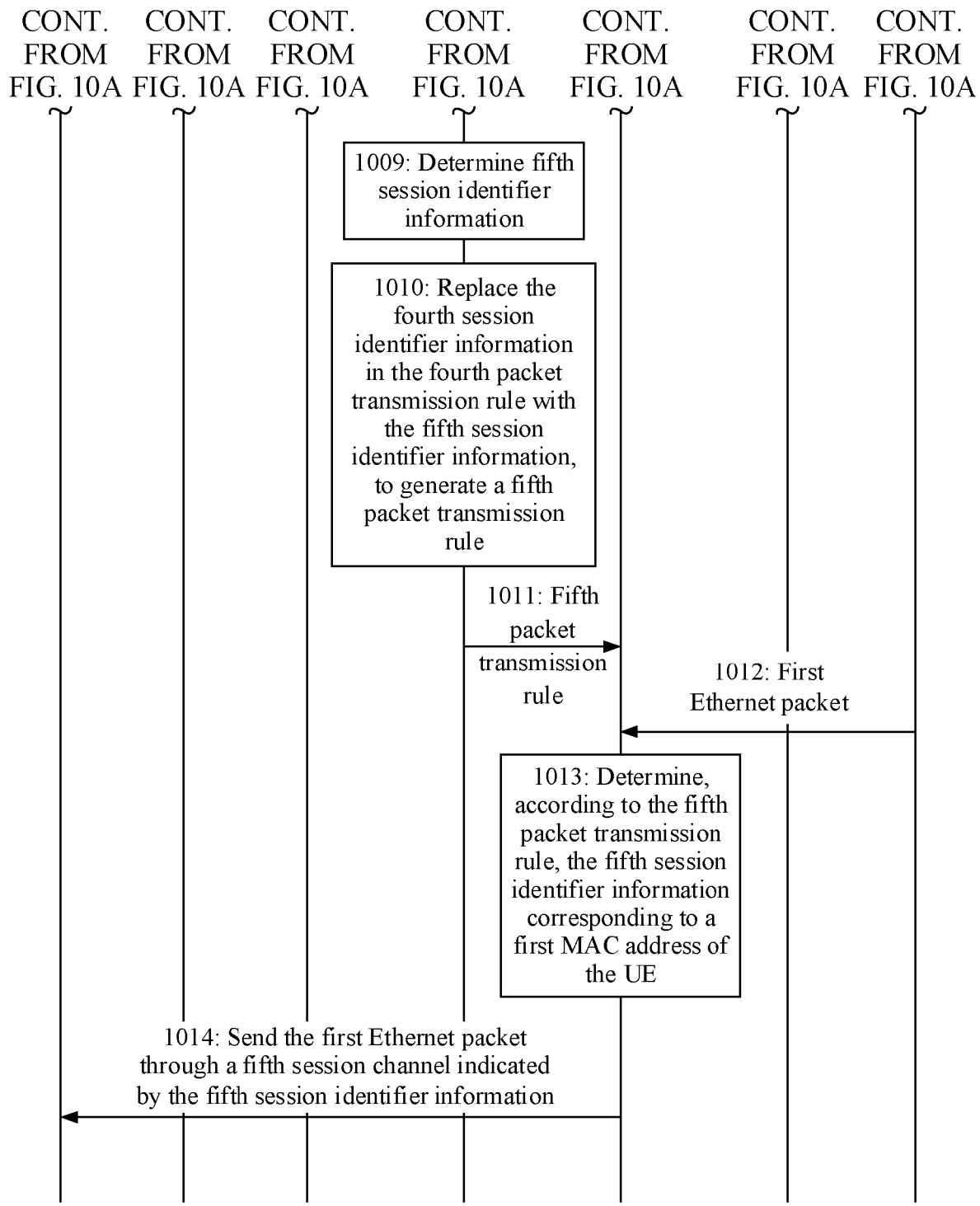

Based on the foregoing embodiment, an example of a packet transmission method shown in FIG. 10A and FIG. 10B and the example shown in FIG. 9A and FIG. 9B have similar procedures, and there is also a difference. For example, a specific procedure may be as follows:

Step 1001 to step 1009 are similar to step 901 to step 909 in the embodiment shown in FIG. 9A and FIG. 9B. For details, mutual reference may be made. Details are not described one by one herein again.

Step 1010: The SMF replaces the fourth session identifier information in the fourth packet transmission rule with the fifth session identifier information, to generate a fifth packet transmission rule, where the fifth packet transmission rule includes a fifth correspondence between the first MAC address of the UE and the fifth session identifier information.

Step 1011 to step 1014 are similar to step 911 to step 914 in the embodiment shown in FIG. 9A and FIG. 9B. For details, mutual reference may be made. Details are not described one by one herein again.

Figure 11A:
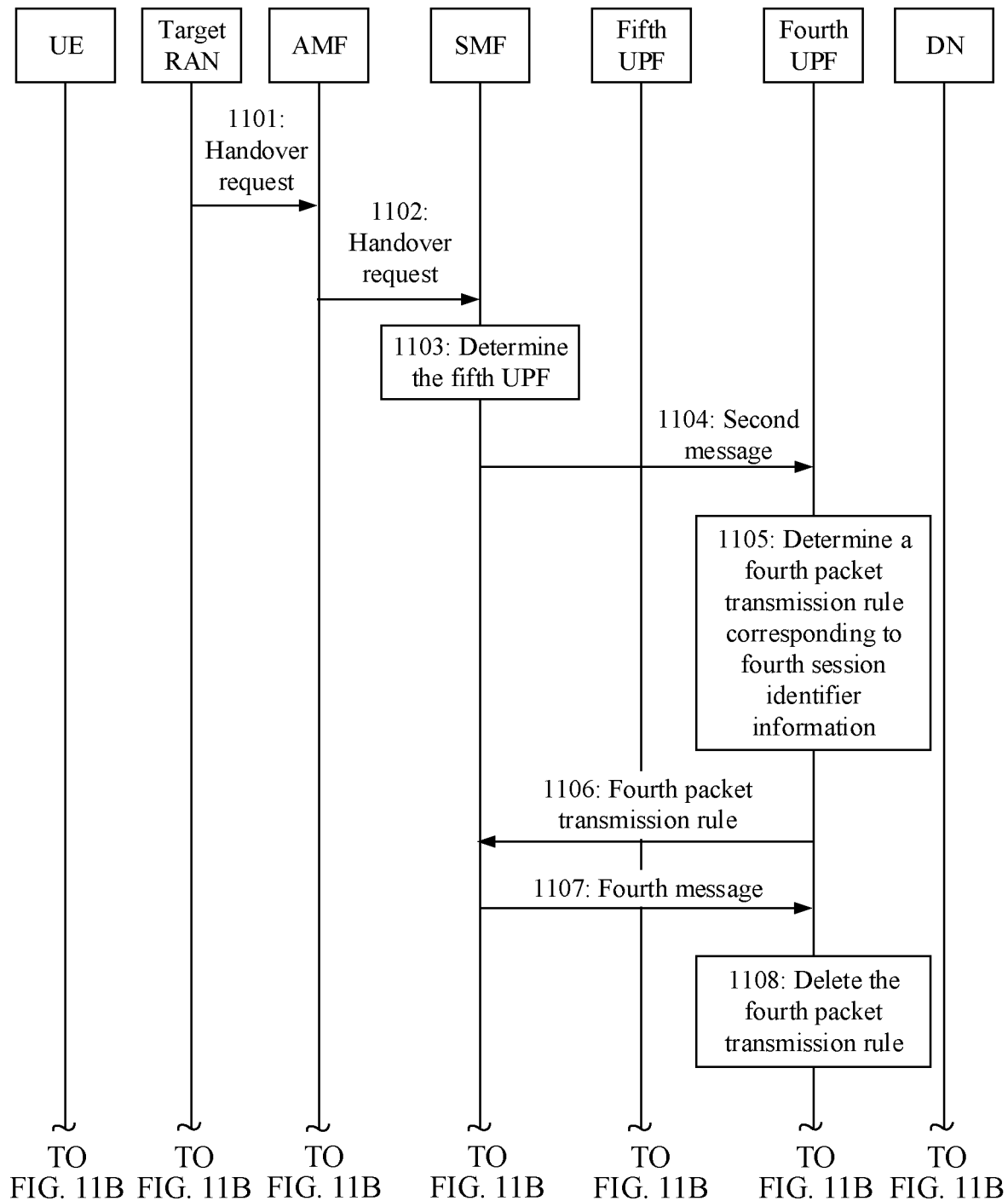
FIG. 11A and FIG. 11B are a flowchart of an example of another communication method according to this application.
Figure 11B:
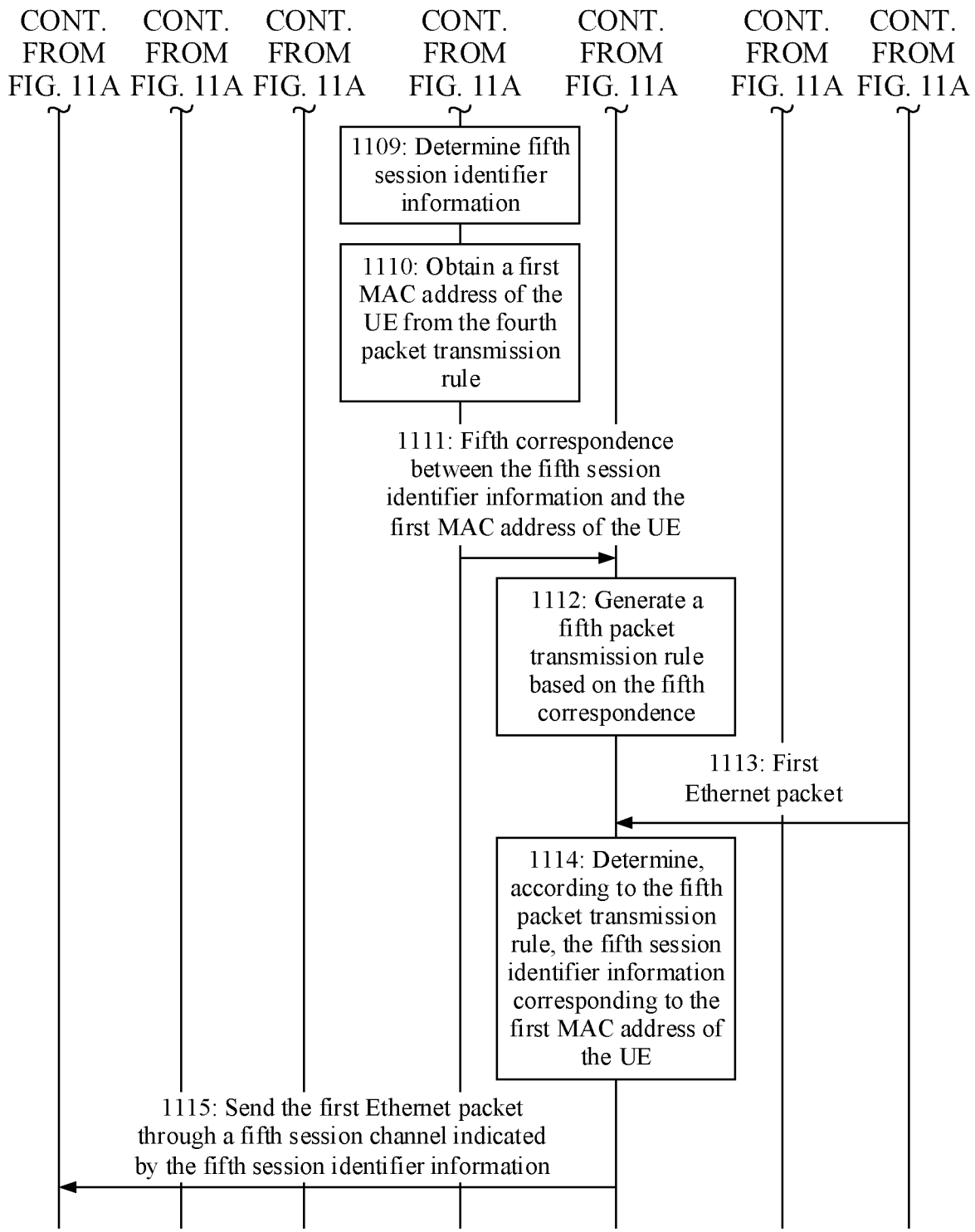

Based on the foregoing embodiment, an example of a packet transmission method shown in FIG. 11A and FIG. 11B and the example shown in FIG. 9A and FIG. 9B have similar procedures, and there is also a difference. For example, a specific procedure may be as follows:

Step 1101 to step 1109 are similar to step 901 to step 909 in the embodiment shown in FIG. 9A and FIG. 9B. For details, mutual reference may be made. Details are not described one by one herein again.

Step 1110: The SMF obtains the first MAC address of the UE from the fourth packet transmission rule.

Step 1111: The SMF sends a fifth correspondence between the fifth session identifier information and the first MAC address of the UE to the fifth UPF.

Step 1112: The fifth UPF generates a fifth packet transmission rule based on the fifth correspondence, where the fifth packet transmission rule includes the fifth correspondence.

Step 1113 to step 1115 are similar to step 912 to step 914 in the embodiment shown in FIG. 9A and FIG. 9B. For details, mutual reference may be made. Details are not described one by one herein again.

Figure 12A:
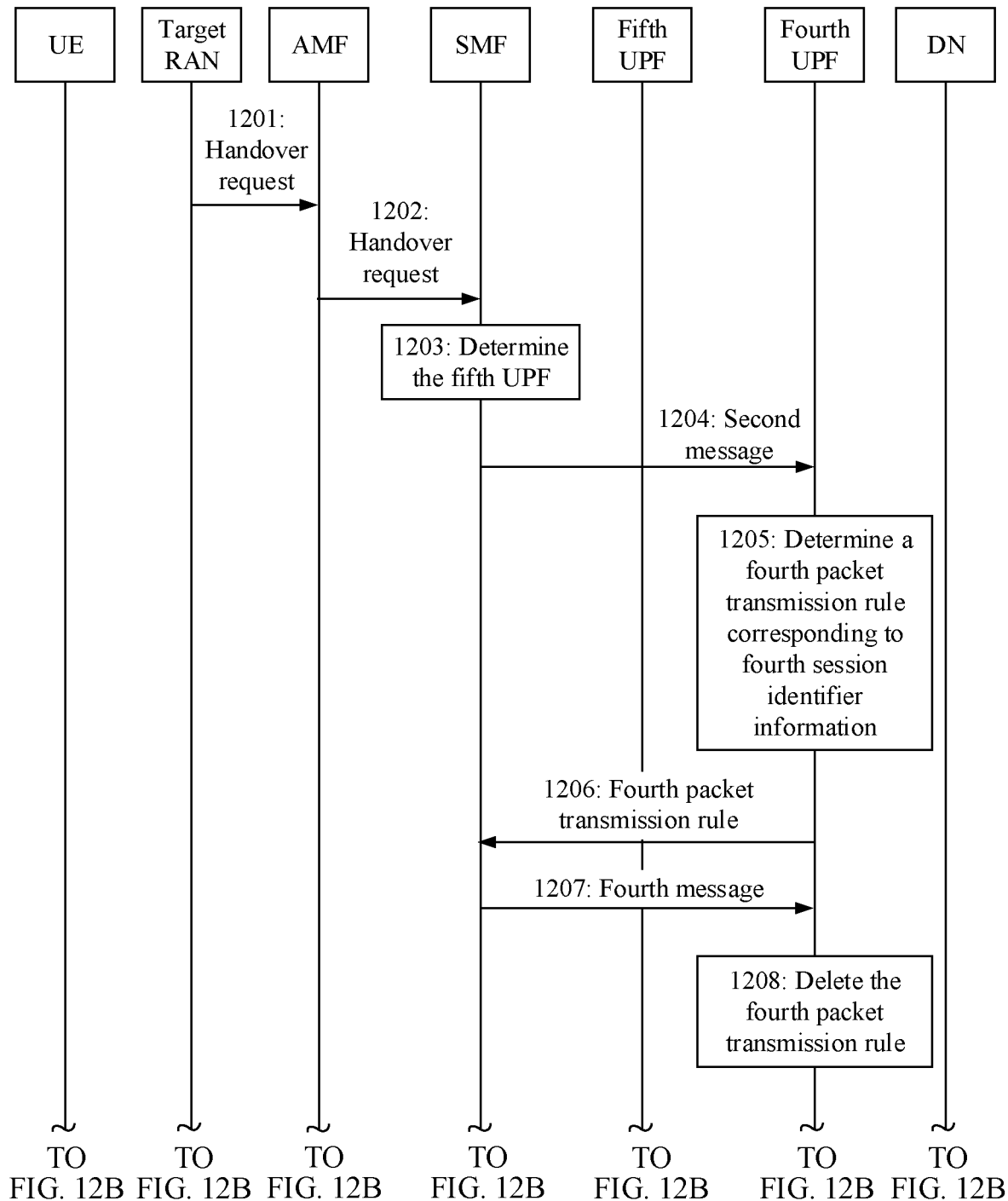
FIG. 12A and FIG. 12B are a flowchart of an example of another communication method according to this application.
Figure 12B:
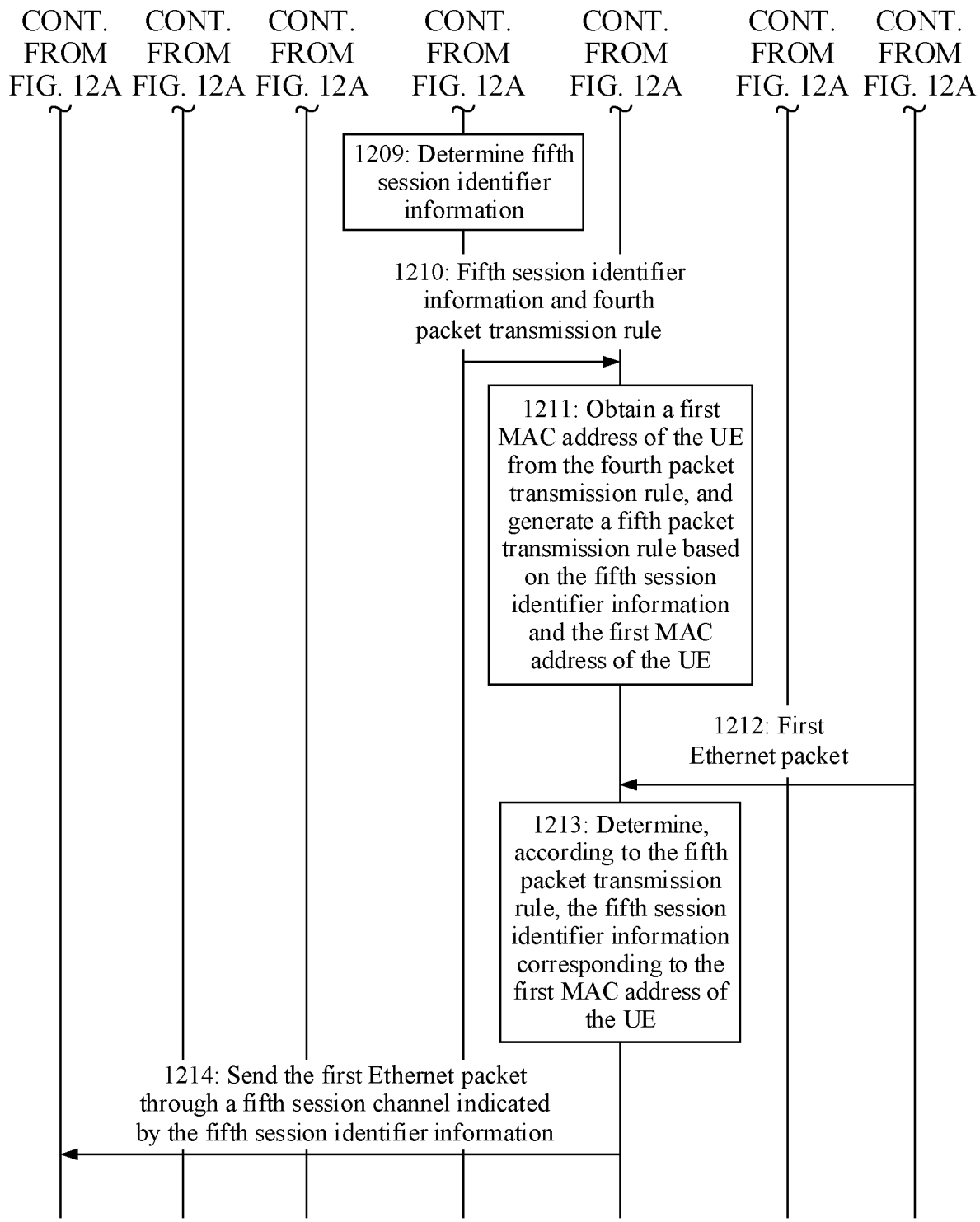

Based on the foregoing embodiment, an example of a packet transmission method shown in FIG. 12A and FIG. 12B and the example shown in FIG. 9A and FIG. 9B have similar procedures, and there is also a difference. For example, a specific procedure may be as follows:

Step 1201 to step 1209 are similar to step 901 to step 909 in the embodiment shown in FIG. 9A and FIG. 9B. For details, mutual reference may be made. Details are not described one by one herein again.

Step 1210: The SMF sends the fifth session identifier information and the fifth packet transmission rule to the fifth UPF.

Step 1211: The fifth UPF obtains the first MAC address of the UE from the fifth packet transmission rule, and generates a fifth packet transmission rule based on the fifth session identifier information and the first MAC address of the UE, where the fifth packet transmission rule includes a fifth correspondence between the fifth session identifier information and the first MAC address of the UE.

Step 1212 to step 1214 are similar to step 912 to step 914 in the embodiment shown in FIG. 9A and FIG. 9B. For details, mutual reference may be made. Details are not described one by one herein again.

Figure 13A:
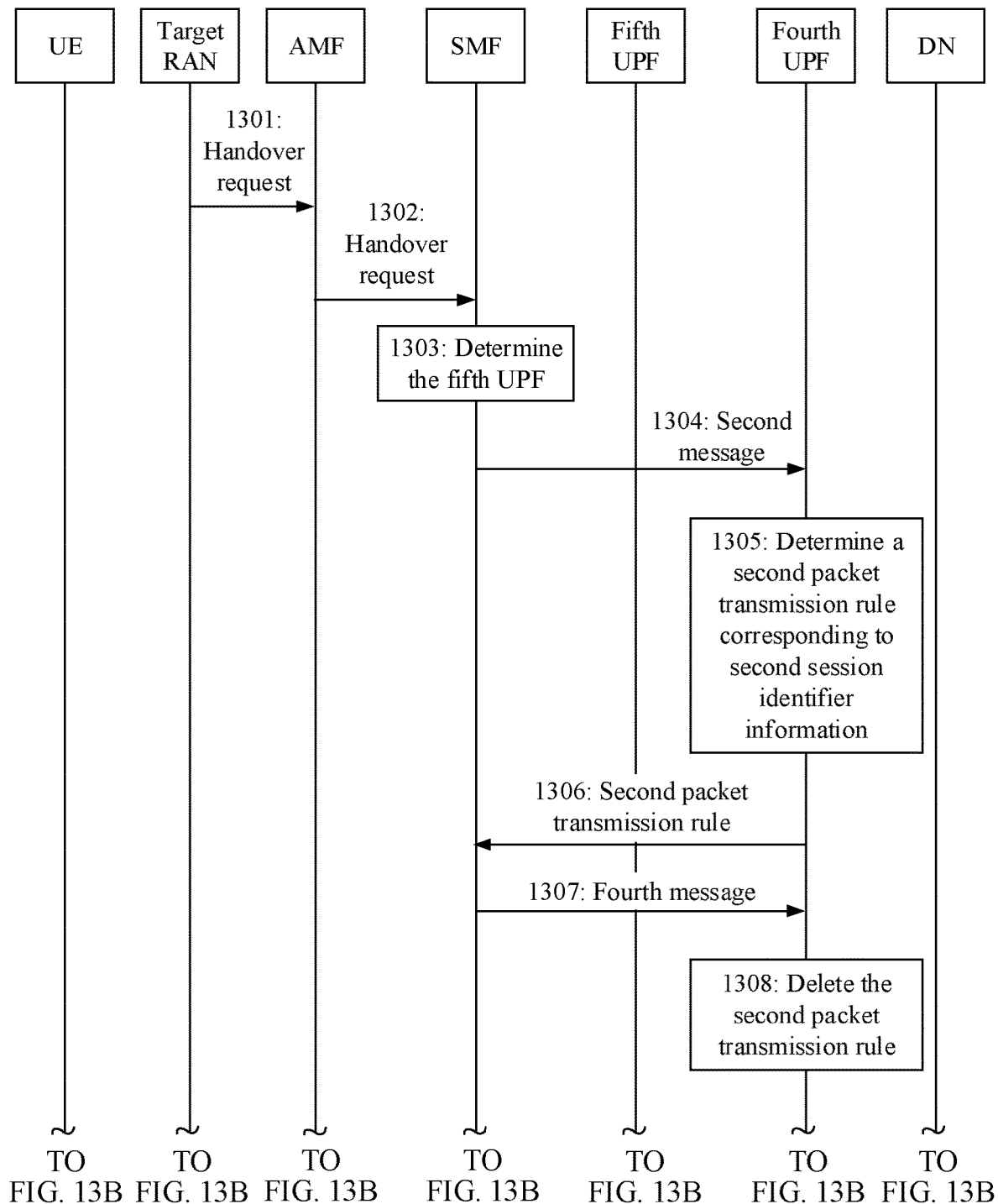
FIG. 13A and FIG. 13B are a flowchart of an example of another communication method according to this application.
Figure 13B:
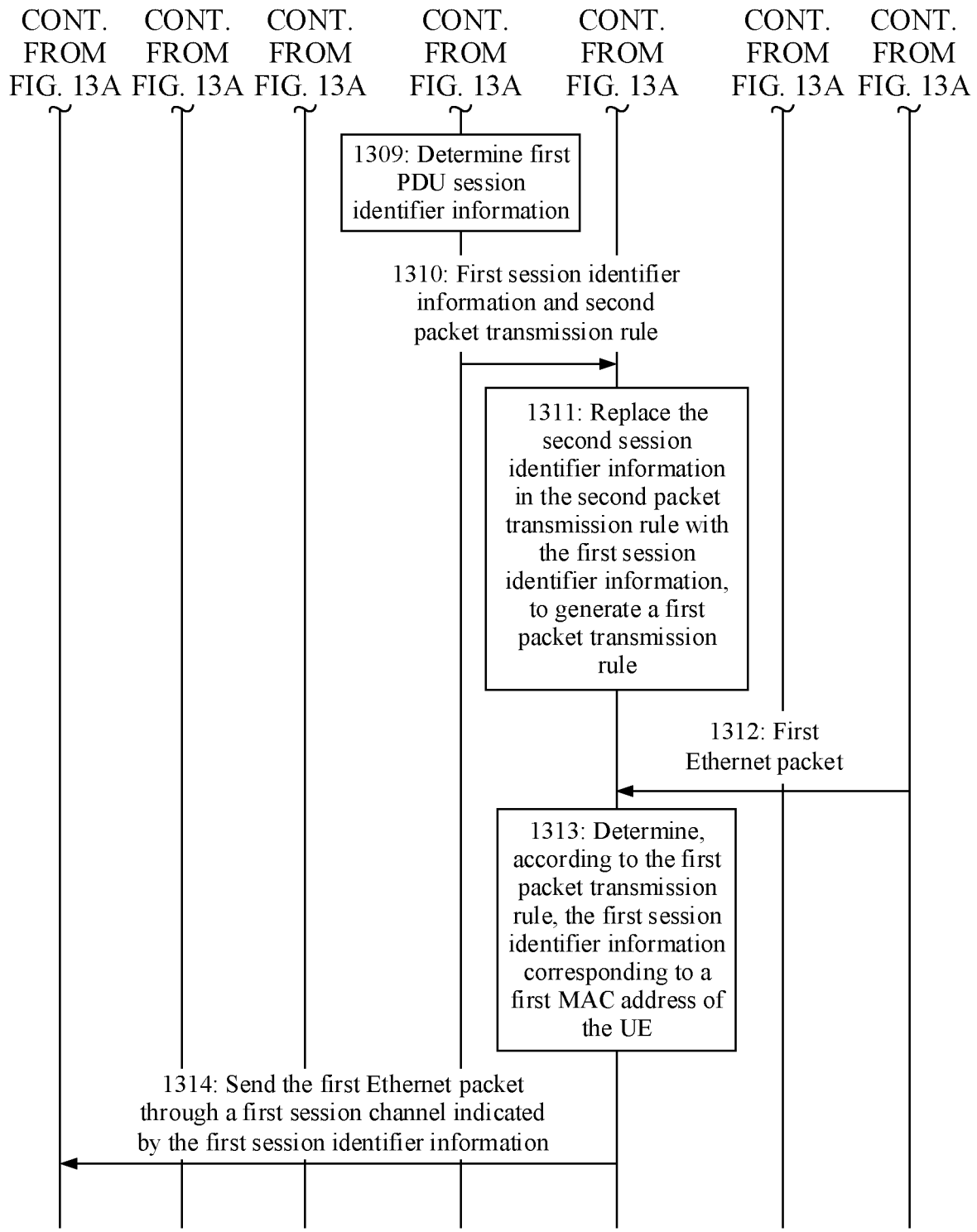

Based on the foregoing embodiment, an example of a packet transmission method shown in FIG. 13A and FIG. 13B and the example shown in FIG. 9A and FIG. 9B have similar procedures, and there is also a difference. For example, a specific procedure may be as follows:

Step 1301 to step 1309 are similar to step 901 to step 909 in the embodiment shown in FIG. 9A and FIG. 9B. For details, mutual reference may be made. Details are not described one by one herein again.

Step 1310: The SMF sends the fifth session identifier information and the fifth packet transmission rule to the fifth UPF.

Step 1311: The fifth UPF replaces the fourth session identifier information in the fourth packet transmission rule with the fifth session identifier information, to generate a fifth packet transmission rule, where the fifth packet transmission rule includes a fifth correspondence between the first MAC address of the UE and the fifth session identifier information.

Step 1312 to step 1314 are similar to step 912 to step 914 in the embodiment shown in FIG. 9A and FIG. 9B. For details, mutual reference may be made. Details are not described one by one herein again.

Figure 14A:
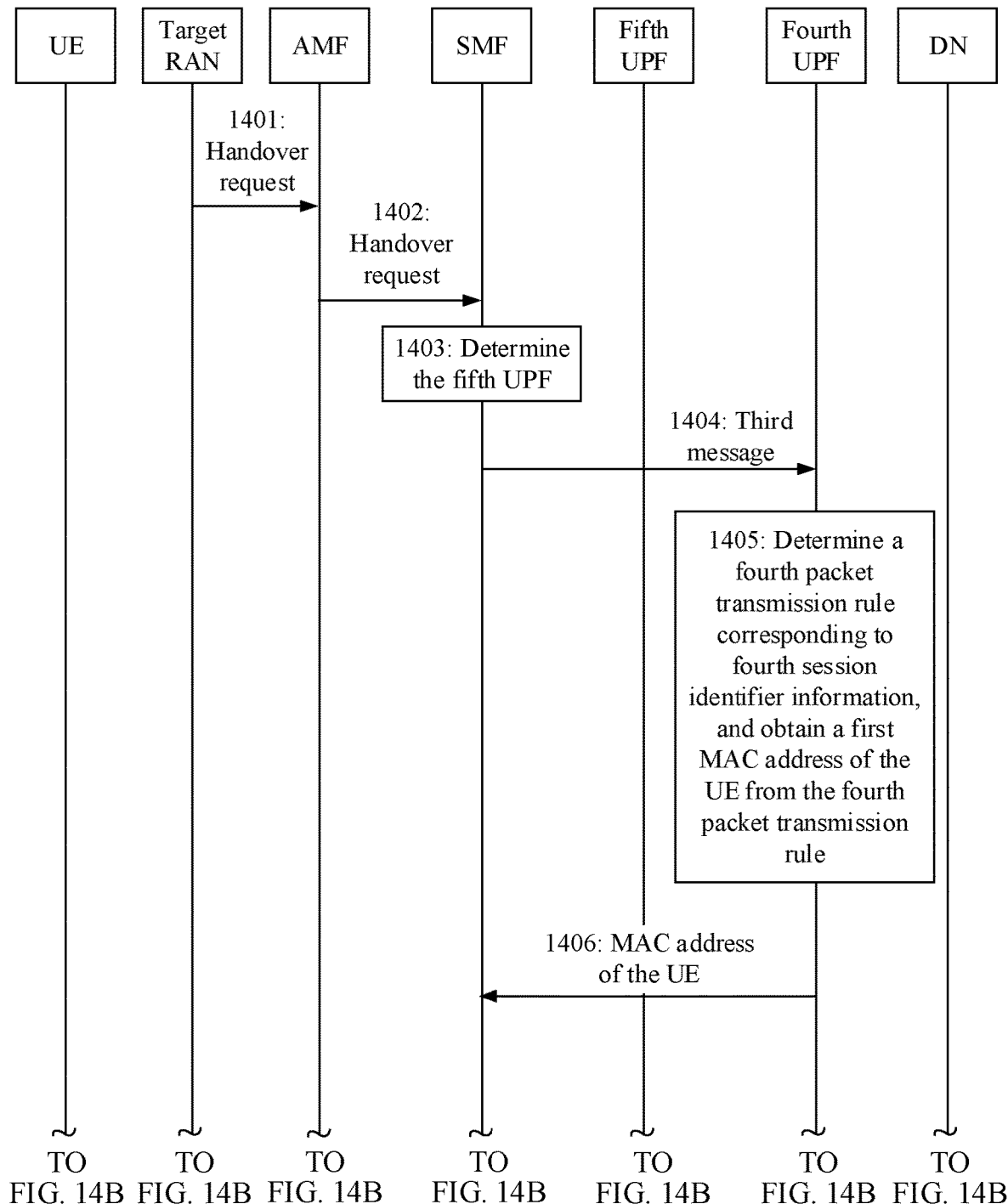
FIG. 14A and FIG. 14B are a flowchart of an example of another communication method according to this application.
Figure 14B:
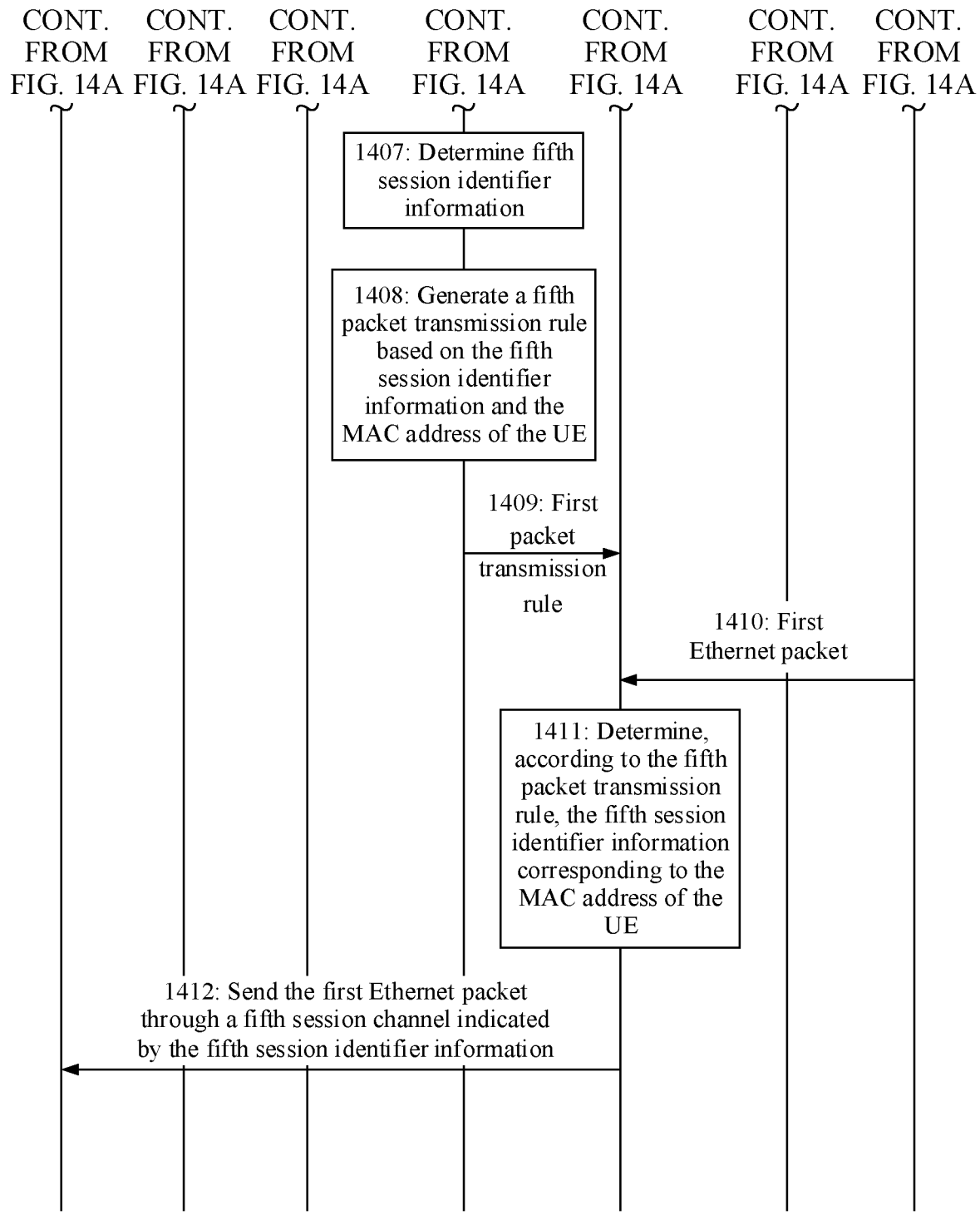

Based on the foregoing embodiment, an example of a packet transmission method shown in FIG. 14A and FIG. 14B and the example shown in FIG. 9A and FIG. 9B have similar procedures, and there is also a difference. For example, a specific procedure may be as follows:

Step 1401 to step 1403 are similar to step 901 to step 903 in the embodiment shown in FIG. 9A and FIG. 9B. For details, mutual reference may be made. Details are not described one by one herein again.

Step 1404: The SMF sends a third message to a fourth UPF, where the third message is used to request a first MAC address of the UE, and the third message includes fourth session identifier information.

Step 1405: The fourth UPF determines a fourth packet transmission rule corresponding to the fourth session identifier information, and obtains the first MAC address of the UE from the fourth packet transmission rule.

Step 1406: The fourth UPF sends the first MAC address of the UE to the SMF.

Step 1407 is similar to step 909 in the embodiment shown in FIG. 9A and FIG. 9B. For details, mutual reference may be made. Details are not described herein again.

Step 1408: The SMF generates a fifth packet transmission rule based on the fifth session identifier information and the first MAC address of the UE, where the fifth packet transmission rule includes a fifth correspondence between the fifth session identifier information and the first MAC address of the UE.

Step 1409 to step 1412 are similar to step 911 to step 914 in the embodiment shown in FIG. 9A and FIG. 9B. For details, mutual reference may be made. Details are not described one by one herein again.

Figure 15A:
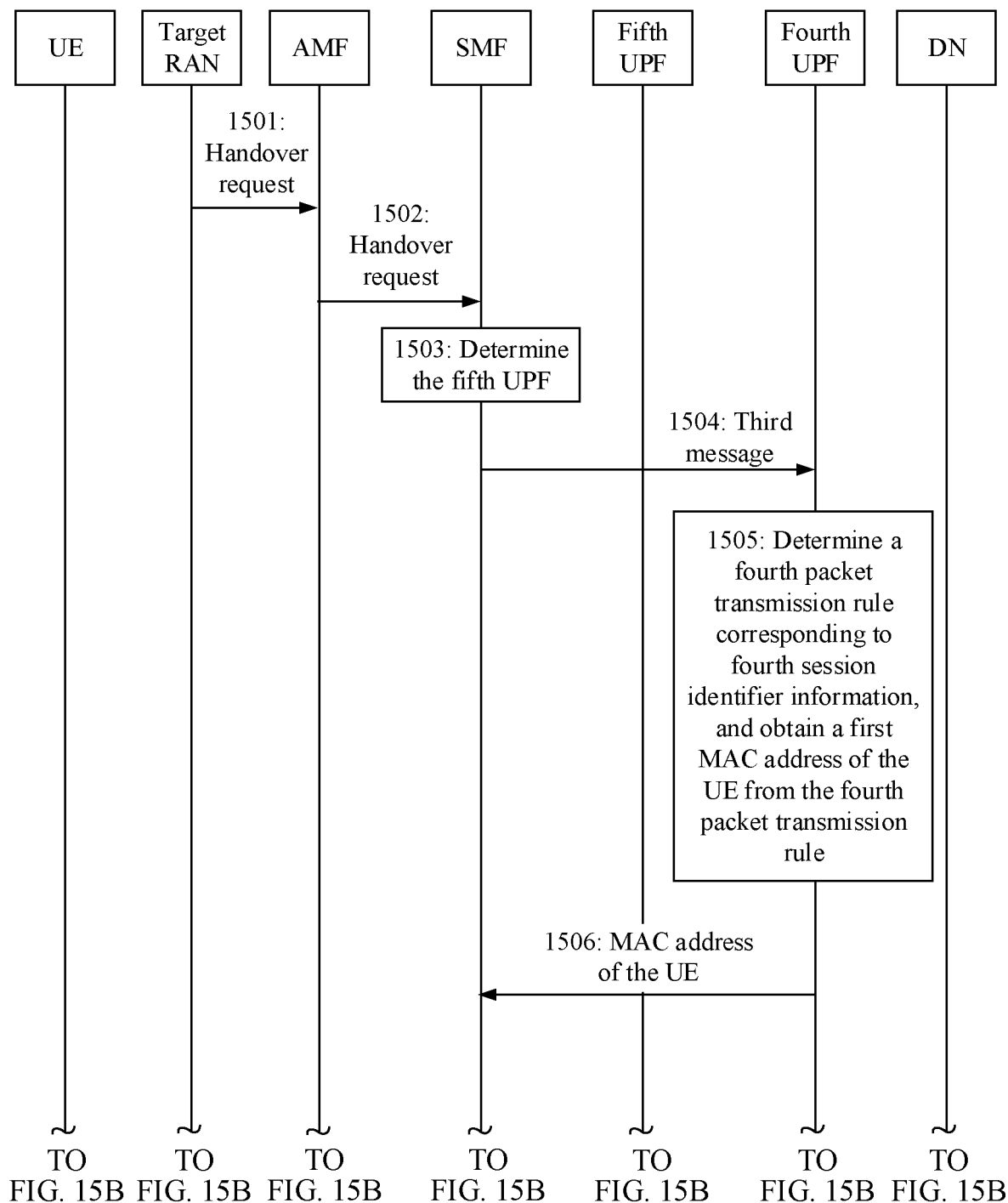
FIG. 15A and FIG. 15B are a flowchart of an example of another communication method according to this application.
Figure 15B:
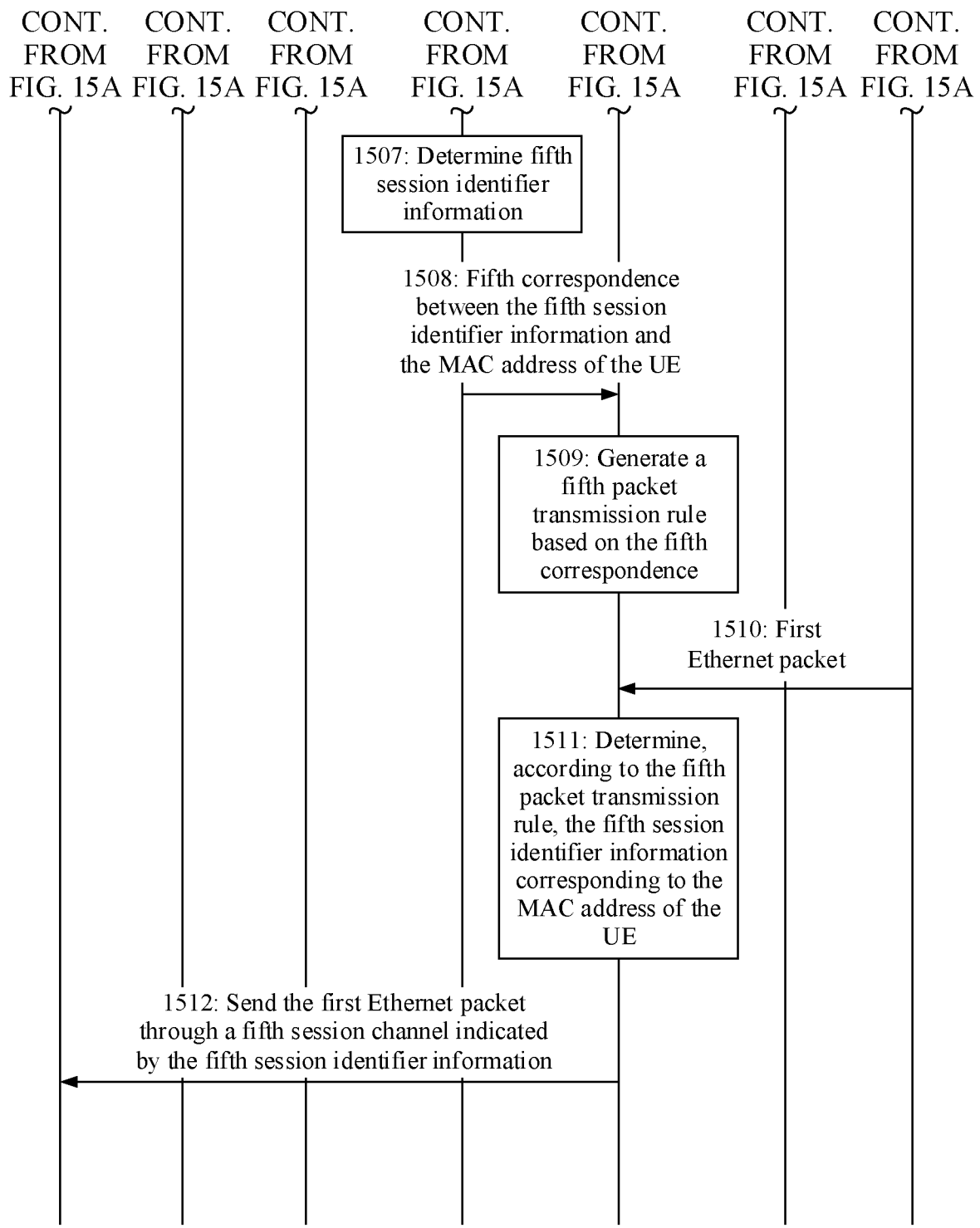

Based on the foregoing embodiment, an example of a packet transmission method shown in FIG. 15A and FIG. 15B and the example shown in FIG. 9A and FIG. 9B have similar procedures, and there is also a difference. For example, a specific procedure may be as follows:

Step 1501 to step 1503 are similar to step 901 to step 903 in the embodiment shown in FIG. 9A and FIG. 9B. For details, mutual reference may be made. Details are not described one by one herein again.

Step 1504: The SMF sends a third message to a fourth UPF, where the third message is used to request a first MAC address of the UE, and the third message includes fourth session identifier information.

Step 1505: The fourth UPF determines a fourth packet transmission rule corresponding to the fourth session identifier information, and obtains the first MAC address of the UE from the fourth packet transmission rule.

Step 1506: The fourth UPF sends the first MAC address of the UE to the SMF.

Step 1507 is similar to step 909 in the embodiment shown in FIG. 9A and FIG. 9B. For details, mutual reference may be made. Details are not described herein again.

Step 1508: The SMF sends a fifth correspondence between the fifth session identifier information and the first MAC address of the UE to the fifth UPF.

Step 1509: The fifth UPF generates a fifth packet transmission rule based on the fifth correspondence, where the fifth packet transmission rule includes the fifth correspondence.

Step 1510 to step 1512 are similar to step 912 to step 914 in the embodiment shown in FIG. 9A and FIG. 9B. For details, mutual reference may be made. Details are not described one by one herein again.

Figure 16A:
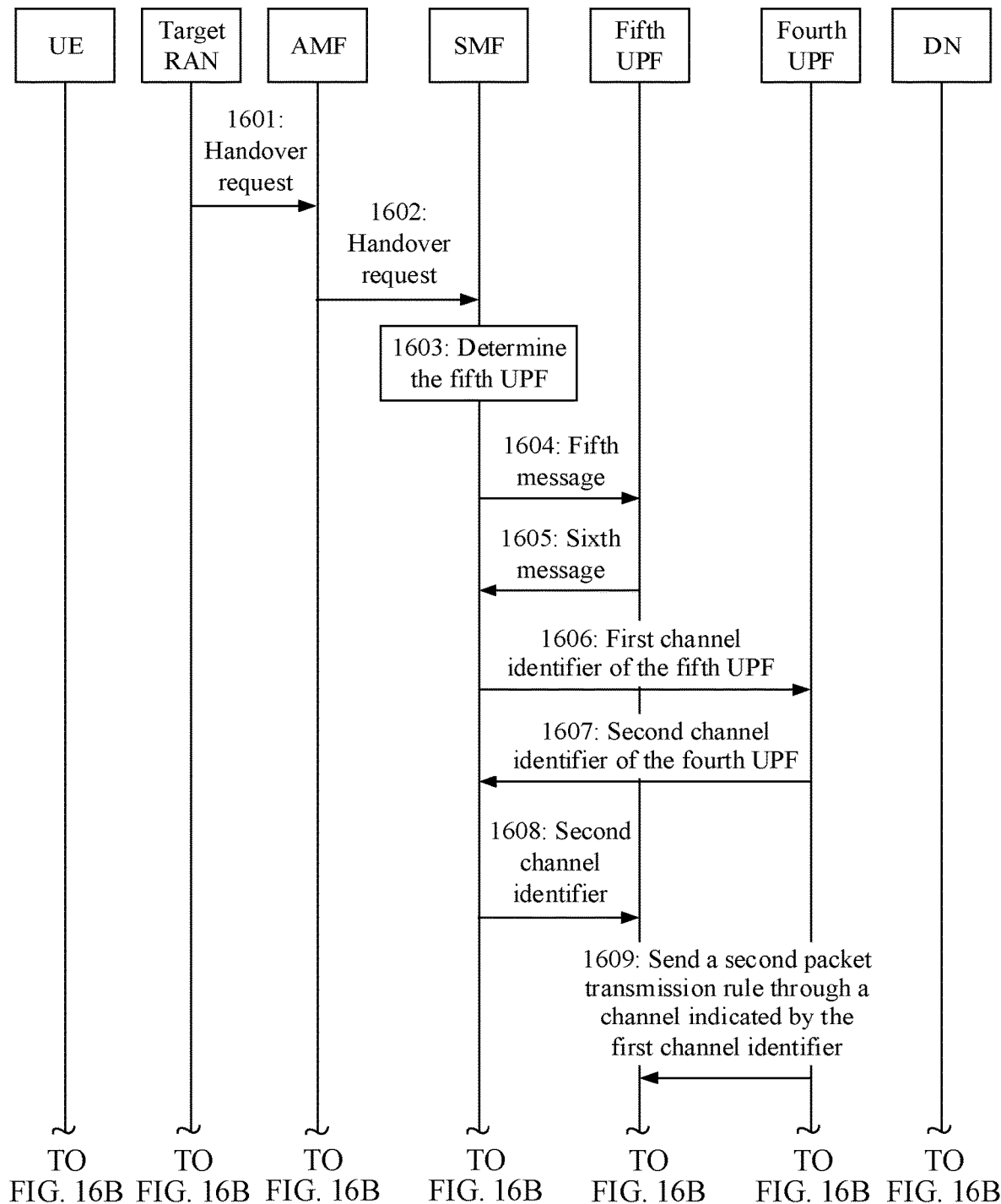
FIG. 16A and FIG. 16B are a flowchart of an example of another communication method according to this application.
Figure 16B:
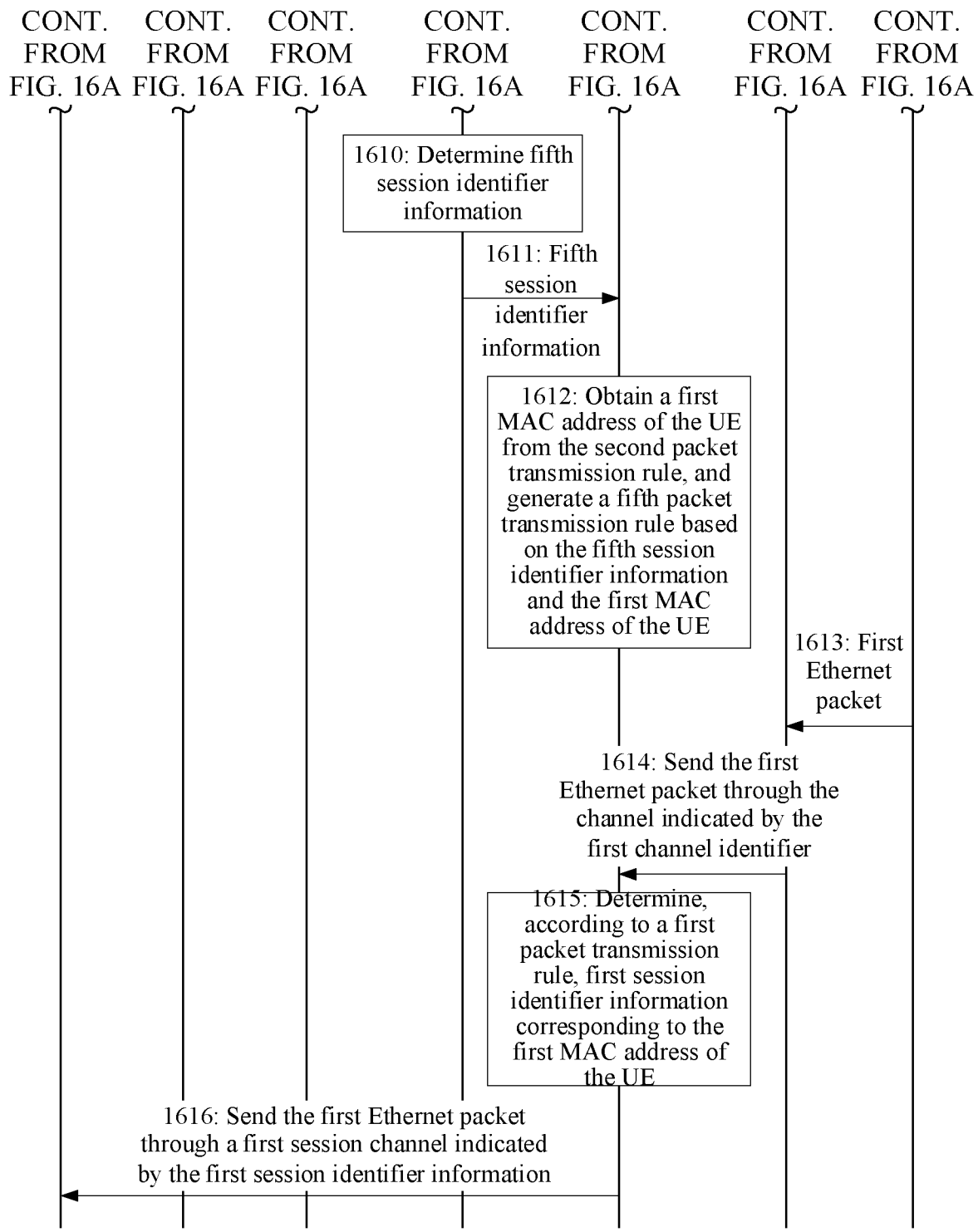

As shown in FIG. 16A and FIG. 16B, an embodiment of this application further provides an example of a packet transmission method. Specifically, a procedure in the example may include the following steps.

Step 1601: A target RAN sends a handover request to an AMF, where the handover request is used to request to hand over a UPF serving UE.

Step 1602: The AMF forwards the handover request to an SMF.

Step 1603: The SMF determines a fifth UPF.

Step 1604: The SMF sends a fifth message to the fifth UPF, where the fifth message is used to request to establish a forwarding channel.

Step 1605: The fifth UPF sends a sixth message to the SMF, where the sixth message carries a first channel identifier of the fifth UPF, and the first channel identifier is used to indicate a channel for data receiving by the fifth UPF.

Step 1606: The SMF sends the first channel identifier of the fifth UPF to a fourth UPF.

Step 1607: The fourth UPF returns a second channel identifier of the fourth UPF to the SMF, where the second channel identifier is used to indicate a channel for data receiving by the fourth UPF.

Step 1608: The SMF sends the second channel identifier to the fifth UPF.

Step 1609: The fourth UPF sends a fourth packet transmission rule to the fifth UPF by using the channel indicated by the first channel identifier, where the fourth packet transmission rule includes a fourth correspondence between a first MAC address of the UE and fourth session identifier information.

The channel indicated by the first channel identifier is a forwarding channel for data forwarding by the fourth UPF to the fifth UPF.

Step 1610: The SMF determines fifth session identifier information, where the fifth session identifier information is used to indicate a fifth session channel of the fifth UPF.

Step 1611: The SMF sends the fifth session identifier information to the fifth UPF.

Step 1612: The fifth UPF obtains the first MAC address of the UE from the fifth packet transmission rule, and generates a fifth packet transmission rule based on the fifth session identifier information and the first MAC address of the UE, where the fifth packet transmission rule includes a fifth correspondence between the fifth session identifier information and the MAC address of the UE.

Step 1613: The fourth UPF receives a first Ethernet packet from a DN, where the first Ethernet packet includes the first MAC address of the UE.

Step 1614: The fourth UPF sends the first Ethernet packet to the fifth UPF by using the channel indicated by the first channel identifier.

Step 1615: The fifth UPF determines, according to the fifth packet transmission rule, the fifth session identifier information corresponding to the first MAC address of the UE.

Step 1616: The fifth UPF sends the first Ethernet packet to the UE through the first session channel indicated by the fifth session identifier information.

Figure 17A:
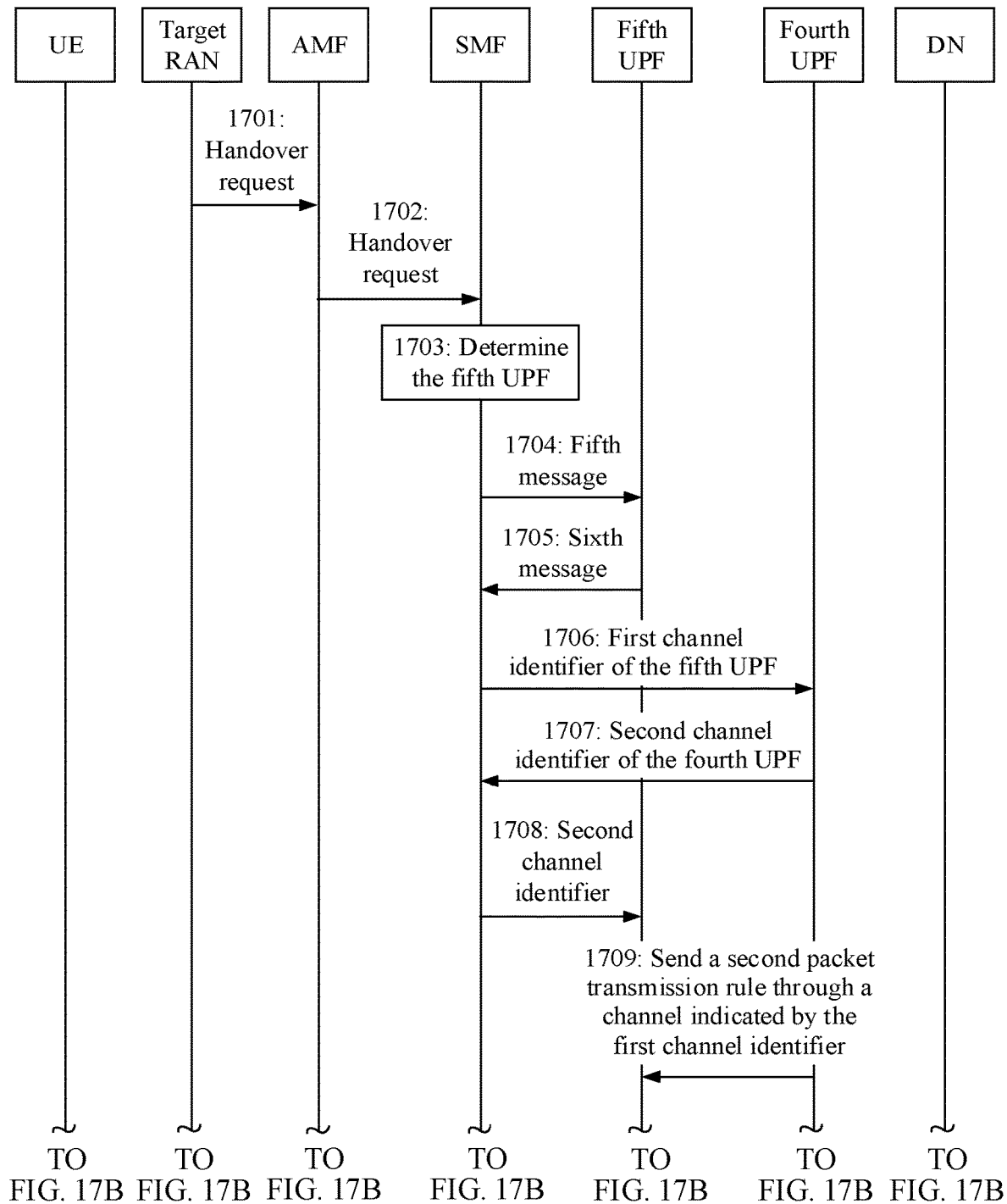
FIG. 17A and FIG. 17B are a flowchart of an example of another communication method according to this application.
Figure 17B:
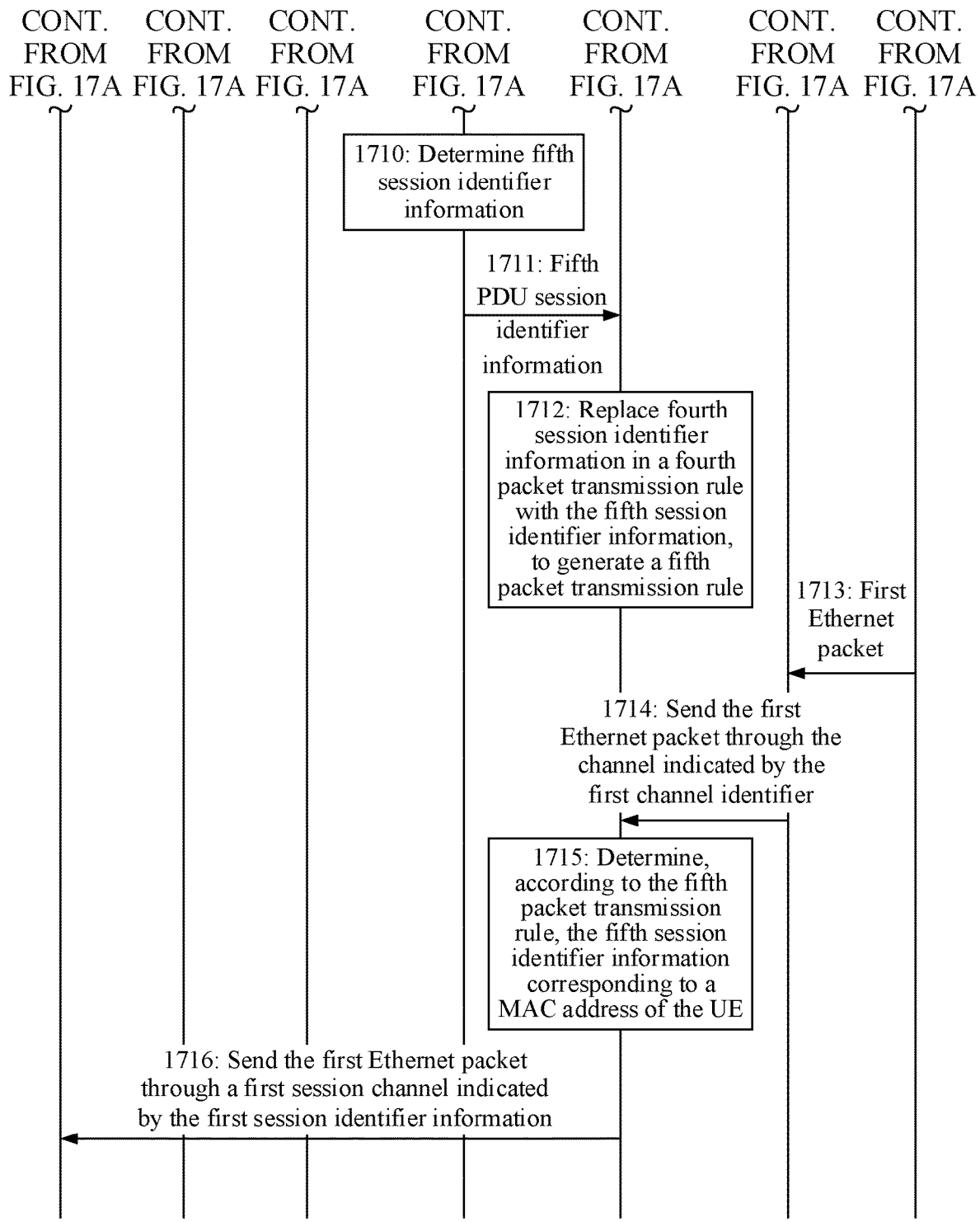

Based on the foregoing embodiment, an example of a packet transmission method shown in FIG. 17A and FIG. 17B and the example shown in FIG. 16A and FIG. 16B have similar procedures, and there is also a difference. For example, a specific procedure may be as follows:

Step 1701 to step 1711 are similar to step 1601 to step 1611 in the embodiment shown in FIG. 16A and FIG. 16B. For details, mutual reference may be made. Details are not described one by one herein again.

Step 1712: The fifth UPF replaces the fourth session identifier information in the fourth packet transmission rule with the fifth session identifier information, to generate a fifth packet transmission rule, where the fifth packet transmission rule includes a fifth correspondence between the first MAC address of the UE and the fifth session identifier information.

Step 1713 to step 1716 are similar to step 1613 to step 1616 in the embodiment shown in FIG. 16A and FIG. 16B. For details, mutual reference may be made. Details are not described one by one herein again.

It should be noted that, in the foregoing embodiment, when the UE is handed over from the fourth UPF to the fifth UPF, for a source of information such as the fifth packet transmission rule on the fifth UPF, refer to another embodiment. For example, the information may be from a source of the third rule, for example, a source of the first packet transmission rule.

Figure 18:
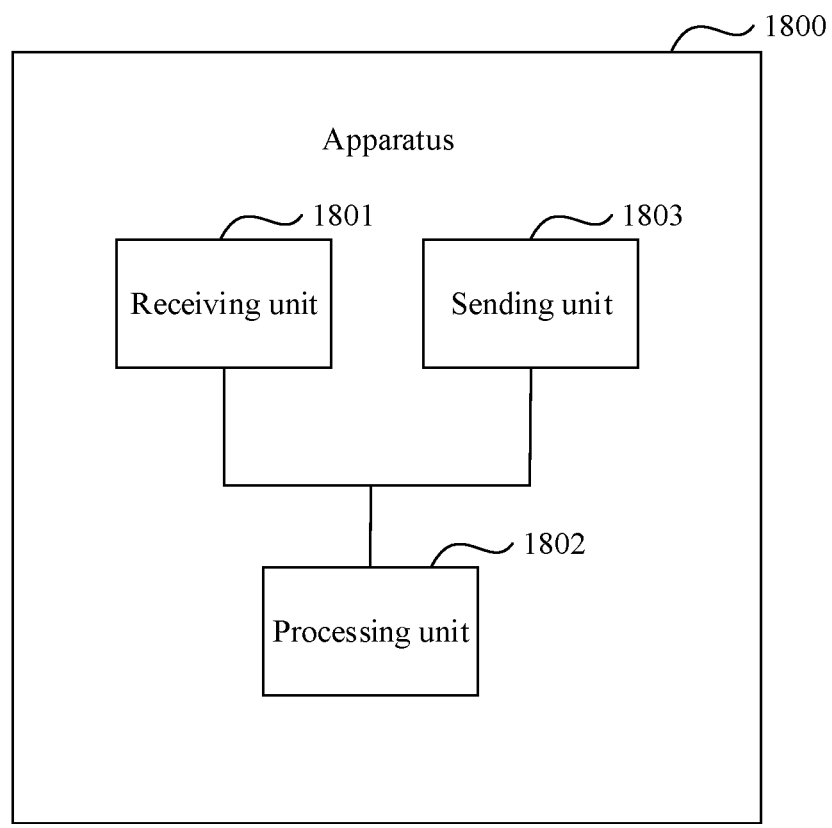
FIG. 18 is a schematic structural diagram of an apparatus according to this application.

Based on a similar concept as the method embodiments, an embodiment of this application further provides an apparatus 1800. The apparatus is applied to a session management network element. The apparatus 1800 may be specifically a processor, a chip, a chip system, a functional module, or the like in the session management network element. Referring to FIG. 18, the apparatus 1800 may include a receiving unit 1801, a processing unit 1802, and a sending unit 1803. The receiving unit 1801 is used by the apparatus 1800 to receive information, the sending unit 1803 is used by the apparatus 1800 to send information, and the processing unit 1802 is configured to control and manage an action of the apparatus 1800. The processing unit 1802 may be further configured to indicate a processing process related to the session management network element (such as the SMF) in any of the foregoing embodiments and/or another process of the technical solutions described in this application. Specifically, the processing unit 1802 may control steps performed by the receiving unit 1801 and the sending unit 1803. For details, refer to the foregoing embodiments. Repeated parts are not described in detail herein again.

In an optional implementation, the receiving unit 1801 may be an optional unit in the apparatus 1800, to be specific, optionally, the apparatus 1800 may not include the receiving unit 1801.

In hardware implementation, the processing unit 1802 may be a processor, a processing circuit, or the like. The sending unit 1803 may be a transmitter, a transmitter circuit, or the like. The receiving unit 1801 may be a receiver, a receiver circuit, or the like. The sending unit 1803 and the receiving unit 1801 may form a transceiver.

Figure 19:
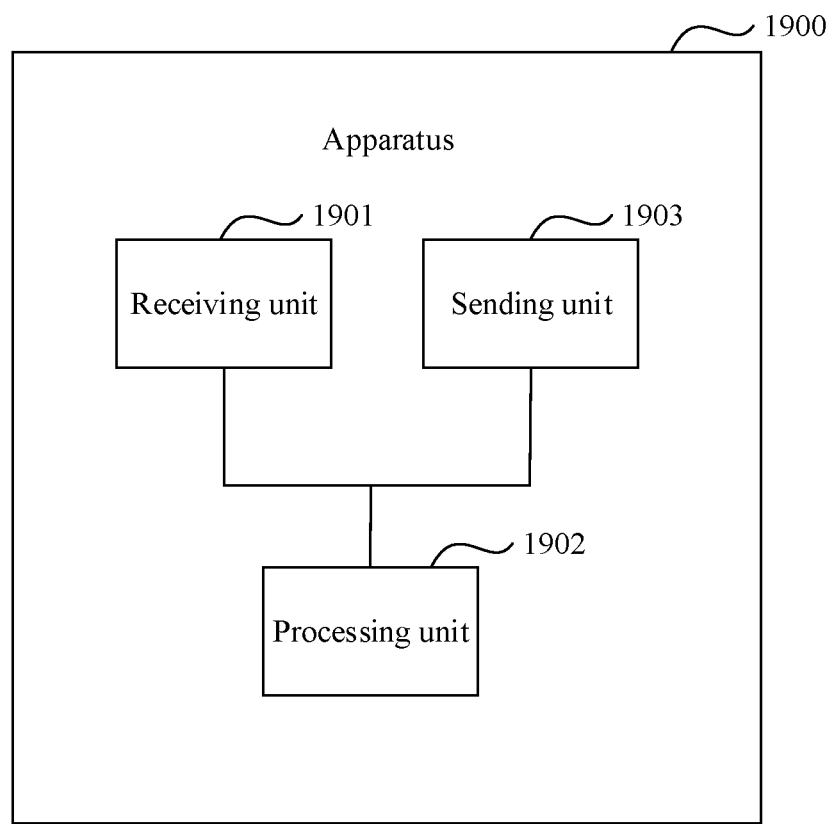
FIG. 19 is a schematic structural diagram of another apparatus according to this application.

Based on a similar concept as the method embodiments, an embodiment of this application further provides an apparatus 1900. The apparatus is applied to a first user plane function network element. The apparatus 1900 may be specifically a processor, a chip, a chip system, a functional module, or the like in the first user plane function network element. Referring to FIG. 19, the apparatus 1900 may include a receiving unit 1901, a processing unit 1902, and a sending unit 1903. The sending unit 1903 is used by the apparatus 1900 to send information, the receiving unit 1901 is used by the apparatus 1900 to receive information, and the processing unit 1902 is configured to control and manage an action of the apparatus 1900. The processing unit 1902 may be further configured to indicate a processing process related to the first user plane function network element (such as the target UPF) in any of the foregoing embodiments and/or another process of the technical solutions described in this application. Specifically, the processing unit 1902 may control steps performed by the sending unit 1903 and the receiving unit 1901. For details, refer to the foregoing embodiments. Repeated parts are not described in detail herein again.

In an optional implementation, the sending unit 1903 may be an optional unit in the apparatus 1900, to be specific, optionally, the apparatus 1900 may not include the sending unit 1903.

In an optional implementation, the receiving unit 1901 may be an optional unit in the apparatus 1900, to be specific, optionally, the apparatus 1900 may not include the receiving unit 1901.

In hardware implementation, the processing unit 1902 may be a processor, a processing circuit, or the like. The sending unit 1903 may be a transmitter, a transmitter circuit, or the like. The receiving unit 1901 may be a receiver, a receiver circuit, or the like. The sending unit 1903 and the receiving unit 1901 may form a transceiver.

Figure 20:
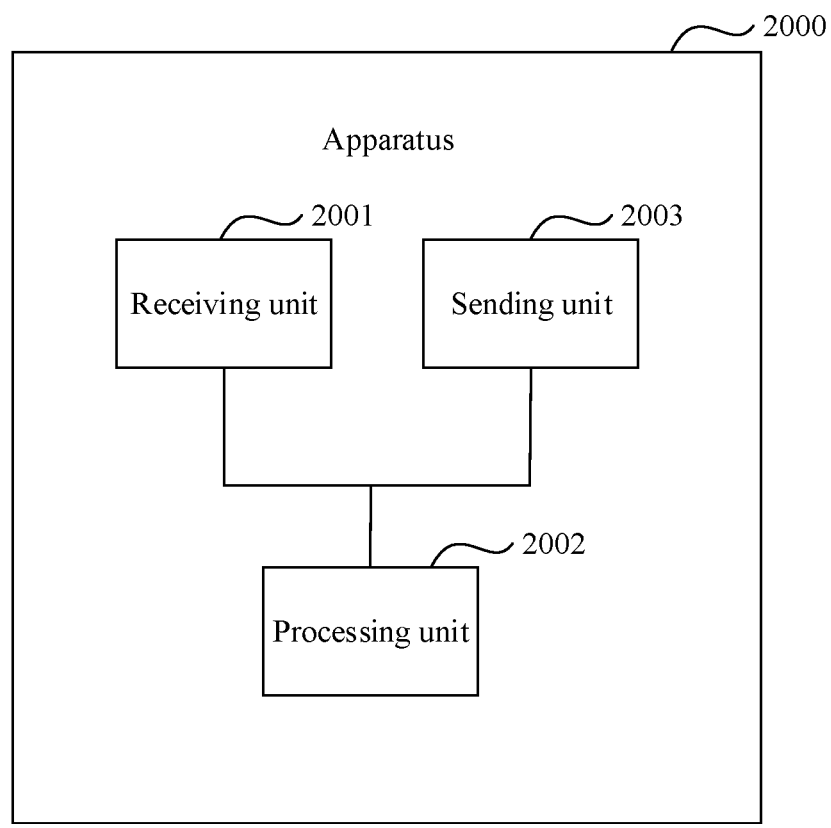
FIG. 20 is a schematic structural diagram of another apparatus according to this application.

Based on a similar concept as the method embodiments, an embodiment of this application further provides an apparatus 2000. The apparatus is applied to a second user plane function network element. The apparatus 2000 may be specifically a processor, a chip, a chip system, a functional module, or the like in the second user plane function network element. Referring to FIG. 20, the apparatus 2000 may include a receiving unit 2001, a processing unit 2002, and a sending unit 2003. The sending unit 2003 is used by the apparatus 2000 to send information, the receiving unit 2001 is used by the apparatus 2000 to receive information, and the processing unit 2002 is configured to control and manage an action of the apparatus 2000. The processing unit 2002 may be further configured to indicate a processing process related to the second user plane function network element (such as the original UPF) in any of the foregoing embodiments and/or another process of the technical solutions described in this application. Specifically, the processing unit 2002 may control steps performed by the sending unit 2003 and the receiving unit 2001. For details, refer to the foregoing embodiments. Repeated parts are not described in detail herein again.

In an optional implementation, the receiving unit 2001 may be an optional unit in the apparatus 2000, to be specific, optionally, the apparatus 2000 may not include the receiving unit 2001.

In hardware implementation, the processing unit 2002 may be a processor, a processing circuit, or the like. The sending unit 2003 may be a transmitter, a transmitter circuit, or the like. The receiving unit 2001 may be a receiver, a receiver circuit, or the like. The sending unit 2003 and the receiving unit 2001 may form a transceiver.

It should be noted that, in the embodiments of this application, unit division is an example, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

Figure 21:
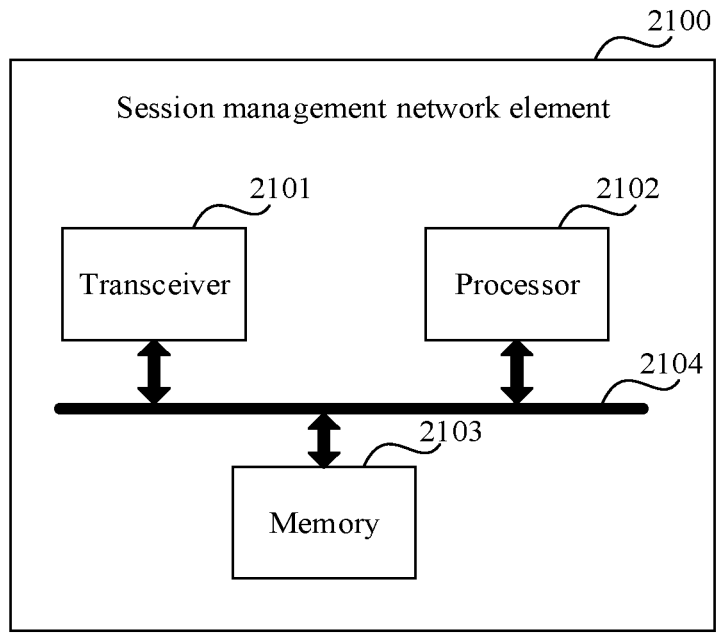
FIG. 21 is a structural diagram of a session management network element according to this application.

Based on the foregoing embodiments, an embodiment of this application further provides another session management network element 2100, configured to implement the communication method. Referring to FIG. 21, the session management 2100 may include a transceiver 2101 and a processor 2102. Optionally, the session management network element 2100 may further include a memory 2103. The memory 2103 may be disposed inside the session management network element 2100, or may be disposed outside the session management network element 2100. The processor 2102 controls the transceiver 2101 to receive and send data, and is configured to implement the method performed by the session management network element (such as the SMF) in FIG. 2 to FIG. 17A and FIG. 17B.

Specifically, the processor 2102 may be a central processing unit (CPU), a network processor (NP), or a combination of a CPU and an NP. The processor 2102 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The transceiver 2101, the processor 2102, and the memory 2103 are connected to each other. Optionally, the transceiver 2101, the processor 2102, and the memory 2103 are connected to each other by using a bus 2104. The bus 2104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 21, but this does not mean that there is only one bus or only one type of bus.

In an optional implementation, the memory 2103 is configured to store a program and the like. Specifically, the program may include program code, and the program code includes a computer operation instruction. The memory 2103 may include a RAM, and may further include a non-volatile memory, for example, one or more magnetic disk memories. The processor 2102 executes an application program stored in the memory 2103 to implement the foregoing function, to implement the communication method provided in the embodiments of this application.

Figure 22:
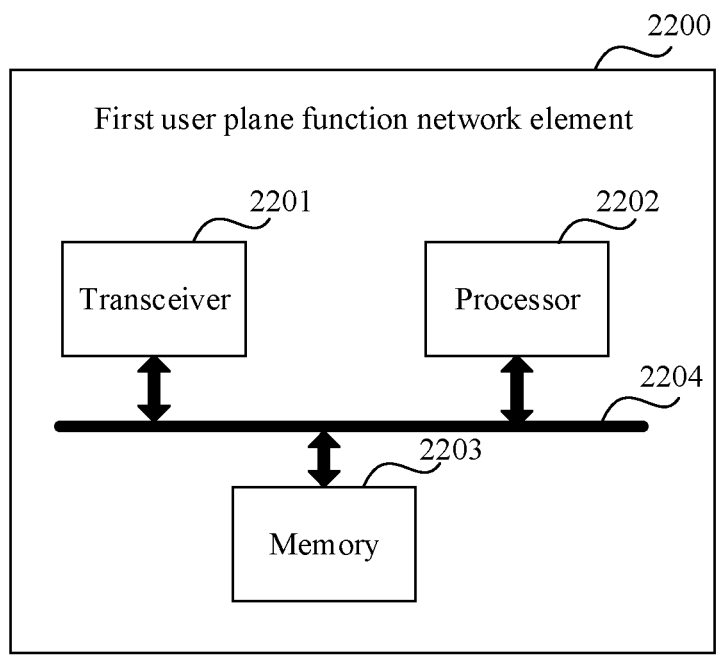
FIG. 22 is a structural diagram of a first user plane function network element according to this application.

Based on the foregoing embodiments, an embodiment of this application further provides another first user plane function network element 2200, configured to implement the foregoing communication method. Referring to FIG. 22, the first user plane function network element 2200 may include a transceiver 2201 and a processor 2202. Optionally, the first user plane function network element 2200 may further include a memory 2203. The memory 2203 may be disposed inside the first user plane function network element 2200, or may be disposed outside the first user plane function network element 2200. The processor 2202 controls the transceiver 2201 to receive and send data, and is configured to implement the method performed by the first user plane function network element (such as the third UPF or the fifth UPF) in FIG. 2 to FIG. 17A and FIG. 17B.

Specifically, the processor 2202 may be a CPU, an NP, or a combination of a CPU and an NP. The processor 2202 may further include a hardware chip. The hardware chip may be an ASIC, a PLD, or a combination thereof. The PLD may be a CPLD, an FPGA, a GAL, or any combination thereof.

The transceiver 2201, the processor 2202, and the memory 2203 are connected to each other. Optionally, the transceiver 2201, the processor 2202, and the memory 2203 are connected to each other by using a bus 2204. The bus 2204 may be a PCI bus, an EISA bus, or the like. The bus may be classified into an address bus, a data bus, a control bus, and the like. For ease of representation, only one thick line is used to represent the bus in FIG. 22, but this does not mean that there is only one bus or only one type of bus.

In an optional implementation, the memory 2203 is configured to store a program and the like. Specifically, the program may include program code, and the program code includes a computer operation instruction. The memory 2203 may include a RAM, and may further include a non-volatile memory, for example, one or more magnetic disk memories. The processor 2202 executes an application program stored in the memory 2203 to implement the foregoing function, to implement the communication method provided in the embodiments of this application.

Figure 23:
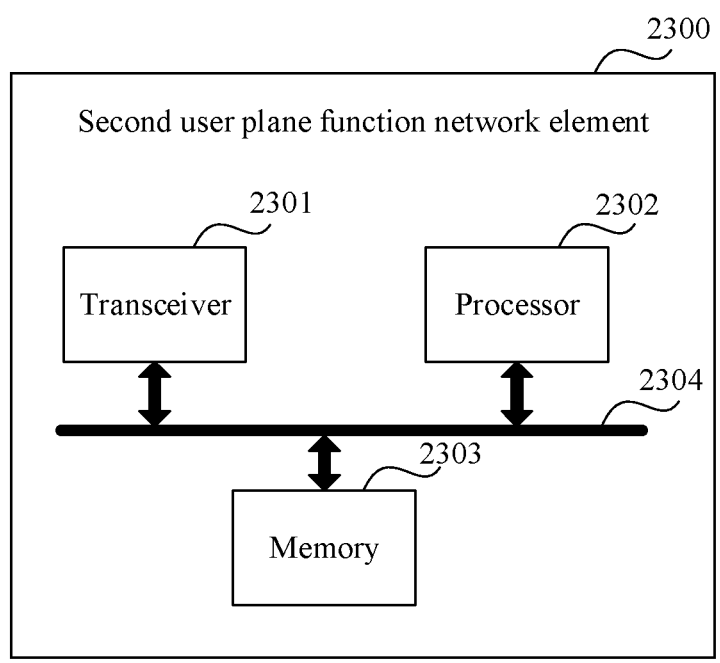
FIG. 23 is a structural diagram of a second user plane function network element according to this application.

Based on the foregoing embodiments, an embodiment of this application further provides another second user plane function network element 2300, configured to implement the foregoing communication method. Referring to FIG. 23, the second user plane function network element 2300 may include a transceiver 2301 and a processor 2302. Optionally, the second user plane function network element 2300 may further include a memory 2303. The memory 2303 may be disposed inside the second user plane function network element 2300, or may be disposed outside the second user plane function network element 2300. The processor 2302 controls the transceiver 2301 to receive and send data, and is configured to implement the method performed by the second user plane function network element (such as the fourth UPF) in FIG. 4, FIG. 5, and FIG. 9A and FIG. 9B to FIG. 17A and FIG. 17B.

Specifically, the processor 2302 may be a CPU, an NP, or a combination of a CPU and an NP. The processor 2302 may further include a hardware chip. The hardware chip may be an ASIC, a PLD, or a combination thereof. The PLD may be a CPLD, an FPGA, a GAL, or any combination thereof.

The transceiver 2301, the processor 2302, and the memory 2303 are connected to each other. Optionally, the transceiver 2301, the processor 2302, and the memory 2303 are connected to each other by using a bus 2304. The bus 2304 may be a PCI bus, an EISA bus, or the like. The bus may be classified into an address bus, a data bus, a control bus, and the like. For ease of representation, only one thick line is used to represent the bus in FIG. 23, but this does not mean that there is only one bus or only one type of bus.

In an optional implementation, the memory 2303 is configured to store a program and the like. Specifically, the program may include program code, and the program code includes a computer operation instruction. The memory 2303 may include a RAM, and may further include a non-volatile memory, for example, one or more magnetic disk memories. The processor 2302 executes an application program stored in the memory 2303 to implement the foregoing function, to implement the communication method provided in the embodiments of this application.

Based on the foregoing embodiments, an embodiment of this application further provides a computer storage medium. The storage medium stores a software program, and when read and executed by one or more processors, the software program may implement the method provided in any one or more of the foregoing embodiments. The computer storage medium may include: any medium that can store program code, such as a USB flash drive, a removable hard disk, a ROM, a RAM, a magnetic disk, or an optical disc.

Based on the foregoing embodiments, an embodiment of this application further provides a chip. The chip includes a processor, configured to implement a function in any one or more of the foregoing embodiments, for example, obtain or process information or a message in the foregoing methods. Optionally, the chip further includes a memory. The memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc-ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to the embodiments of this application without departing from the scope of the embodiments of this application. In this way, this application is intended to cover these modifications and variations of the embodiments of this application provided that these changes and variations fall within the scope of protection defined by the claims of this application and their equivalent technologies.

What is claimed is:

1. A communication method comprising:
    obtaining, by a session management network element, first session identifier information for a terminal device and comprising a tunnel endpoint identifier;
    obtaining, by the session management network element from a source user plane function network element, an address of the terminal device, wherein the address of the terminal device is a media access control (MAC) address of the terminal device, and wherein the terminal device is handed over from the source user plane function network element to a new user plane function network element;
    generating, by the session management network element, a packet transmission rule indicating to the new user plane function network element how to transmit an Ethernet packet and comprising a correspondence between the first session identifier information and the MAC address of the terminal device; and
    sending, by the session management network element to the new user plane function network element, the packet transmission rule,
    wherein the first session identifier information indicates a first session channel of the new user plane function network element.

2. The communication method of claim 1, further comprising further generating the packet transmission rule based on the first session identifier information and the MAC address of the terminal device.

3. The communication method of claim 1, wherein obtaining, by the session management network element, the first session identifier information for the terminal device comprises allocating the first session identifier information to the terminal device.

4. The communication method of claim 1, wherein obtaining the MAC address of the terminal device from the source user plane function network element comprises:
    sending second session identifier information to the source user plane function network element and receiving the MAC address of the terminal device from the source user plane function network element, wherein the second session identifier information corresponds to the MAC address of the terminal device, and wherein the second session identifier information indicates a second session channel configured for the terminal device before the terminal device is handed over; or
    receiving the MAC address of the terminal device from the source user plane function network element, wherein the MAC address of the terminal device corresponds to the second session identifier information.

5. The communication method of claim 1, further comprising:
    obtaining, by the session management network element, handover information indicating a handover of the terminal device from the source user plane function network element to the new user plane function network element; and
    determining, by the session management network element according to the handover information, the new user plane function network element for the terminal device.

6. A communication method comprising:
    obtaining, by a session management network element, first session identifier information for a terminal device and comprising a tunnel endpoint identifier;
    obtaining, by the session management network element from a source user plane function network element, an address of the terminal device, wherein the address of the terminal device is a media access control (MAC) address of the terminal device, and wherein the terminal device is handed over from the source user plane function network element to a new user plane function network element;
    generating, by the session management network element, a packet transmission rule comprising a correspondence between the first session identifier information and the MAC address of the terminal device;
    sending, by the session management network element, to the new user plane function network element, the packet transmission rule, wherein the first session identifier information indicates a first session channel of the new user plane function network element;

receiving, by the new user plane function network element from the session management network element, the packet transmission rule; and transmitting, by the new user plane function network element, an Ethernet packet to the terminal device based on the packet transmission rule.

7. The communication method of claim 6, wherein before transmitting the Ethernet packet, the method further comprises:

receiving, by the new user plane function network element, the Ethernet packet, wherein the Ethernet packet comprises the MAC address of the terminal device; and determining, by the new user plane function network element, the first session identifier information based on the correspondence, wherein the first session identifier information corresponds to the MAC address of the terminal device, and wherein the communication method further comprises further transmitting, by the new user plane function network element, the Ethernet packet to the terminal device through the first session channel based on the first session identifier information.

8. The communication method of claim 6, further comprising:

obtaining, by the session management network element, handover information indicating a handover of the terminal device from the source user plane function network element to the new user plane function network element; and determining, by the session management network element according to the handover information, the new user plane function network element for the terminal device.

9. The communication method of claim 6, wherein the packet transmission rule indicates to the new user plane function network element how to transmit the Ethernet packet.

10. An apparatus comprising:

a memory configured to store instructions; and a processor coupled to the memory and configured to execute the instructions to cause the apparatus to:

obtain first session identifier information for a terminal device, wherein the first session identifier information comprises a tunnel endpoint identifier;

obtain an address of the terminal device from a source user plane function network element, wherein the address of the terminal device is a media access control (MAC) address of the terminal device, and wherein the terminal device is handed over from the source user plane function network element to a new user plane function network element;

generate a packet transmission rule indicating to the new user plane function network element how to transmit an Ethernet packet and comprising a correspondence between the first session identifier information and the MAC address of the terminal device; and send, to the new user plane function network element, the packet transmission rule, wherein the first session identifier information indicates a first session channel of the new user plane function network element.

11. The apparatus of claim 10, wherein the processor is further configured to execute the instructions to cause the apparatus to further generate the packet transmission rule based on the first session identifier information and the MAC address of the terminal device.

12. The apparatus of claim 10, wherein the processor is further configured to execute the instructions to cause the apparatus to further obtain the first session identifier information for the terminal device by allocating the first session identifier information to the terminal device.

13. The apparatus of claim 10, wherein the processor is further configured to execute the instructions to cause the apparatus to:

obtain handover information indicating a handover of the terminal device from the source user plane function network element to the new user plane function network element; and determine the new user plane function network element for the terminal device according to the handover information.

14. The apparatus of claim 10, wherein the processor is further configured to execute the instructions to cause the apparatus to further obtain the MAC address of the terminal device from the source user plane function network element by:

sending second session identifier information to the source user plane function network element and receiving the MAC address of the terminal device from the source user plane function network element, wherein the second session identifier information corresponds to the MAC address of the terminal device, and wherein the second session identifier information indicates a second session channel configured for the terminal device before the terminal device is handed over; or receiving the MAC address of the terminal device from the source user plane function network element, wherein the MAC address of the terminal device corresponds to the second session identifier information.

15. A system comprising:

a session management network element configured to:

obtain first session identifier information for a terminal device, wherein the first session identifier information comprises a tunnel endpoint identifier;

obtain an address of the terminal device from a source user plane function network element, wherein the address of the terminal device is a media access control (MAC) address of the terminal device, and wherein the terminal device is handed over from the source user plane function network element to a first user plane function network element;

generate a packet transmission rule comprising a correspondence between the first session identifier information and the MAC address of the terminal device; and send, to the first user plane function network element, the packet transmission rule, wherein the first session identifier information indicates a first session channel of the first user plane function network element; and the first user plane function network element configured to:

receive, from the session management network element, the packet transmission rule; and transmit an Ethernet packet to the terminal device based on the packet transmission rule.

16. The system of claim 15, wherein before transmitting the Ethernet packet, the first user plane function network element is further configured to:

receive the Ethernet packet, wherein the Ethernet packet comprises the MAC address of the terminal device; and determine the first session identifier information corresponding to the MAC address of the terminal device based on the correspondence, and wherein the first user plane function network element is further configured to further transmit the Ethernet packet to the terminal device through the first session channel based on the first session identifier information.

17. The system of claim 15, wherein the session management network element is further configured to:

obtain handover information indicating a handover of the terminal device from the source user plane function network element to the first user plane function network element; and determine the first user plane function network element for the terminal device according to the handover information.

18. The system of claim 15, wherein the packet transmission rule indicates to the first user plane function network element how to transmit the Ethernet packet.

19. A computer program product comprising instructions that are stored on a non-transitory computer-readable medium and that, when executed by a processor, cause an apparatus to:

obtain first session identifier information for a terminal device, wherein the first session identifier information comprises a tunnel endpoint identifier;

obtain an address of the terminal device from a source user plane function network element, wherein the address of the terminal device is a media access control (MAC) address of the terminal device, and wherein the terminal device is handed over from the source user plane function network element to a new user plane function network element;

generate a packet transmission rule indicating to the new user plane function network element how to transmit an Ethernet packet and comprising a correspondence between the first session identifier information and the MAC address of the terminal device; and send, to the new user plane function network element, the packet transmission rule, wherein the first session identifier information indicates a first session channel of the new user plane function network element.

20. The computer program product of claim 19, wherein the instructions, when executed by the processor, further cause the apparatus to further generate the packet transmission rule based on the first session identifier information and the MAC address of the terminal device.

21. The computer program product of claim 19, wherein the instructions, when executed by the processor, further cause the apparatus to obtain the first session identifier information for the terminal device by allocating the first session identifier information to the terminal device.

\* \* \* \* \*